US012382531B2

(12) United States Patent
Teyeb et al.

(10) Patent No.: US 12,382,531 B2
(45) Date of Patent: Aug. 5, 2025

(54) IAB-NODE HANDOVER IN INTER-CU MIGRATION, RECURSIVE F1 AND RRC SIGNALING ASPECTS

(71) Applicant: Telefonaktiebolaget LM Ericsson (publ), Stockholm (SE)

(72) Inventors: Oumer Teyeb, Montréal (CA); Filip Barac, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 213 days.

(21) Appl. No.: 18/010,446

(22) PCT Filed: Jun. 24, 2021

(86) PCT No.: PCT/SE2021/050630
§ 371 (c)(1),
(2) Date: Dec. 14, 2022

(87) PCT Pub. No.: WO2021/262077
PCT Pub. Date: Dec. 30, 2021

(65) Prior Publication Data
US 2023/0269630 A1 Aug. 24, 2023

Related U.S. Application Data

(60) Provisional application No. 63/044,706, filed on Jun. 26, 2020.

(51) Int. Cl.
H04W 76/20 (2018.01)
H04W 36/00 (2009.01)
(52) U.S. Cl.
CPC ....... H04W 76/20 (2018.02); H04W 36/0016 (2013.01); H04W 36/0033 (2013.01)

(58) Field of Classification Search
CPC ..... H04W 76/20; H04W 36/00; H04W 36/12; H04W 36/32; H04W 36/08; H04W 36/02;
(Continued)

(56) References Cited

U.S. PATENT DOCUMENTS 8,954,078 B2 * 2/2015 Van Phan ............. H04W 36/08
370/335
10,244,444 B2 * 3/2019 Ozturk ............. H04W 36/0011
(Continued)

FOREIGN PATENT DOCUMENTS

CN 110536350 A 12/2019
WO 2019246446 A1 12/2019
WO 2021051313 A1 3/2021

OTHER PUBLICATIONS

3GPP TR 38.874 V16.0.0, "3rd Generation Partnership Project; Technical Specification Group Radio Access Network; NR; Study on Integrated Access and Backhaul; (Release 16)," Dec. 2018, 111 pages.
(Continued)

Primary Examiner — Man U Phan
(74) Attorney, Agent, or Firm — Sage Patent Group

(57) ABSTRACT

A method by a network node, operating as a target donor CU in an IAB network serving as a candidate donor node for a migrating IAB node and providing connectivity for a UE. A message for IAB handover including contexts of the migrating IAB node and UEs and IAB nodes directly or indirectly served by the migrating IAB node is received. Admission control is performed for the UEs and IAB nodes. A handover command to a mobile termination, MT, of the migrating IAB node, and each UE and MT of the IAB nodes is prepared. A group handover command that recursively contains handover commands of all the UEs and MTs is generated. A handover acknowledge message including a list of admitted and not admitted PDU session resources and containing the
(Continued)

group handover command is sent. A RRC Reconfiguration Complete message is received.

22 Claims, 26 Drawing Sheets

(58) Field of Classification Search
CPC ..... H04W 36/04; H04W 36/28; H04W 36/22; H04W 36/36; H04W 36/10; H04W 28/02; H04W 28/08; H04W 88/08; H04W 88/14; H04W 88/04; H04W 88/00; H04W 92/20; H04W 40/22; H04W 76/19; H04W 76/12; H04W 24/10; H04L 45/12; H04L 5/00
USPC .......................................................... 370/331
See application file for complete search history.

(56) References Cited

U.S. PATENT DOCUMENTS

| | | | | |
|---|---|---|---|---|
| 11,153,272 | B2* | 10/2021 | Yang | H04L 61/2592 |
| 11,190,989 | B2* | 11/2021 | Sirotkin | H04W 80/08 |
| 11,477,712 | B2* | 10/2022 | Hsieh | H04W 36/0064 |
| 11,825,369 | B2* | 11/2023 | Lin | H04W 36/0061 |
| 11,895,084 | B2* | 2/2024 | Liu | H04L 61/5007 |
| 12,149,989 | B2* | 11/2024 | Ljung | H04W 36/0009 |
| 2019/0394084 | A1* | 12/2019 | Tsai | H04L 41/0668 |
| 2022/0141749 | A1* | 5/2022 | Luo | H04W 40/24 370/331 |
| 2023/0232285 | A1* | 7/2023 | Barac | H04W 36/0088 370/331 |
| 2023/0239754 | A1* | 7/2023 | Barac | H04W 36/0088 370/331 |
| 2023/0403617 | A1* | 12/2023 | Wu | H04W 36/362 |

OTHER PUBLICATIONS

3GPP TS 38.423 V16.1.0, "3rd Generation Partnership Project; Technical Specification Group Radio Access Network; NG-RAN; Xn application protocol (XnAP) (Release 16)," Mar. 2020, 334 pages.
Notice of Reasons for Rejection for Japanese Patent Application No. 2022-580046, including English translation, dated Mar. 5, 2024, 8 pages.
Nokia, Nokia Shanghai Bell, Qualcomm Incorporated, Huawei, Ericsson, "Topology Adaptation Scenarios," R3-184896, 3GPP TSG-RAN WG3#101, Gothenburg, Sweden, Aug. 20-24, 2018, 6 pages.
Decision to Grant for Japanese Patent Application No. 2022-580046 dated Aug. 6, 2024, 4 pages.
Ericsson, "Scenarios of topology adaptation for IAB network," Tdoc R2-2007660, 3GPP TSG-RAN WG2 #111e, Electronic meeting, Aug. 17-28, 2020, 6 pages.
International Search Report and Written Opinion of the International Searching Authority for PCT International Application No. PCT/SE2021/050630 dated Sep. 30, 2021.
Nokia et al, "Discussion on Inter-CU Topology Adaptation", R3-185697, 3GPP TSG-RAN WG3 #101bis, Chengdu, China; Oct. 8-12, 2018, 9 pages.
ZTE et al, "Discussion on network-controlled IAB migration handling", R3-190542, 3GPP TSG RAN WG3 Meeting #103, Athens, Greece; Feb. 25-Mar. 1, 2019, 5 pages.
3GPP TS 38.401 V16.1.0, "3rd Generation Partnership Project; Technical Specification Group Radio Access Network; NG-RAN; Architecture description (Release 16)," Mar. 2020, 50 pages.
3GPP TS 38.331 V16.0.0, "3rd Generation Partnership Project; Technical Specification Group Radio Access Network; NR; Radio Resource Control (RRC) protocol specification (Release 16)," Mar. 2020, 835 pages.
3GPP TS 38.473 V16.1.0, "3rd Generation Partnership Project; Technical Specification Group Radio Access Network; NG-RAN; F1 application protocol (F1AP) (Release 16)," Mar. 2020, 240 pages.
Qualcomm, "New WID on Enhancements to Integrated Access and Backhaul", RP-193251, 3GPP TSG RAN Meeting #86, Sitges, Spain, Dec. 9-12, 2019, 5 pages.

* cited by examiner

UPDATING THE HANDOVER COMMAND

1801 – ENCAPSULATING THE HANDOVER COMMANDS OF EACH UE AND MT OF CHILD IAB NODE DIRECTLY IN THE HANDOVER COMMAND PREPARED FOR THE MT OF THE IAB NODE

1803 – EMBEDDING AN F1-AP MESSAGE IN THE HANDOVER COMMAND PREPARED FOR THE MT OF THE IAB NODE, WHERE THE F1-AP MESSAGE CONTAINS ALL THE HANDOVER COMMANDS FOR THE UES/MTS DIRECTLY OR INDIRECTLY SERVED BY THE MIGRATING IAB NODE

1805 – ENCAPSULATING A LIST OF F1-AP MESSAGES IN THE HANDOVER COMMAND FOR THE MT OF THE IAB NODE, EACH MESSAGE CONTAINING THE HANDOVER COMMAND TO EACH UE/MT

Figure 18

RECEIVING THE RRC RECONFIGURATION COMPLETE MESSAGE

1901 – RECEIVING EACH RECONFIGURATION COMPLETE MESSAGE IN A SEPARATE F1-AP UL RRC MESSAGE TRANSFER MESSAGE

1903 – RECEIVING AN UPLINK F1-AP MESSAGE FOR EACH IAB NODE BEING MIGRATED, WHEREIN EACH UPLINK MESSAGE CONTAINS THE RRC COMPLETE MESSAGES OF ALL THE UES AND IAB-MT UNDER THAT IAB NODE

1905 – RECEIVING A SINGLE UPLINK F1-AP MESSAGE THAT CONTAINS ALL THE RECONFIGURATION COMPLETE MESSAGES OF ALL THE MIGRATING IAB NODES AND UES

Figure 19

FORWARDING THE RECONFIGURATION COMPLETE MESSAGE

2101 – FORWARDING EACH RECONFIGURATION COMPLETE MESSAGE RECEIVED FROM EACH CHILD UE OR CHILD IAB NODE SEPARATELY USING A LEGACY F1-AP UL RRC TRANSFER MESSAGE

2103 – FORWARDING THE RECONFIGURATION COMPLETE MESSAGE USING AN ENHANCED F1-AP UL RRC TRANSFER MESSAGE OR A NEW MESSAGE, INCLUDING RECONFIGRATION COMPLETE MESSAGES FROM ALL THE UES AND CHILDREN IAB-MTS DIRECTLY UNDER THE IAB NODE

Figure 21

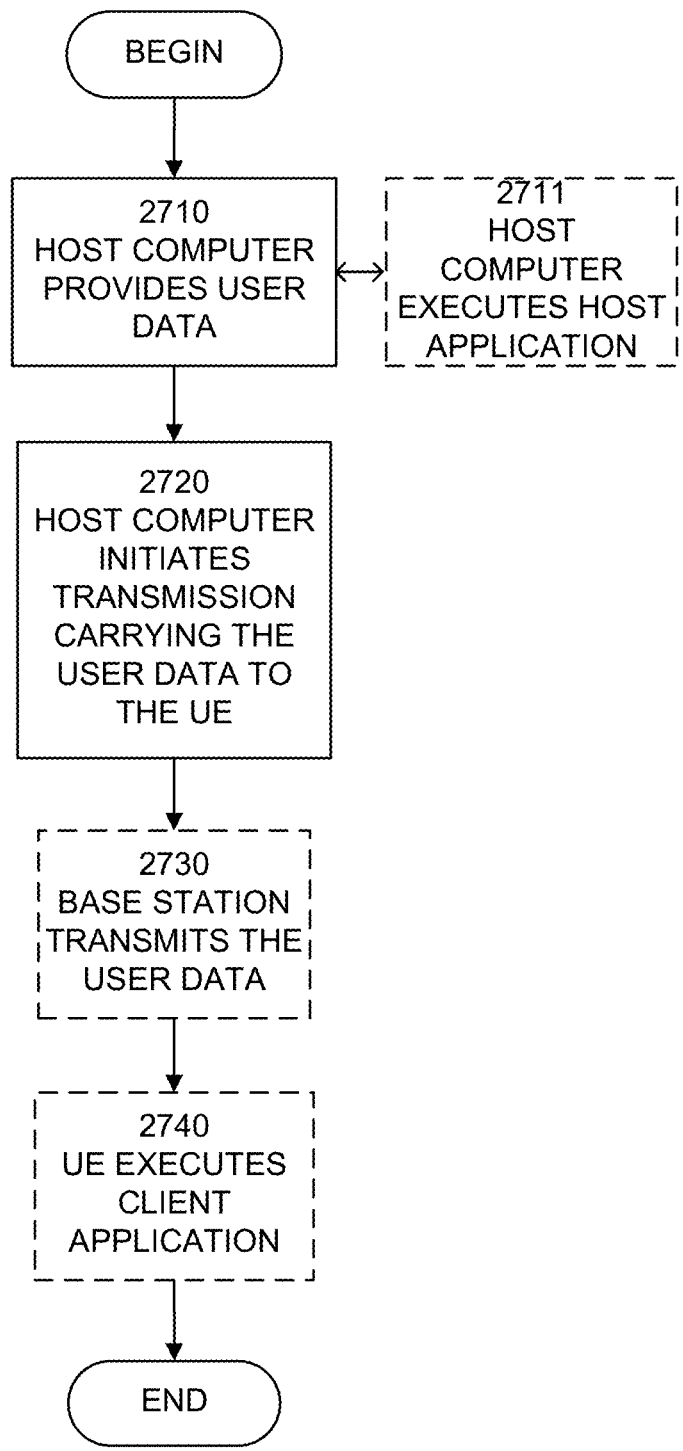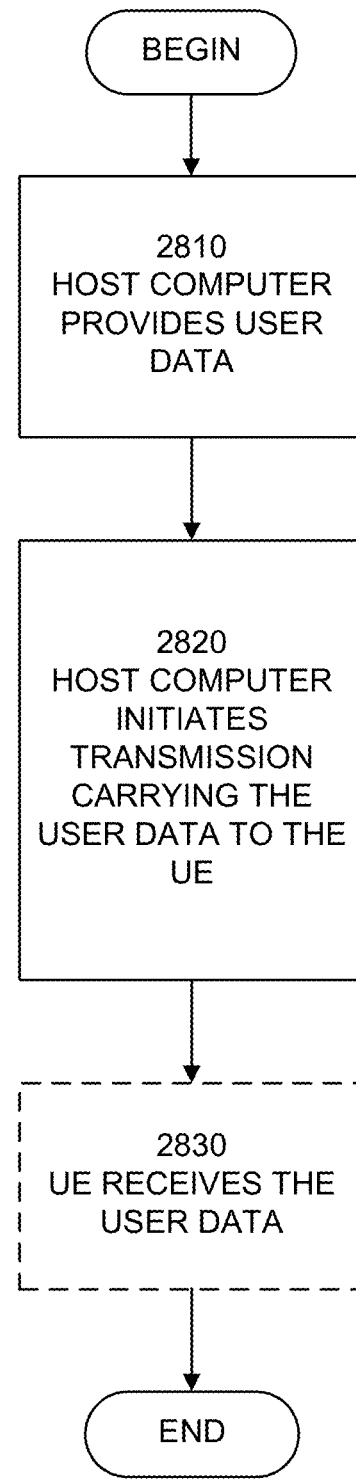
Figure 27
Figure 28

IAB-NODE HANDOVER IN INTER-CU MIGRATION, RECURSIVE F1 AND RRC SIGNALING ASPECTS

CROSS REFERENCE TO RELATED APPLICATIONS

This application is a 35 U.S.C. § 371 national stage application of PCT International Application No. PCT/SE2021/050630 filed on Jun. 24, 2021, which claims the benefit of U.S. Provisional Patent Application Ser. No. 63/044,706, filed on Jun. 26, 2020, the disclosures and content of which are incorporated by reference herein in their entireties.

TECHNICAL FIELD

The present disclosure relates generally to communications, and more particularly to communication methods and related devices and nodes supporting wireless communications.

Integrated Access Backhaul Networks
Protocol and Architecture Overview

3GPP is currently standardizing Integrated Access Backhaul (IAB) and wireless access in new radio (NR) in Rel-16 (RP-193251).

The usage of short range mmWave spectrum in NR creates a need for densified deployment with multi-hop backhauling. However, optical fiber to every base station will be too costly and sometimes not even possible (e.g., historical sites). The main IAB principle is the use of wireless links for the backhaul (instead of fiber) to enable flexible and very dense deployment of cells without the need for densifying the transport network. Use case scenarios for IAB can include coverage extension, deployment of massive number of small cells and fixed wireless access (FWA) (e.g., to residential/office buildings). The larger bandwidth available for NR in mmWave spectrum provides opportunity for self-backhauling, without limiting the spectrum to be used for the access links. On top of that, the inherent multi-beam and MIMO support in NR reduce cross-link interference between backhaul and access links allowing higher densification.

During the study item phase of the IAB work (summary of the study item can be found in the technical report TR 38.874), it has been agreed to adopt a solution that leverages the Central Unit (CU)/Distributed Unit (DU) split architecture of NR, where the IAB node will be hosting a DU part that is controlled by a central unit. The IAB nodes also have a Mobile Termination (MT) part that the IAB nodes use to communicate with their parent nodes.

The specifications for IAB strive to reuse existing functions and interfaces defined in NR. In particular, MT, gNB-DU, gNB-CU, UPF, AMF and SMF as well as the corresponding interfaces NR Uu (between MT and gNB), F1, NG, X2 and N4 are used as baseline for the IAB architectures. Modifications or enhancements to these functions and interfaces for the support of IAB will be explained in the context of the architecture discussion herein. Additional functionality such as multi-hop forwarding is included in the architecture discussion as it is necessary for the understanding of IAB operation and since certain aspects may require standardization.

The Mobile-Termination (MT) function has been defined as a component of the IAB node. In the context of this study, MT is referred to as a function residing on an IAB-node that terminates the radio interface layers of the backhaul Uu interface toward the IAB-donor or other IAB-nodes.

FIG. 1 shows a reference diagram for IAB in standalone mode, which contains one IAB-donor and multiple IAB-nodes. The IAB-donor is treated as a single logical node that comprises a set of functions such as gNB-DU, gNB-CU-CP, gNB-CU-UP and potentially other functions. In a deployment, the IAB-donor can be split according to these functions, which can all be either collocated or non-collocated as allowed by 3GPP NG-RAN architecture. IAB-related aspects may arise when such split is exercised. Also, some of the functions presently associated with the IAB-donor may eventually be moved outside of the donor in case it becomes evident that they do not perform IAB-specific tasks.

The baseline user plane and control plane protocol stacks for IAB are shown in FIGS. 2 and 3. These protocol stacks reuse the current CU-DU split specification in rel-15, where the full user plane F1-U (GTP-U/UDP/IP) is terminated at the IAB node (like a normal DU) and the full control plane F1-C (F1-AP/SCTP/IP) is also terminated at the IAB node (like a normal DU). In the above cases, Network Domain Security (NDS) has been employed to protect both UP and CP traffic (IPsec in the case of UP, and DTLS in the case of CP). IPsec could also be used for the CP protection instead of DTLS (in this case no DTLS layer would be used).

A new protocol layer called Backhaul Adaptation Protocol (BAP) has been introduced in the IAB nodes and the IAB donor, which is used for routing of packets to the appropriate downstream/upstream node and also mapping the UE bearer data to the proper backhaul RLC channel (and also between ingress and egress backhaul RLC channels in intermediate IAB nodes) to satisfy the end to end QoS requirements of bearers.

BAP Entities

On the IAB-node, the BAP sublayer contains one BAP entity at the MT function and a separate collocated BAP entity at the DU function. On the IAB-donor-DU, the BAP sublayer contains only one BAP entity. Each BAP entity has a transmitting part and a receiving part. The transmitting part of the BAP entity has a corresponding receiving part of a BAP entity at the IAB-node or IAB-donor-DU across the backhaul link.

FIG. 4 shows one example of the functional view of the BAP sublayer. This functional view should not restrict implementation. The figure is based on the radio interface protocol architecture defined in TS 38.300. In the example of FIG. 4, the receiving part on the BAP entity delivers BAP PDUs to the transmitting part on the collocated BAP entity. Alternatively, the receiving part may deliver BAP SDUs to the collocated transmitting part. When passing BAP SDUs, the receiving part removes the BAP header and the transmitting part adds the BAP header with the same BAP routing ID as carried on the BAP PDU header prior to removal. Passing BAP SDUs in this manner is therefore functionally equivalent to passing BAP PDUs, in implementation.

Services Provided to Upper Layers

The following services are provided by the BAP sublayer to upper layers:
data transfer;

Services Expected from Lower Layers

A BAP sublayer expects the following services from lower layers per RLC entity (for a detailed description see TS 38.322):
acknowledged data transfer service;
unacknowledged data transfer service.

Functions

The BAP sublayer supports the following functions:
Data transfer;
Determination of BAP destination and path for packets from upper layers;
Determination of egress BH RLC channels for packets routed to next hop;
Routing of packets to next hop;
Differentiating traffic to be delivered to upper layers from traffic to be delivered to egress link;
Flow control feedback and polling signalling.

Topology Adaptation Scenarios for Baseline Architecture

FIG. 5 shows an example of some possible IAB-node migration cases listed in the order of complexity and more details as follows:

Intra-CU Case (A): In this case the IAB-node (e) along with it serving UEs is moved to a new parent node (IAB-node (b)) under the same donor-DU (1). The successful intra-donor DU migration requires establishing UE context setup for the IAB-node (e) MT in the DU of the new parent node (IAB-node (b)), updating routing tables of IAB nodes along the path to IAB-node (e) and allocating resources on the new path. The IP address for IAB-node (e) will not change, while the F1-U tunnel/connection between donor-CU (1) and IAB-node (e) DU will be redirected through IAB-node (b).

Intra-CU Case (B): The procedural requirements/complexity of this case is the same as that of Case (A). Also, since the new IAB-donor DU (i.e., DU2) is connected to the same L2 network, the IAB-node (e) can use the same IP address under the new donor DU. However, the new donor DU (i.e., DU2) will need to inform the network using IAB-node (e) L2 address in order to get/keep the same IP address for IAB-node (e) by employing some mechanism such as Address Resolution Protocol (ARP).

Intra-CU Case (C): This case is more complex than Case (A) as it also needs allocation of new IP address for IAB-node (e). In case, IPsec is used for securing the F1-U tunnel/connection between the Donor-CU (1) and IAB-node (e) DU, then it might be possible to use existing IP address along the path segment between the Donor-CU (1) and SeGW, and new IP address for the IPsec tunnel between SeGW and IAB-node (e) DU.

Inter-CU Case (D): This is the most complicated case in terms of procedural requirements and may needs new specification procedures that are beyond the scope of 3GPP Rel-16.

Note that 3GPP Rel-16 has standardized procedure only for intra-CU migration, which is described below.

Intra-CU Topology Adaptation Procedure

During the intra-CU topology adaptation, both the source and the target parent node are served by the same IAB-donor-CU. The target parent node may use a different IAB-donor-DU than the source parent node. The source path may further have common nodes with the target path. FIGS. 6A and 6B show an example of the topology adaptation procedure, where the target parent node uses a different IAB-donor-DU than the source parent node.

In FIGS. 6A and 6B, the following processes are performed by the components illustrated in FIGS. 6A and 6B. At operation 1, The migrating IAB-MT sends a Measurement Report message to the source parent node gNB-DU. This report is based on a Measurement Configuration the migrating IAB-MT received from the IAB-donor-CU before.

At operation 2, the source parent node gNB-DU sends an UL RRC MESSAGE TRANSFER message to the IAB-donor-CU to convey the received Measurement Report.

At operation 3, the IAB-donor-CU sends a UE CONTEXT SETUP REQUEST message to the target parent node gNB-DU to create the UE context for the migrating IAB-MT and setup one or more bearers. These bearers are used by the migrating IAB-MT for its own data and signalling traffic.

At operation 4, the target parent node gNB-DU responds to the IAB-donor-CU with a UE CONTEXT SETUP RESPONSE message.

At operation 5, the IAB-donor-CU sends a UE CONTEXT MODIFICATION REQUEST message to the source parent node gNB-DU, which includes a generated RRCReconfiguration message. The Transmission Action Indicator in the UE CONTEXT MODIFICATION REQUEST message indicates to stop the data transmission to the migrating IAB-node.

At operation 6, the source parent node gNB-DU forwards the received RRCReconfiguration message to the migrating IAB-MT.

At operation 7, the source parent node gNB-DU responds to the IAB-donor-CU with the UE CONTEXT MODIFICATION RESPONSE message.

At operation 8, a Random Access procedure is performed at the target parent node gNB-DU.

At operation 9, the migrating IAB-MT responds to the target parent node gNB-DU with an RRCReconfigurationComplete message.

At operation 10, the target parent node gNB-DU sends an UL RRC MESSAGE TRANSFER message to the IAB-donor-CU to convey the received RRCReconfigurationComplete message. Also, uplink packets can be sent from the migrating IAB-MT, which are forwarded to the IAB-donor-CU through the target parent node gNB-DU. These DL and UL packets belong to the MT's own signalling and data traffic.

At operation 11, the IAB-donor-CU configures BH RLC channels and BAP-layer route entries on the target path between migrating IAB-node and target IAB-donor-DU. This step also includes allocation of TNL address(es) that is (are) routable via the target IAB-donor-DU. These configurations may be performed at an earlier stage, e.g., right after step 3. The new TNL address(es) is (are) included in the RRCReconfiguration message at operation 5.

At operation 12, all F1-U tunnels and F1-C are switched to use the migrating IAB-node's new TNL address(es).

At operation 13, the IAB-donor-CU sends a UE CONTEXT RELEASE COMMAND message to the source parent node gNB-DU.

At operation 14, the source parent node gNB-DU releases the migrating IAB-MT's context and responds the IAB-donor-CU with a UE CONTEXT RELEASE COMPLETE message.

At operation 15, the IAB-donor-CU releases BH RLC channels and BAP routing entries on the source path. The migrating IAB-node may further release the TNL address(es) it used on the source path.

NOTE: In case that the source route and target route have common nodes, the BH RLC channels and BAP routing entries of those nodes may not need to be released in operation 15.

NOTE: Operations 11, 12 and 15 also have to be performed for the migrating IAB-node's descendant nodes, as follows:

The descendant nodes must also switch to new TNL addresses that are anchored in the target IAB-donor-DU. The IAB-donor-CU may send these addresses to the descendant nodes and release the old addresses via corresponding RRC signalling.

If needed, the IAB-donor-CU configures BH RLC channels, BAP-layer route entries on the target path for the descendant nodes and the BH RLC Channel mappings on the descendant nodes in the same manner as described for the migrating IAB-node in step 11.

The descendant nodes switch their F1-U and F1-C tunnels to new TNL addresses that are anchored at the new IAB-donor-DU, in the same manner as described for the migrating IAB-node in step 12.

Based on implementation, these steps can be performed after or in parallel with the handover of the migrating IAB-node. In Rel-16, in-flight packets in UL direction that were dropped during the migration procedure may not be recoverable.

NOTE: In upstream direction, in-flight packets between the source parent node and the IAB-donor-CU can be delivered even after the target path is established.

NOTE: On-going downlink data in the source path may be discarded up to implementation.

NOTE: IAB-donor-CU can determine the unsuccessfully transmitted downlink data over the backhaul link by implementation.

Procedures in CU/DU Split Architecture

The following sub sections are taken from TS 38.401, describing the procedures between the CU and DU (as well as the CU-CP and CU-UP, in case the CU is split into a UP and CP functions).

FIG. 7, which is FIG. 8.9.2-1 of 3GPP TS 38.401, shows a procedure used to setup the bearer context in the gNB-CU-UP. The procedure is as follows:

Bearer context setup over F1-U

At operation 0, Bearer context setup (e.g., following an SGNB ADDITION REQUEST message from the MeNB) is triggered in gNB-CU-CP.

In operation 1, the gNB-CU-CP sends a BEARER CONTEXT SETUP REQUEST message containing UL TNL address information for S1-U or NG-U, and if required, DL TNL address information for X2-U or Xn-U to setup the bearer context in the gNB-CU-UP. For NG-RAN, the gNB-CU-CP decides flow-to-DRB mapping and sends the generated SDAP and PDCP configuration to the gNB-CU-UP.

In operation 2, the gNB-CU-UP responds with a BEARER CONTEXT SETUP RESPONSE message containing the UL TNL address information for F1-U, and DL TNL address information for S1-U or NG-U, and if required, UL TNL address information for X2-U or Xn-U.

NOTE: The indirect data transmission for split bearer through the gNB-CU-UP is not precluded.

In operation 3, F1 UE context setup procedure is performed to setup one or more bearers in the gNB-DU.

In operation 4, the gNB-CU-CP sends a BEARER CONTEXT MODIFICATION REQUEST message containing the DL TNL address information for F1-U and PDCP status.

In operation 5, the gNB-CU-UP responds with a BEARER CONTEXT MODIFICATION RESPONSE message.

Bearer Context Release Over F1-U gNB-CU-CP Initiated Bearer Context Release

FIG. 8, which corresponds to FIG. 8.9.3.1-1 of 3GPP TS 38.401, illustrates a procedure used to release the bearer context in the gNB-CU-UP initiated by the gNB-CU-CP.

At operation 0, bearer context release (e.g., following an SGNB RELEASE REQUEST message from the MeNB) is triggered in gNB-CU-CP.

In operation 1, the gNB-CU-CP sends a BEARER CONTEXT MODIFICATION REQUEST message to the gNB-CU-UP.

In operation 2, the gNB-CU-UP responds with a BEARER CONTEXT MODIFICATION RESPONSE carrying the PDCP UL/DL status.

In operation 3, a F1 UE context modification procedure is performed to stop the data transmission for the UE. It is up to gNB-DU implementation when to stop the UE scheduling.

NOTE: operations 1-3 are performed only if the PDCP status of the bearer(s) needs to be preserved e.g., for bearer type change.

In operation 4, the gNB-CU-CP may receive the UE CONTEXT RELEASE message from the MeNB in EN-DC operation as described in Section 8.4.2.1.

In operations 5 and 7, a bearer context release procedure is performed.

In operation 6, a F1 UE context release procedure is performed to release the UE context in the gNB-DU.

FIG. 9, which corresponds to FIG. 8.9.3.2-1 of 3GPP TS 38.401, illustrates a procedure used to release the bearer context in the gNB-CU-UP initiated by the gNB-CU-UP.

At operation 0, Bearer context release is triggered in gNB-CU-UP e.g., due to local failure.

In operation 1, the gNB-CU-UP sends a BEARER CONTEXT RELEASE REQUEST message to request the release of the bearer context in the gNB-CU-UP. This message may contain the PDCP status.

In operations 2.-5, if the PDCP status needs to be preserved, the E1 Bearer Context Modification and the F1 UE Context Modification procedures are performed. The E1 Bearer Context Modification procedure is used to convey data forwarding information to the gNB-CU-UP. The gNB-CU-CP may receive the UE Context Release from the MeNB.

In operation 6, the gNB-CU-CP sends a BEARER CONTEXT RELEASE COMMAND message to release the bearer context in the gNB-CU-UP.

In operation 7, the gNB-CU-UP responds with a BEARER CONTEXT RELEASE COMPLETE to confirm the release of the bearer context including also data forwarding information.

In operation 8, a F1 UE context release procedure may be performed to release the UE context in the gNB-DU.

Inter-gNB Handover Involving gNB-CU-UP Change

FIG. 10, which corresponds to FIG. 8.9.4-1 of 3GPP TS 38.401, illustrates a procedure used for inter-gNB handover involving gNB-CU-UP change. Overall inter-gNB handover procedure is specified in TS 37.340.

In operation 1, the source gNB-CU-CP sends HANDOVER REQUEST message to the target gNB-CU-CP.

In operations 2-4, bearer context setup procedure is performed as described in Section 8.9.2 of TS 38.402.

In operation 5, the target gNB-CU-CP responds to the source gNB-CU-CP with a HANDOVER REQUEST ACKNOWLEDGE message.

In operation 6, the F1 UE Context Modification procedure is performed to stop UL data transmission at the gNB-DU and to send the handover command to the UE.

In operations 7-8, bearer context modification procedure (gNB-CU-CP initiated) is performed to enable the gNB-CU-CP to retrieve the PDCP UL/DL status and to exchange data forwarding information for the bearer.

In operation 9, the source gNB-CU-CP sends an SN STATUS TRANSFER message to the target gNB-CU-CP.

In operations 10-11, bearer context modification procedure is performed as described in Section 8.9.2.

In operation 12, Data Forwarding may be performed from the source gNB-CU-UP to the target gNB-CU-UP.

In operations 13-15, Path Switch procedure is performed to update the DL TNL address information for the NG-U towards the core network.

In operation 16, the target gNB-CU-CP sends a UE CONTEXT RELEASE message to the source gNB-CU-CP.

In operations 17 and 19, bearer context release procedure is performed.

In operation 18, a F1 UE context release procedure is performed to release the UE context in the source gNB-DU.

FIG. 11, which is FIG. 8.9.5-1 of TS 38.402, illustrates a procedure for the change of gNB-CU-IP within a gNB.

In operation 1, a change of gNB-CU-UP is triggered in gNB-CU-CP based on e.g., measurement report from the UE.

In operations 2-3, a Bearer Context Setup procedure is performed as described in Section 8.9.2.

In operation 4, a F1 UE Context Modification procedure is performed to change the UL TNL address information for F1-U for one or more bearers in the gNB-DU.

In operations 5-6, a Bearer Context Modification procedure (gNB-CU-CP initiated) is performed to enable the gNB-CU-CP to retrieve the PDCP UL/DL status and to exchange data forwarding information for the bearer.

In operations 7-8, a Bearer Context Modification procedure is performed as described in Section 8.9.2.

In operation 9, Data Forwarding may be performed from the source gNB-CU-UP to the target gNB-CU-UP.

In operations 10-12, a Path Switch procedure is performed to update the DL TNL address information for the NG-U towards the core network.

In operations 13-14, a bearer Context Release procedure (gNB-CU-CP initiated) is performed as described in Section 8.9.3 of TS 38.402.

XN Procedures for Mobility

The following sections are taken from TS 38.423, showing the core messages/procedures and information elements that are used for mobility of UEs (these messages were referred above in many of the signalling diagrams)

Section 9.1.1.1 HANDOVER REQUEST

This message is sent by the source NG-RAN node to the target NG-RAN node to request the preparation of resources for a handover.

Direction: source NG-RAN node→target NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Source NG-RAN node UE XnAP ID reference | M | | NG-RAN node UE XnAP ID 9.2.3.16 | Allocated at the source NG-RAN node | YES | reject |
| Cause | M | | 9.2.3.2 | | YES | reject |
| Target Cell Global ID | M | | 9.2.3.25 | Includes either an E-UTRA CGI or an NR CGI | YES | reject |
| GUAMI | M | | 9.2.3.24 | | YES | reject |
| UE Context Information | | 1 | | | YES | reject |
| >NG-C UE associated Signalling reference | M | | AMF UE NGAP ID 9.2.3.26 | Allocated at the AMF on the source NG-C connection. | — | |
| >Signalling TNL association address at source NG-C side | M | | CP Transport Layer Information 9.2.3.31 | This IE indicates the AMF's IP address of the SCTP association used at the source NG-C interface instance. Note: If no UE TNLA binding exists at the source NG-RAN node, the source NG-RAN node indicates the TNL association address it would have | — | |

| IE/Group Name | Presence | Range | IE type and reference | Semantics description | Criticality | Assigned Criticality |
|---|---|---|---|---|---|---|
| | | | | selected if it would have had to create a UE TNLA binding. | | |
| >UE Security Capabilities | M | | 9.2.3.49 | | — | |
| >AS Security Information | M | | 9.2.3.50 | | — | |
| >Index to RAT/Frequency Selection Priority | O | | 9.2.3.23 | | — | |
| >UE Aggregate Maximum Bit Rate | M | | 9.2.3.17 | | — | |
| >PDU Session Resources To Be Setup List | | 1 | 9.2.1.1 | Similar to NG-C signalling, containing UL tunnel information per PDU Session Resource; and in addition, the source side QoS flow DRB mapping | — | |
| >RRC Context | M | | OCTET STRING | Either includes the Handover Preparation Information message as defined in subclause 10.2.2. of TS 36.331 [14], if the target NG-RAN node is an ng-eNB, or the Handover Preparation Information message as defined in subclause 11.2.2 of TS 38.331 [10], if the target NG-RAN node is a gNB. | — | |
| >Location Reporting Information | O | | 9.2.3.47 | Includes the necessary parameters for location reporting. | — | |
| >Mobility Restriction List | O | | 9.2.3.53 | | — | |
| Trace Activation | O | | 9.2.3.55 | | YES | ignore |
| Masked IMEISV | O | | 9.2.3.32 | | YES | ignore |
| UE History Information | M | | 9.2.3.64 | | YES | ignore |
| UE Context Reference at the S-NG-RAN node | O | | | | YES | ignore |
| >Global NG-RAN Node ID | M | | 9.2.2.3 | | — | |

| IE/Group Name | Presence | Range | IE type and reference | Semantics description | Criticality | Assigned Criticality |
|---|---|---|---|---|---|---|
| >S-NG-RAN node UE XnAP ID | M | | NG-RAN node UE XnAP ID 9.2.3.16 | | — | |

Section 9.1.1.2 HANDOVER REQUEST ACKNOWLEDGE

This message is sent by the target NG-RAN node to inform the source NG-RAN node about the prepared resources at the target.

Direction: target NG-RAN node→source NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Source NG-RAN node UE XnAP ID | M | | NG-RAN node UE XnAP ID 9.2.3.16 | Allocated at the source NG-RAN node | YES | ignore |
| Target NG-RAN node UE XnAP ID | M | | NG-RAN node UE XnAP ID 9.2.3.16 | Allocated at the target NG-RAN node | YES | ignore |
| PDU Session Resources Admitted List | M | | 9.2.1.2 | | YES | ignore |
| PDU Session Resources Not Admitted List | O | | 9.2.1.3 | | YES | ignore |
| Target NG-RAN node To Source NG-RAN node Transparent Container | M | | OCTET STRING | Either includes the Handover Command message as defined in subclause 10.2.2 of TS 36.331 [14], if the target NG-RAN node is an ng-eNB, or the Handover Command message as defined in subclause 11.2.2 of TS 38.331 [10], if the target NG-RAN node is a gNB. | YES | ignore |
| UE Context Kept Indicator | O | | 9.2.3.68 | | YES | ignore |
| Criticality Diagnostics | O | | 9.2.3.3 | | YES | ignore |
| DRBs transferred to MN | O | | DRB List 9.2.1.29 | In case of DC, indicates that SN Status is needed for the listed DRBs from the S-NG-RAN node. | YES | ignore |

HandoverCommand (from 38.331)
   This message is used to transfer the handover command as generated by the target gNB.
   Direction: target gNB to source gNB/source RAN.
HandoverCommand Message
   -- ASN1START
   -- TAG-HANDOVER-COMMAND-START
   HandoverCommand::=SEQUENCE {
      criticalExtensions CHOICE {
         c1 CHOICE{
         handoverCommand HandoverCommand-IEs,
         spare3 NULL, spare2 NULL, spare1 NULL
         },
         criticalExtensionsFuture SEQUENCE { }
      }
   }
   HandoverCommand-IEs::=SEQUENCE {
      handoverCommandMessage OCTET STRING (CONTAINING RRCReconfiguration),
      nonCriticalExtension SEQUENCE { }OPTIONAL
   }
   -- TAG-HANDOVER-COMMAND-STOP
   -- ASN1STOP

| HandoverCommand field descriptions |
| --- |
| handoverCommandMessage<br>Contains the RRCReconfiguration message used to perform handover within NR or handover to NR, as generated (entirely) by the target gNB. |

9.1.1.3 Handover Preparation Failure

This message is sent by the target NG-RAN node to inform the source NG-RAN node that the Handover Preparation has failed.

Direction: target NG-RAN node—source NG-RAN node.

| IE/Group Name | Presence | Range | IE type and reference | Semantics description | Criticality | Assigned Criticality |
| --- | --- | --- | --- | --- | --- | --- |
| Message Type | M | | 9.2.3.1 | | YES | reject |
| Source NG-RAN node UE XnAP ID | M | | NG-RAN node UE XnAP ID 9.2.3.16 | Allocated at the source NG-RAN node | YES | ignore |
| Cause | M | | 9.2.3.2 | | YES | ignore |
| Criticality Diagnostics | O | | 9.2.3.3 | | YES | ignore |

9.1.1.6 Handover Cancel

This message is sent by the source NG-RAN node to the target NG-RAN node to cancel an ongoing handover.

Direction: source NG-RAN node→target NG-RAN node.

| IE/Group Name | Presence | Range | IE type and reference | Semantics description | Criticality | Assigned Criticality |
| --- | --- | --- | --- | --- | --- | --- |
| Message Type | M | | 9.2.3.1 | | YES | ignore |
| Source NG-RAN node UE XnAP ID | M | | NG-RAN node UE XnAP ID 9.2.3.16 | Allocated at the source NG-RAN node. | YES | reject |

| IE/Group Name | Presence | Range | IE type and reference | Semantics description | Criticality | Assigned Criticality |
|---|---|---|---|---|---|---|
| Target NG-RAN node UE XnAP ID | O | | NG-RAN node UE XnAP ID 9.2.3.16 | Allocated at the target NG-RAN node. | YES | ignore |
| Cause | M | | 9.2.3.2 | | YES | ignore |

9.2.1.1 PDU Session Resources to be Setup List

This IE contains PDU session resource related information used at UE context transfer between NG-RAN nodes.

| IE/Group Name | Presence | Range | IE type and reference | Semantics description | Criticality | Assigned Criticality |
|---|---|---|---|---|---|---|
| PDU Session Resources To Be Setup List | | 1 | | | — | |
| >PDU Session Resources To Be Setup Item | | 1 ... <maxnoof PDU sessions> | | | | |
| >>PDU Session ID | M | | 9.2.3.18 | | — | |
| >>S-NSSAI | M | | 9.2.3.21 | | — | |
| >>PDU Session Resource Aggregate Maximum Bitrate | O | | PDU Session Aggregate Maximum Bit Rate 9.2.3.69 | This IE shall be present when at least one Non-GBR QoS Flow has been setup. | — | |
| >>UL NG-U UP TNL Information at UPF | M | | UP Transport Layer Information 9.2.3.30 | UPF endpoint of the NG-U transport bearer. For delivery of UL PDUS | | |
| >>Additional UL NG-U UP TNL Information at UPF List | O | | Additional UP Transport Layer Information 9.2.1.32 | Additional UPF endpoint of the NG-U transport bearer. For delivery of UL PDUS | YES | ignore |
| >>Source DL NG-U TNL Information | O | | UP Transport Layer Information 9.2.3.30 | Indicates the possibility to keep the NG-U GTP-U tunnel termination point at the target NG-RAN node. | | |
| >>Security Indication | O | | 9.2.3.52 | | — | |
| >>PDU Session Type | M | | 9.2.3.19 | | — | |
| >>Network Instance | O | | 9.2.3.85 | This IE is ignored if the Common Network Instance IE is present. | | |

| IE/Group Name | Presence | Range | IE type and reference | Semantics description | Criticality | Assigned Criticality |
|---|---|---|---|---|---|---|
| >>QoS Flows To Be Setup List | | 1 | | | — | |
| >>>QoS Flows To Be Setup Item | | 1 . . . <maxnoof QoSFlows> | | | — | |
| >>>>QoS Flow Identifier | M | | 9.2.3.10 | | — | |
| >>>>QoS Flow Level QoS Parameters | M | | 9.2.3.5 | | — | |
| >>>>E-RAB ID | O | | INTEGER (0 . . . 15, . . . ) | | — | |
| >>Data Forwarding and Offloading Info from source NG-RAN node | O | | 9.2.1.17 | | — | |
| >>Common Network Instance | O | | 9.2.3.92 | | YES | ignore |

9.2.1.2 PDU Session Resources Admitted List

This IE contains PDU session resource related information to report success of the establishment of PDU session resources.

| IE/Group Name | Presence | Range | IE type and reference | Semantics description | Criticality | Assigned Criticality |
|---|---|---|---|---|---|---|
| PDU Session Resources Admitted List | | 1 | | | — | |
| >PDU Session Resources Admitted Item | | 1 . . . <maxnoof PDUSessions> | | | — | |
| >>PDU Session ID | M | | 9.2.3.18 | | — | |
| >>PDU Session Resource Admitted Info | M | | | | — | |
| >>>DL NG-U TNL Information Unchanged | O | | ENUMERATED (True, . . . ) | Indicates the NG-U tunnels that have been kept unchanged at the target NG-RAN node | — | |
| >>>QoS Flows Admitted List | | 1 | | | — | |
| >>>>QoS Flows Admitted Item | | 1 . . . <maxnoof QoSFlows> | | | — | |
| >>>>>QoS Flow Identifier | M | | 9.2.3.10 | | — | |
| >>>QoS Flows not Admitted List | O | | QoS Flow List with Cause 9.2.1.4 | | — | |
| >>>Data Forwarding Info from target NG-RAN node | O | | 9.2.1.16 | | — | |

-continued

| IE/Group Name | Presence | Range | IE type and reference | Semantics description | Criticality | Assigned Criticality |
|---|---|---|---|---|---|---|
| >>>Secondary Data Forwarding Info from target NG-RAN node List | O | | 9.2.1.31 | This IE would be present only when the target M-NG-RAN node decide to split a PDU session between MN and SN | YES | ignore |

| Range bound | Explanation |
|---|---|
| maxnoofPDUSessions | Maximum no. of PDU sessions. Value is 256 |
| maxnoofQoSFlows | Maximum no. of QoS flows allowed within one PDU session. Value is 64. |

9.2.1.3 PDU Session Resources not Admitted List

This IE contains a list of PDU session resources which were not admitted to be added or modified.

| IE/Group Name | Presence | Range | IE type and reference | Semantics description |
|---|---|---|---|---|
| PDU Session Resources Not Admitted List | | 1 | | |
| >PDU Session Resources Not Admitted Item | | 1 . . . <maxnoofPDUSessions> | | |
| >>PDU Session ID | M | | 9.2.3.18 | |
| >>Cause | O | | 9.2.3.2 | |

| Range bound | Explanation |
|---|---|
| maxnoofPDUSessions | Maximum no. of PDU sessions. Value is 256 |

9.2.3.10 QoS Flow Identifier

This IE identifies a QoS Flow within a PDU Session. Definition and use of the QoS Flow Identifier is specified in TS 23.501.

| IE/Group Name | Presence | Range | IE type and reference | Semantics description |
|---|---|---|---|---|
| QoS Flow Identifier | M | | INTEGER (0 . . . 63, . . . ) | |

F1 Signaling and Procedures

This sub sections are taken from TS 38.473

9.2.3 RRC Message Transfer Messages 9.2.3.1 Initial UL RRC Message Transfer

This message is sent by the gNB-DU to transfer the initial layer 3 message to the gNB-CU over the F1 interface.

Direction: gNB-DU→gNB-CU

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| gNB-DU UE F1AP ID | M | | 9.3.1.5 | | YES | reject |
| NR CGI | M | | 9.3.1.12 | NG-RAN Cell Global Identifier (NR CGI) | YES | reject |
| C-RNTI | M | | 9.3.1.32 | C-RNTI allocated at the gNB-DU | YES | reject |
| RRC-Container | M | | 9.3.1.6 | Includes the UL-CCCH-Message IE as defined in subclause 6.2 of TS 38.331 [8]. | YES | reject |
| DU to CU RRC Container | O | | OCTET STRING | CellGroup Config IE as defined in subclause 6.3.2 in TS 38.331 [8]. Required at least to carry SRB1 configuration. The Reconfiguration WithSync field is not included in the CellGroup Config IE. | YES | reject |
| SUL Access Indication | O | | ENUMERATED (true, . . . ) | | YES | ignore |
| Transaction ID | M | | 9.3.1.23 | | YES | Ignore |
| RAN UE ID | O | | OCTET STRING (SIZE (8)) | | YES | ignore |
| RRC-Container-RRCSetup Complete | O | | 9.3.1.6 | Includes the UL-DCCH-Message IE including the RRCSetup Complete message, as defined in subclause 6.2 of TS 38.331 | YES | ignore |

9.2.3.2 DL RRC Message Transfer

This message is sent by the gNB-CU to transfer the layer 3 message to the gNB-DU over the F1 interface.

Direction: gNB-CU→gNB-DU

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| gNB-CU UE F1AP ID | M | | 9.3.1.4 | | YES | reject |
| gNB-DU UE F1AP ID | M | | 9.3.1.5 | | YES | reject |
| old gNB-DU UE F1AP ID | O | | 9.3.1.5 | | YES | reject |
| SRB ID | M | | 9.3.1.7 | | YES | reject |
| Execute Duplication | O | | ENUMERATED (true, . . . ) | | YES | ignore |

-continued

| IE/Group Name | Presence | Range | IE type and reference | Semantics description | Criticality | Assigned Criticality |
|---|---|---|---|---|---|---|
| RRC-Container | M | | 9.3.1.6 | Includes the DL-DCCH-Message IE as defined in subclause 6.2 of TS 38.331 [8] encapsulated in a PDCP PDU, or the DL-CCCH-Message IE as defined in subclause 6.2 of TS 38.331 [8]. | YES | reject |
| RAT-Frequency Priority Information | O | | 9.3.1.34 | | YES | reject |
| RRC Delivery Status Request | O | | ENUMERATED (true, . . . ) | Indicates whether RRC DELIVERY REPORT procedure is requested for the RRC message. | YES | ignore |
| UE Context not retrievable | O | | ENUMERATED (true, . . . ) | | YES | reject |
| Redirected RRC message | O | | RRC Container 9.3.1.6 | Includes the UL-DCCH-Message IE as defined in subclause 6.2 of TS 38.331 [8], encapsulated in a PDCP PDU. | YES | reject |
| PLMN Assistance Info for Network Sharing | O | | PLMN Identity 9.3.1.14 | | YES | ignore |
| New gNB-CU UE F1AP ID | O | | gNB-CU UE F1AP ID 9.3.1.4 | | YES | reject |
| Additional RRM Policy Index | O | | 9.3.1.90 | | YES | ignore |

9.2.3.3 UL RRC Message Transfer

This message is sent by the gNB-DU to transfer the layer 3 message to the gNB-CU over the F1 interface.

Direction: gNB-DU □gNB-CU

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| gNB-CU UE F1AP ID | M | | 9.3.1.4 | | YES | reject |
| gNB-DU UE F1AP ID | M | | 9.3.1.5 | | YES | reject |
| SRB ID | M | | 9.3.1.7 | | YES | reject |
| RRC-Container | M | | 9.3.1.6 | Includes the UL-DCCH-Message IE as defined in subclause 6.2 of TS 38.331 [8], encapsulated in a PDCP PDU. | YES | reject |

-continued

| IE/Group Name | Presence | Range | IE type and reference | Semantics description | Criticality | Assigned Criticality |
|---|---|---|---|---|---|---|
| Selected PLMN ID | O | | PLMN Identity 9.3.1.14 | | YES | reject |
| New gNB-DU UE F1AP ID | O | | gNB-DU UE F1AP ID 9.3.1.5 | | YES | reject |

9.2.3.4 RRC Delivery Report

This message is sent by the gNB-DU to inform the gNB-CU about the delivery status of DL RRC messages.

Direction: gNB-DU ☐ gNB-CU

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| gNB-CU UE F1AP ID | M | | 9.3.1.4 | | YES | reject |
| gNB-DU UE F1AP ID | M | | 9.3.1.5 | | YES | reject |
| RRC Delivery Status | M | | 9.3.1.71 | | YES | ignore |
| SRB ID | M | | 9.3.1.7 | | YES | ignore |

SUMMARY

As mentioned above, 3GPP Rel-16 has standardized only IAB intra-CU migration procedure. Considering that inter-CU migration will be an important feature of IAB Rel-17 WI, certain enhancements to existing UE handover and IAB intra-CU migration procedure are required for reducing service interruption (due to IAB-node migration) and signaling load.

Consider the IAB network scenario shown in FIG. 12, where IAB 3 is being migrated from donor CU1 to CU2 (and parent node IAB1 to IAB2). Even though only the IAB-3 MT is actually changing the radio towards the new parent (IAB-2 DU), all the UEs and IAB nodes that are directly or indirectly served by the IAB-3 have to also receive a handover command (i.e. an RRC Reconfiguration message containing reconfigurationWithSync) for changing the security keys as their context is relocated, even if they are still connected to the same IAB node as before (the 3GPP security specifications mandate a security key change whenever the PDCP termination point changes).

Currently, there is no specified group handover procedure, and thus it is not clear how and when the handover command to the individual IAB-MTs and UEs are sent. This especially becomes problematic when the migrating IAB node is not a leaf node (i.e., when it serves other IAB nodes under it).

According to some embodiments of inventive concepts, a method by a first network node, operating as a target donor central unit in an Integrated access backhaul, IAB network, serving as a candidate donor node for a migrating IAB node and providing connectivity for a user equipment, UE is provided. The method includes receiving a message for IAB handover from a second network node, the message including contexts of the migrating IAB node and user equipments, UEs, and IAB nodes that are directly or indirectly served by the migrating IAB node. The method includes performing admission control for the UEs and IAB nodes included in the message. The method includes preparing a handover command to a mobile termination, MT, of the migrating IAB node, and each UE and MT of IAB nodes that are directly or indirectly served by the migrating IAB node. The method includes generating a group handover command that recursively contains handover commands of all UEs and MTs of IAB nodes that are directly or indirectly served by the migrating IAB node. The method includes preparing and sending a handover acknowledge message to the second network node, the handover acknowledge message including a list of admitted and not admitted protocol data units, PDU, session resources that are associated with the UEs and IAB nodes and containing the group handover command. The method includes receiving a Radio Resource Control, RRC, Reconfiguration Complete message corresponding to an MT of the migrating IAB node and/or an MT of any IAB node and/or UE that are directly or indirectly served by the migrating IAB node.

Network nodes, computer programs, and computer program products are also provided that perform analogous operations.

The inventive concepts provide signalling enhancements needed to enable the handover of an IAB node and associated UEs and IAB node, specifically on the communication of the handover command to the IAB-MTs and UEs. The inventive concepts not only enable this, but do so in an optimal way where only one handover command, that recursively contains the handover commands of all the UEs and IAB nodes that are directly/indirectly served by the migrating IAB node, is sent to the migrating IAB node, and further propagated down the chain until each concerned IAB node/UE is handed over. Advantages that may be acquired is the reduction of the total handover/relocation delay of an IAB node and its associated UEs, potentially preventing performance degradation that could have experienced to the active traffic of the concerned UEs.

According to other embodiments of inventive concepts, method by a migrating integrated access backhaul (IAB) node, being handed over to a first network node from a second network node is provided. The method includes receiving a handover command from the first network node, via the second network node, the handover command comprising a group handover command to a mobile termination, MT, of the migrating IAB node and handover commands to child user equipments, UEs, and to MTs of child IAB nodes. The method includes executing the handover command corresponding to the MT of the migrating IAB node. The method includes relocating an F1 connection to the first network node. The method includes forwarding, to each child UE and child IAB node, a corresponding handover command from within the group handover command.

IAB nodes, computer programs, and computer program products are also provided that perform analogous operations.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 17-19 are flow charts illustrating operations of a network node according to some embodiments of inventive concepts;

FIGS. 20-21 are flow charts illustrating operations of a migrating IAB node according to some embodiments of inventive concepts;

FIG. 27 is a block diagram of methods implemented in a communication system including a host computer, a base station and a user equipment in accordance with some embodiments;

FIG. 28 is a block diagram of methods implemented in a communication system including a host computer, a base station and a user equipment in accordance with some embodiments;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The inventive concepts provide mechanisms for handling the signalling of the handover commands to the IAB nodes MT's and UE's that are impacted by the handover of a parent IAB node. Specifically, a recursive approach is proposed whereby:

The target node prepares the handover command (i.e., RRC Reconfiguration containing reconfigurationWithSync) for each affected UE and IAB-MT In the handover command related to an IAB-MT, a message is encapsulated that contains all the handover commands of the UEs and children IAB-MTs (which further contains the handover commands of the UEs and children IAB-MTs under each IAB-MT, and so on)

The target node includes this superimposed set of handover commands in the HANDOVER REQUEST ACKNOWLEDGE message.

These inventive concepts provide signaling enhancements needed to enable the handover of an IAB node and associated UEs and IAB node, specifically on the communication of the handover command to the IAB-MTs and UEs. The methods not only enable this, but do so where only one handover command, that recursively contains the handover commands of all the UEs and IAB nodes that are directly/indirectly served by the migrating IAB node, is sent to the migrating IAB node, and further propagated down the chain until each concerned IAB node/UE is handed over. This will reduce the total handover/relocation delay of an IAB node and its associated UEs, potentially preventing performance degradation that could have experienced to the active traffic of the concerned UEs.

Approaches are described below on how to handle handover of an IAB node and associated UEs and IAB node.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 14:
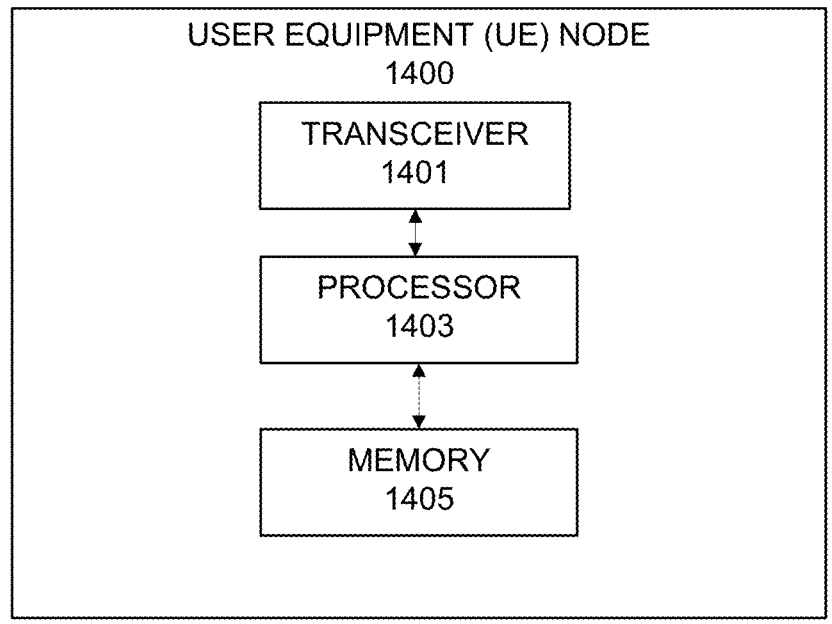
FIG. 14 is a block diagram illustrating a user equipment according to some embodiments of inventive concepts.

Prior to discussing the approaches, FIG. 14 depicts an example of a UE 1400 of a wireless communication network configured to provide wireless communication according to embodiments of inventive concepts. As shown, the UE 1400 may include transceiver circuitry 1401 (also referred to as a transceiver) including a transmitter and a receiver configured to provide uplink and downlink radio communications with wireless devices. The UE 1400 may also include a processor circuitry 1403 (also referred to as a processor) coupled to the transceiver circuitry 1401, and a memory circuitry 1405 (also referred to as memory) coupled to the processor circuitry 1403. The memory circuitry 1405 may include computer readable program code that when executed by the processor circuitry 1403 causes the processor circuit to perform operations according to embodiments disclosed herein. According to other embodiments, processor circuitry 1403 may be defined to include memory so that a separate memory circuit is not required.

As discussed herein, operations of the UE 1400 may be performed by processor 1403 and/or transceiver 1401. For example, the processor 1403 may control transceiver 1401 to transmit uplink communications through transceiver 1401 over a radio interface to one or more network nodes and/or to receive downlink communications through transceiver 1401 from one or more network nodes over a radio interface. Moreover, modules may be stored in memory 1405, and these modules may provide instructions so that when instructions of a module are executed by processor 1403, processor 1403 performs respective operations (e.g., operations discussed herein with respect to example embodiments).

Accordingly, a UE 1400 according to some embodiments includes processor circuitry 1403, a transceiver 1401 coupled to the processor circuitry 1403, and a memory 1405 coupled to the processor circuitry, the memory including machine readable program instructions that, when executed by the processor circuitry, cause the UE to perform operations.

Figure 15:
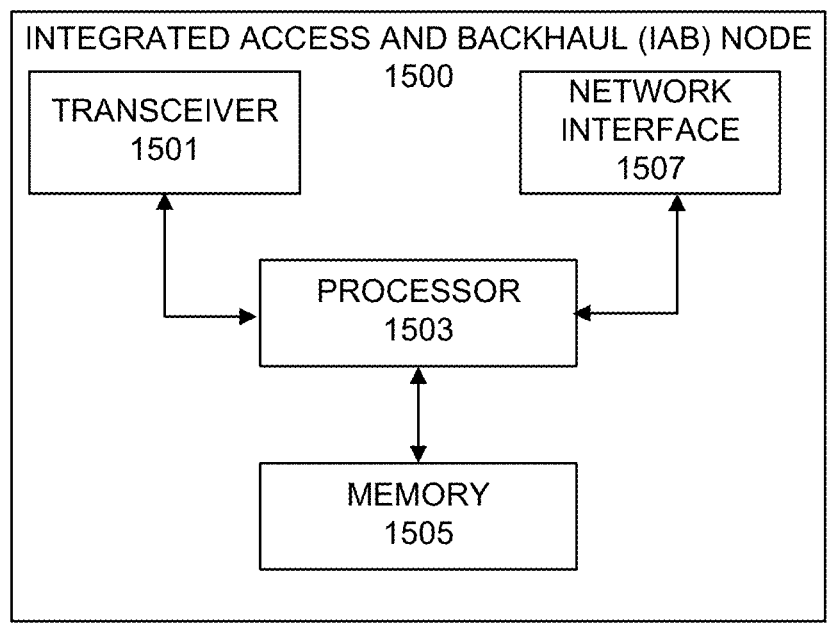
FIG. 15 is a block diagram illustrating an integrated access and backhaul (IAB) node according to some embodiments of inventive concepts.

FIG. 15 is a block diagram of an IAB node 1500 according to some embodiments. Various embodiments provide an IAB node that includes processor circuitry 1503, a transceiver 1501 coupled to the processor circuitry, and a memory 1503 coupled to the processor circuitry. The memory 1505 includes machine-readable computer program instructions that, when executed by the processor circuitry, cause the processor circuitry 1503 to perform some of the operations depicted in FIGS. 17-21.

FIG. 15 depicts an example of an IAB node 1500 (also referred to as a base station, eNB, eNodeB, gNB, gNodeB, etc.) of a communication network configured to provide communication according to embodiments of inventive concepts. The IAB node 1500 may correspond to a central unit, a radio unit or a combination of a central unit and a radio unit in a RAN node. As shown, IAB node 1500 may include transceiver circuit 1501 (also referred to as a transceiver) including a transmitter and a receiver configured to provide uplink and downlink radio communications with wireless devices. The IAB node 1500 may include a network interface circuit 1507 (also referred to as a network interface) configured to provide communications with other nodes (e.g., with other IAB nodes, base stations and/or core network nodes) of the wireless communication network. The IAB node 1500 may also include processor circuitry 1503 (also referred to as a processor) coupled to the transceiver circuitry 1501, and memory circuitry 1505 (also referred to as memory) coupled to the processor circuitry 1503. The memory circuitry 1505 may include computer readable program code that when executed by the processor circuitry 1503 causes the processor circuitry 1503 to perform operations according to embodiments disclosed herein. According to other embodiments, processor circuitry 1503 may be defined to include memory so that a separate memory circuit is not required.

As discussed herein, operations of the IAB node 1500 may be performed by processor 1503, network interface 1507, and/or transceiver 1501. For example, processor 1503 may control transceiver 1501 to transmit downlink communications through transceiver 1501 over a radio interface to one or more UEs and/or to receive uplink communications through transceiver 1501 from one or more UEs over a radio interface. Similarly, processor 1503 may control network interface 1507 to transmit communications through network interface 1507 to one or more other IAB nodes and/or to receive communications through network interface from one or more other IAB nodes. Moreover, modules may be stored in memory 1505, and these modules may provide instructions so that when instructions of a module are executed by processor 1503, processor 1503 performs respective operations (e.g., operations discussed below with respect to example embodiments).

Accordingly, an IAB node 1500 according to some embodiments includes processor circuitry 1503, a transceiver 1503 coupled to the processor circuitry, and a memory 1505 coupled to the processor circuitry, the memory including machine readable program instructions that, when executed by the processor circuitry, cause the IAB node 1500 to perform some of the operations depicted in FIGS. 17-21.

Figure 16:
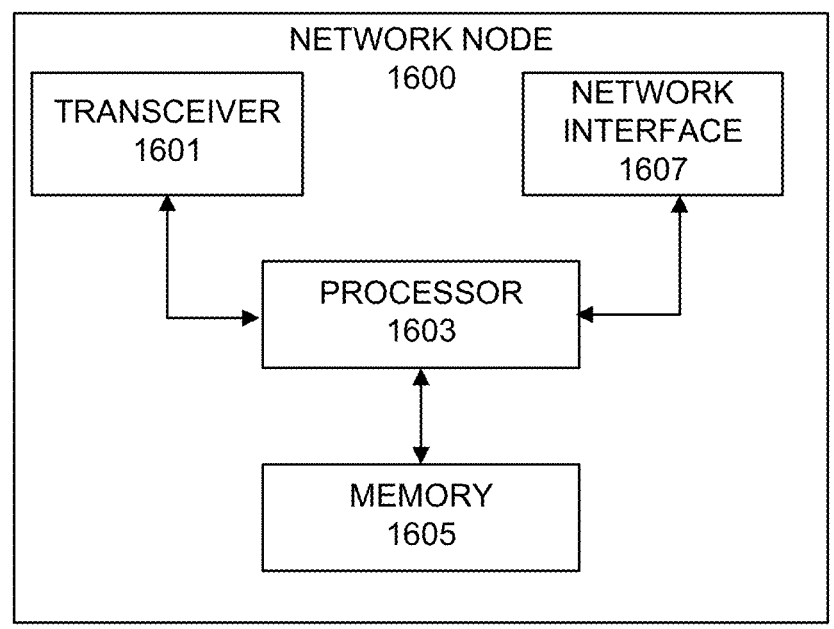
FIG. 16 is a block diagram illustrating a network node according to some embodiments of inventive concepts.

FIG. 16 depicts an example of a network node 1600 (also referred to as a base station, eNB, eNodeB, gNB, gNodeB, etc.) of a communication network configured to provide communication according to embodiments of inventive concepts. The network node 1600 may correspond to a central unit, a radio unit or a combination of a central unit and a radio unit in a RAN node. As shown, network node 1600 may include transceiver circuit 1601 (also referred to as a transceiver) including a transmitter and a receiver configured to provide uplink and downlink radio communications with wireless devices. The network node 1600 may include a network interface circuit 1607 (also referred to as a network interface) configured to provide communications with other nodes (e.g., with network nodes, IAB nodes, base stations and/or core network nodes) of the wireless communication network. The network node 1600 may also include processor circuitry 1603 (also referred to as a processor) coupled to the transceiver circuitry 1601, and memory circuitry 1605 (also referred to as memory) coupled to the processor circuitry 1603. The memory circuitry 1605 may include computer readable program code that when executed by the processor circuitry 1603 causes the processor circuitry 1603 to perform operations according to embodiments disclosed herein. According to other embodiments, processor circuitry 1603 may be defined to include memory so that a separate memory circuit is not required.

As discussed herein, operations of the network node 1600 may be performed by processor 1603, network interface 1607, and/or transceiver 1601. For example, processor 1603 may control transceiver 1601 to transmit downlink communications through transceiver 1601 over a radio interface to one or more UEs and/or to receive uplink communications through transceiver 1602 from one or more UEs over a radio interface. Similarly, processor 1603 may control network interface 1607 to transmit communications through network interface 1607 to one or more IAB nodes and/or to receive communications through network interface from one or more other IAB nodes. Moreover, modules may be stored in memory 1605, and these modules may provide instructions so that when instructions of a module are executed by processor 1603, processor 1603 performs respective operations (e.g., operations discussed below with respect to example embodiments).

Accordingly, a network node 1600 according to some embodiments includes processor circuitry 1603, a transceiver 1603 coupled to the processor circuitry, and a memory 1605 coupled to the processor circuitry, the memory including machine readable program instructions that, when executed by the processor circuitry, cause the network node 1600 to perform some of the operations depicted in FIGS. 17-21.

The inter-CU IAB node migration may be caused by e.g., RLF, load balancing, IAB node mobility, etc. These are non-limiting examples.

The terms "migration," "handover," and "mobility" are used interchangeably.

The terms "gNB-CU" and "Donor-CU", "CU-CP" and "CU" are used interchangeably.

All considerations for a split donor (i.e., donor CU) are equally applicable for a non-split donor (i.e., donor gNB).

The term "gNB" applies to all variants therein, e.g., "gNB", "en-gNB" etc.

Unless otherwise specified, the term "handover command" refers to an RRCReconfiguration message that includes the reconfigurationWIthSync The term "a UE/IAB node directly served by the migrating IAB node" refers to a UE/IAB node that is directly connected to the migrating IAB node.

The term "a UE/IAB node is indirectly served by the migrating IAB node" means that the migrating IAB node is an ancestor node to an IAB node that is currently serving the UE or IAB node.

The term concerned UE/IAB node refers to a UE/IAB node that is directly/indirectly being served by the migrating IAB node.

Though the inventive concepts are described from an IAB network perspective, most of the enhancements, such as group signalling of handover commands and reconfiguration complete messages (via DL and UL RRC message transfer like messages, respectively) are applicable even for a non-IAB scenario (i.e., just a CU/DU split case, where several UEs are directly connected to the DU, and several DL/UL RRC messages are to be transmitted to/received from several UEs).

A method for a first network node, operating as a target donor central unit (e.g., Donor-CU) in an Integrated access backhaul (IAB) network, serving as a candidate donor node for an IAB node (migrating IAB node) and providing connectivity for a user equipment (UE), shall now be described.

Figure 17:
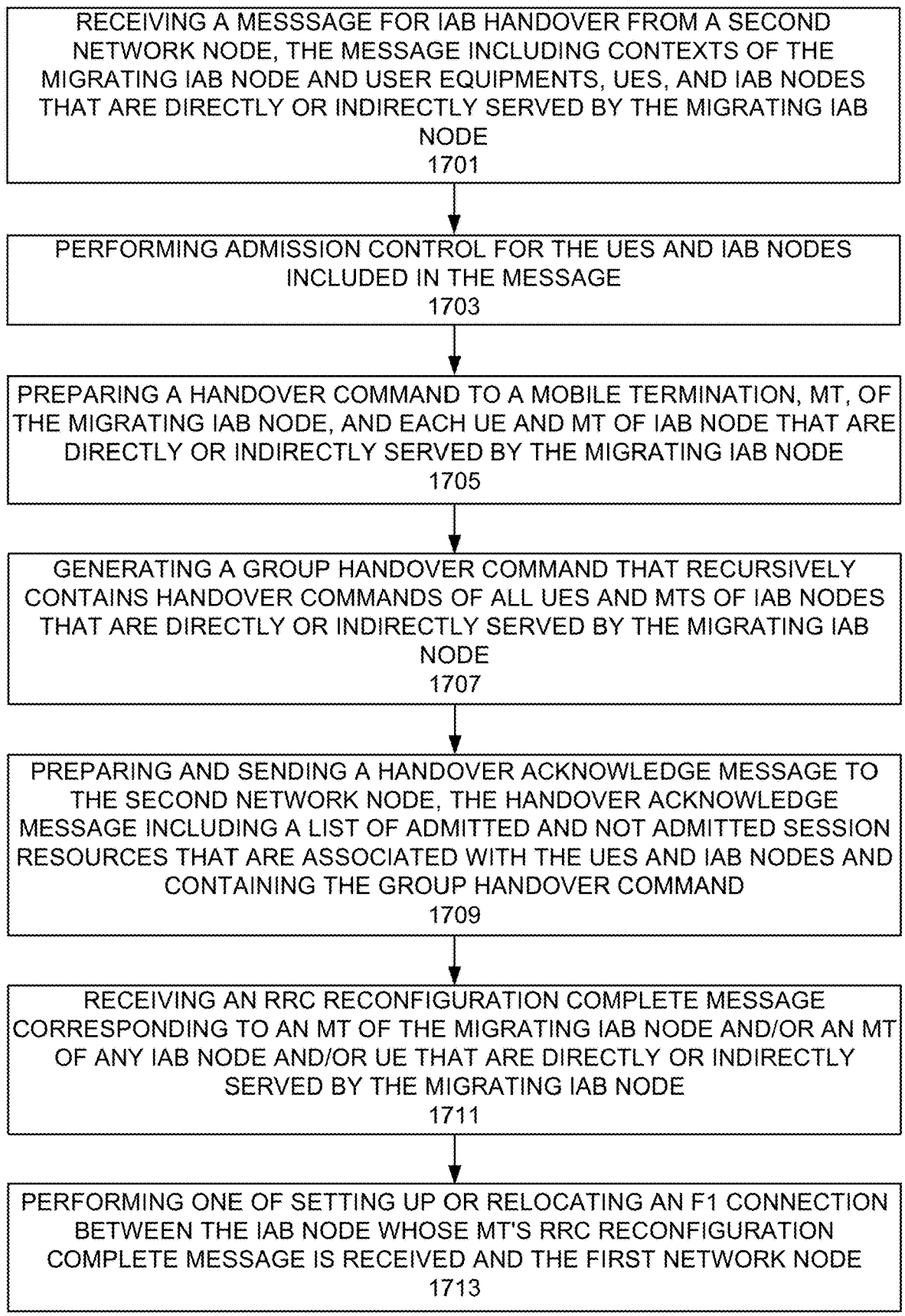

Turning to FIG. 17, in block 1701, the processing circuitry 1603 of the first network node 1600 receives a HANDOVER REQUEST-like message (either an enhanced version of the legacy Xn message or a new message for IAB handover) from a second network node. The message includes the contexts of the migrating IAB node as well as UEs and IAB nodes that are directly or indirectly served by the migrating IAB node.

The processing circuitry 1603 of first network node 1600 performs admission control for the UEs and IAB nodes included in the handover request in block 1703. Admission control regulates the entering connections such as the UEs and IAB nodes included in the handover request.

Figure 12:
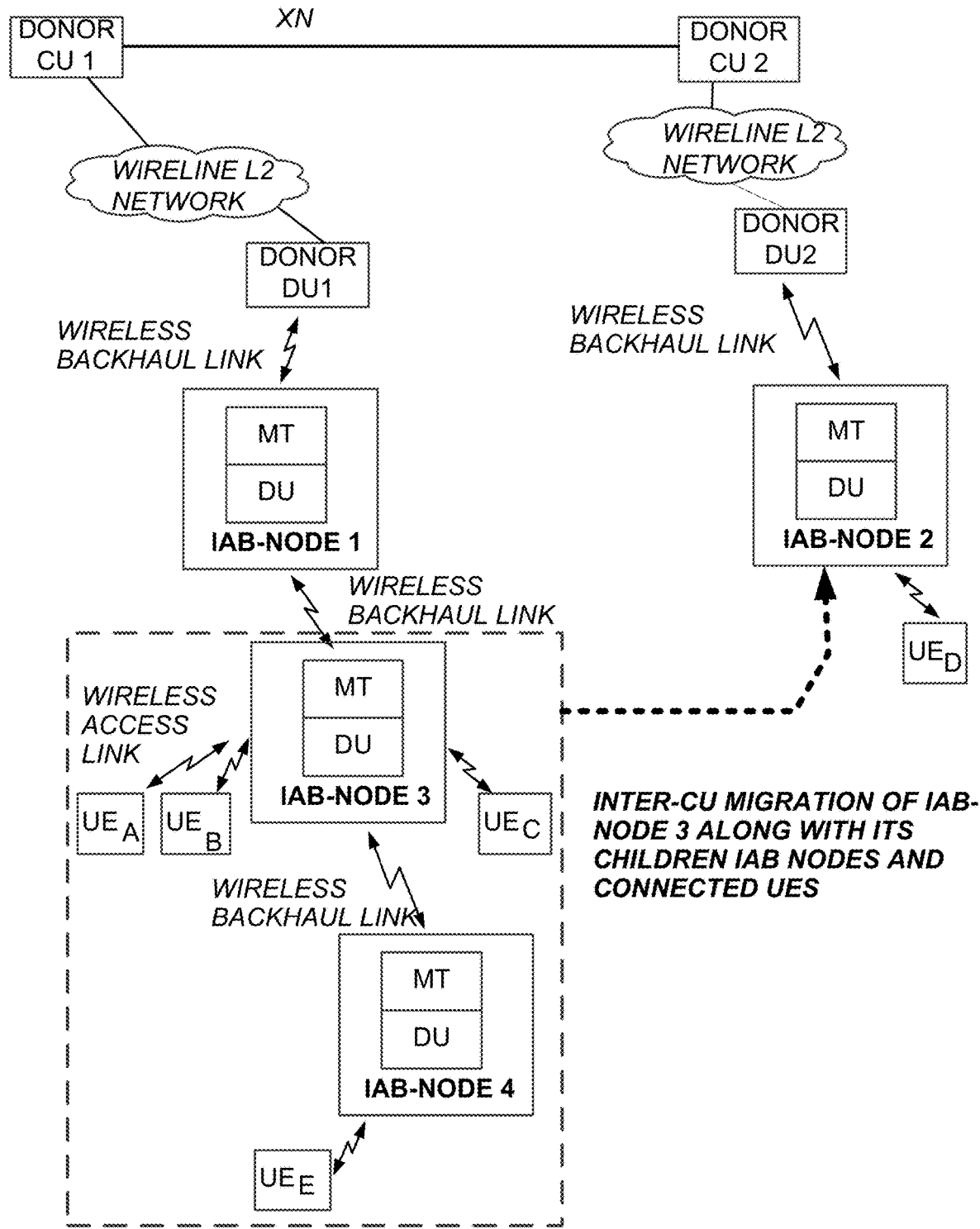
FIG. 12 illustrates an example of an IAB network scenario according to some embodiments.

In block 1705, the processing circuitry 1603 of first network node 1600 prepares a handover command (i.e., RRCReconfiguration containing reconfigurationWithSync) to the MT of each UE and IAB node that is directly or indirectly affected (e.g., served) by the migration (e.g., for the scenario of FIG. 12, the MT's of IAB3 and IAB4, and UEs a, b, c and e)

In block 1707, the processing circuitry 1603 of first network node 1600 generates (e.g., constructs) a group (i.e., an overall) handover command that recursively contains handover commands of all UEs and MTs of IAB nodes that are directly or indirectly served by the migrating IAB node. Generating the group handover command can be as follows:

For each hop (starting from the hop where the leaf nodes under the subtree below the migrating IAB node, i.e., where the IAB nodes with no children nodes are located, and ending when the level of the migrating IAB node's is treated):

for each IAB node in that hop, or if the hop corresponds to the migrating IAB node's level for the migrating IAB node (the concerned IAB node is referred to as IABx below for the sake of brevity), updating the handover command prepared for the MT of the IAB node including the handover command prepared for each UE and MT of each child IAB node the IAB node is serving.

Turing to FIG. 18, the updating of the handover command can be done in one of the following ways:

In block 1801, the processing circuitry 1603 can encapsulate each UE/MT's handover command directly in the handover command prepared for the MT of IABx (e.g., in an IE that is a list containing UE identifiers and corresponding OCTET STRING containing the handover command corresponding to the indicated UE).

In block 1803, the processing circuitry 1601 can embed an F1 message in the handover command prepared for the MT of IABx, where this F1 message contains all the handover commands for the concerned UEs/MTs (e.g., a modified F1AP DL RRC MESSAGE TRANSFER or a new non-UE associated F1AP message for that purpose, being able to carry a list of handover commands.

In block 1805, the processing circuitry 1601 can encapsulate a list of F1 DL RRC MESSAGE TRANSFER messages in the handover command for the MT of IABx, each message containing the handover command to each UE/MT.

For the example scenario of FIG. 12, after the completion of block 1702, according to the realizations above, the handover command to IAB-MT will look like:

Corresponding to realization of block 1801:
[RRC Reconfiguration to IAB3 MT
 [UEa identifier: RRC Reconfiguration to UEa,
  UEb identifier: RRC Reconfiguration to UEb,
  UEc identifier: RRC Reconfiguration to UEc,
  IAB4-MT identifier: RRC Reconfiguration to IAB4 MT
   [UEe identifier: RRC Reconfiguration to UEe]
  ]
]
Corresponding to realization of block 1803:
[RRC Reconfiguration to IAB3 MT
 [F1-AP message:
  UEa identifier: RRC Reconfiguration to UEa,
  UEb identifier: RRC Reconfiguration to UEb,
  UEc identifier: RRC Reconfiguration to UEc, IAB4-MT identifier: RRC Reconfiguration to IAB4 MT
[F1-AP message:
UEe identifier: RRC Reconfiguration to UEe
]
]
]
Corresponding to realization of block 1805:
[RRC Reconfiguration to IAB3 MT
[F1-AP message: [UEa identifier: RRC Reconfiguration to UEa]],
[F1-AP message: [UEb identifier: RRC Reconfiguration to UEb]],
[F1-AP message: [UEc identifier: RRC Reconfiguration to UEc]],
[F1-AP message: [
IAB4-MT identifier: RRC Reconfiguration to IAB4MT
[
[F1-AP message:
[UEe identifier: RRC Reconfiguration to UEe]
]
]
]
]

Returning to FIG. 17, the processing circuitry 1603 in block 1709 prepares and sends a HANDOVER REQUEST ACKNOWLEDGE-like message (either an enhanced version of the legacy F1 message or a new message for IAB handover) to the second network node that includes the list of admitted and not admitted PDU (protocol data units) session resources that are associated with the concerned UEs and IAB nodes, and containing the handover command for the migrating IAB node (e.g. IAB3-MT for the scenario in FIG. 12) that contains (recursively) all the handover commands of all the UEs/IAB nodes that are directly or indirectly served by the migrating IAB node, as prepared in steps 1705 and 1707.

In block 1711, the processing circuitry 1603 receives an RRC Reconfiguration Complete message corresponding to the migrating IAB node's MT (e.g., IAB-3 MT), or/and any child IAB node (e.g., IAB4-MT) or UE.

Turing to FIG. 19, the receiving of the RRC Reconfiguration Complete message can be received in one of the following ways:

In block 1901, the processing circuitry 1603 can receive each Reconfiguration Complete message in a separate F1-AP UL RRC message transfer message.

In block 1903, the processing circuitry 1603 can receive one UL RRC message transfer like message (an enhanced version of the legacy F1-AP message or a new message defined for that purpose) for each IAB node being migrated, where each message contains the RRC complete messages of all the UEs and IAB-MT under that IAB node). (e.g., referring to FIG. 12, an UL RRC message transfer message from IAB3 sent to CU2 that contains the complete messages from UEa, UEb, UEc and IAB4-MT, another message that contains the complete message from UEe sent from IAB4 to CU2)

In block 1905, the processing circuitry 1603 can receive a single UL RRC message transfer like message (an enhanced version of the legacy F1-AP message or a new message defined for that purpose) that contains all the reconfiguration complete messages of all the migrating IAB nodes and UE (this could be in a recursive structure similar to the way the overall handover command was constructed in block 1707, or it could be just a list of UE/MT identities and their corresponding complete messages).

Returning to FIG. 17, in block 1713, the processing circuitry 1603 can set up/relocate the F1 connection between the IAB node whose MT's RRC Reconfiguration message is received in block 1711 (it should be noted that the F1 relocation could be done implicitly as part of the previous blocks by communicating the information of the target CU to the IAB node and vice versa).

Various operations from the flow chart of FIG. 16 may be optional with respect to some embodiments of network nodes and related methods. Regarding methods of example embodiment 1 (set forth below), for example, operations of blocks 1713 of FIG. 17 may be optional.

Various other embodiments of inventive concepts provide a method for an integrated access backhaul (IAB) node, to be handed over to a first network node (target donor CU) from a second network node (source donor CU).

Figure 20:
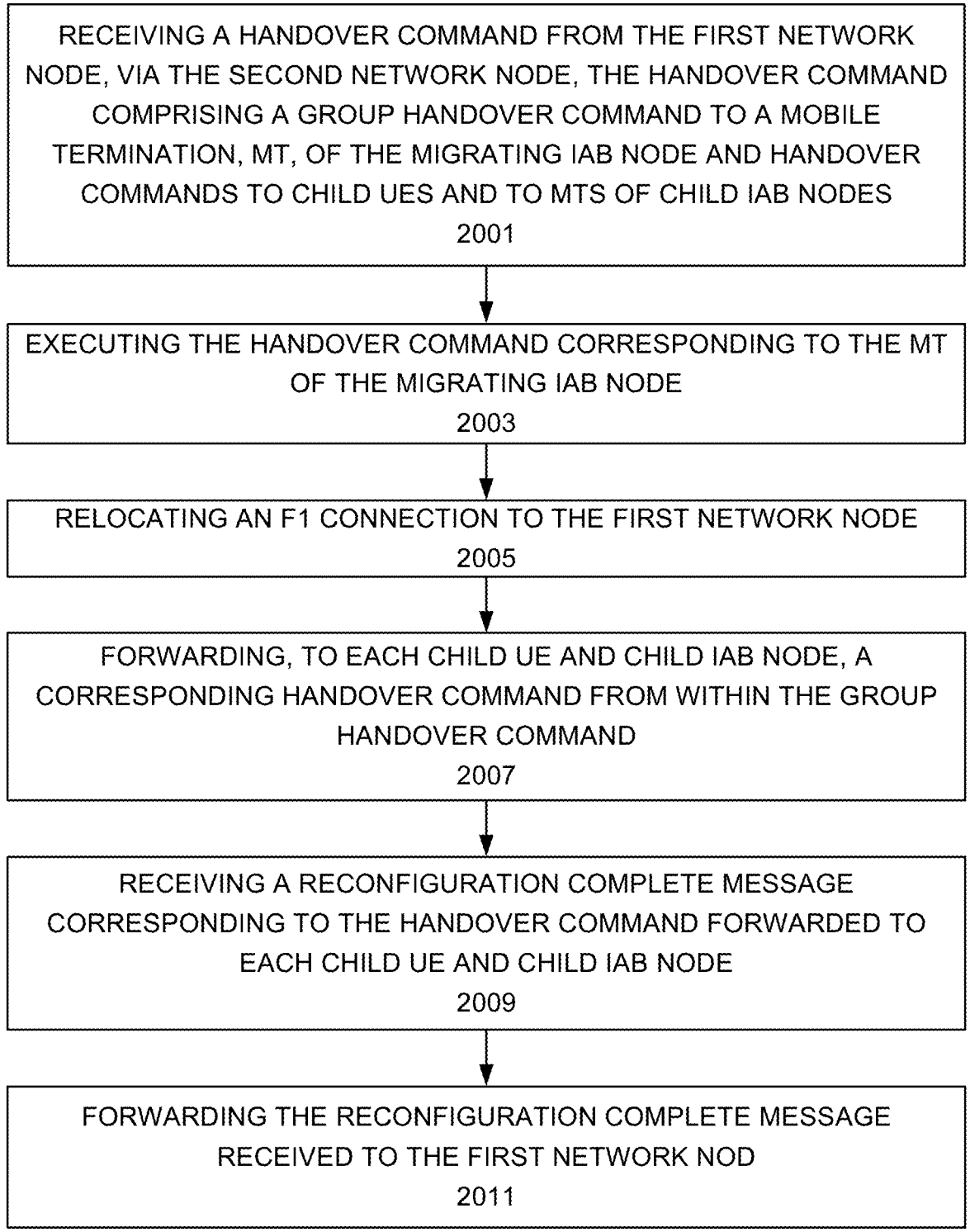

Turing to FIG. 20, the method includes block 2001, where the processing circuitry 1503 receives a handover command from the first network node, via the second network node, which contains a group handover command to a mobile termination, MT, of the migrating IAB node and handover commands to child user equipments, UEs, and to MTs of child IAB nodes. The handover commands to the UEs and children IAB nodes may be encapsulated in messages in one of the following ways:

directly in the handover command (e.g., in an IE that is a list containing UE/IAB identifiers and corresponding OCTET STRING, containing the handover command for the indicated UE/child IAB-MT)

an F1 message embedded in the handover command, where this F1 message contains all the handover commands for the concerned UEs/children IAB-MTs (e.g., a modified DL RRC message transfer or a new message for that purpose)

similar to the above, but a list of F1 DL RRC message transfer message, each containing the handover command to each UE/child IAB-MT In block 2003, the processing circuitry 1503 executes the handover command corresponding to the MT of the migrating IAB node.

In block 2005, the processing circuitry 1503 relocates the F1 connection to the first network node (it should be noted that the F1 relocation could be done implicitly as part of the previous steps by communicating the information of the target CU to the IAB node and vice versa).

In block 2007, the processing circuitry 1503 forwards, to each child UE and each IAB node, a corresponding handover command.

In block 2009, the processing circuitry 1503 receiving a reconfiguration complete message corresponding to the handover command forwarded in block 2007 to each child UE and child IAB node.

In block 2011, the processing circuitry 1503 forwards the reconfiguration complete message received to the first network node. The reconfiguration complete message received can be forwarded in a few ways.

Turning to FIG. 21, in block 2101, the processing circuitry 1503 forwards each reconfiguration complete message received from each child UE or child IAB node separately using a legacy UL RRC Transfer message. For example, a legacy F1-AP UL RRC transfer message may be used.

In block 2103, the processing circuitry 1503 forwards the complete messages using an enhanced UL RRC transfer message or a new message, including the reconfiguration complete message using an enhanced F1-AP UL RRC transfer message or a new message, including reconfiguration complete messages from all the UEs and children IAB-MTs directly under the IAB node.

Various operations from the flow chart of FIG. 20 may be optional with respect to some embodiments of IAB nodes and related methods. Regarding methods of example embodiment 26 (set forth below), for example, operations of blocks 2009 and 2011 of FIG. 20 may be optional.

Figure 1:
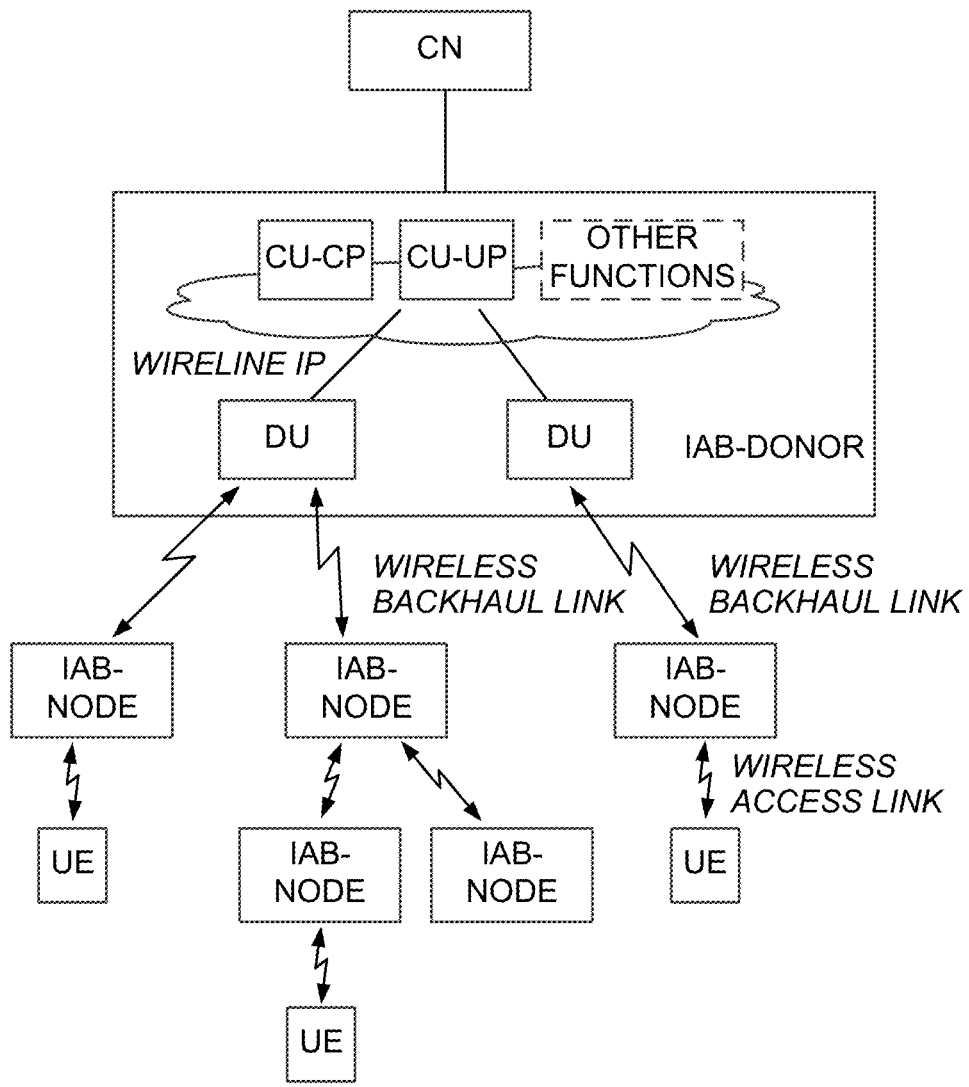
FIG. 1 is a block diagram illustrating a high-level architecture vie of an IAB network.
Figure 2:
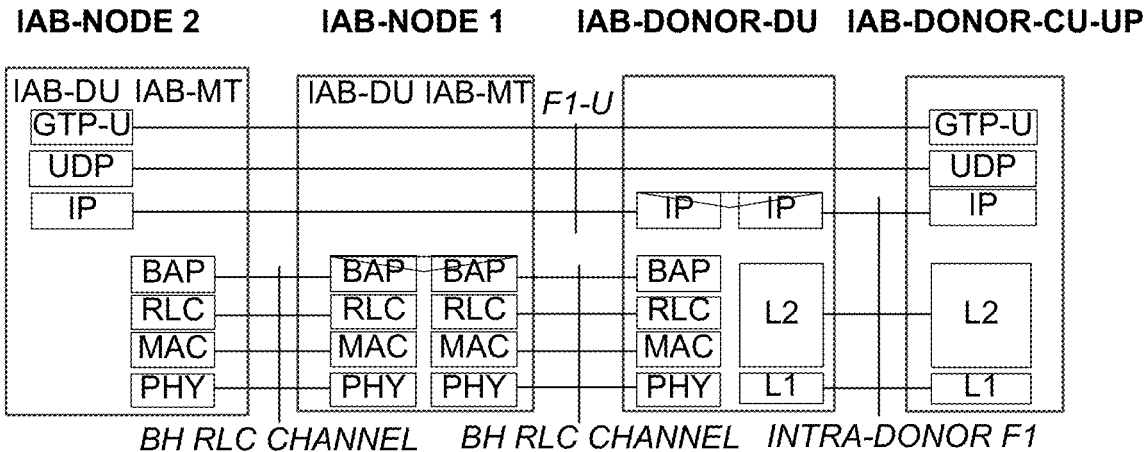
FIG. 2 is a block diagram illustrating the baseline user plane protocol stack for IAB.
Figure 3:
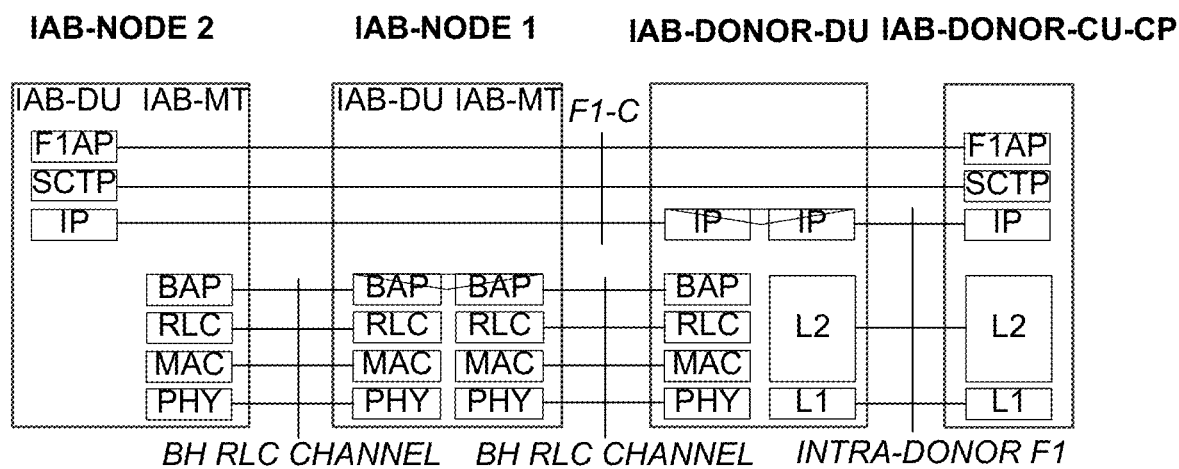
FIG. 3 is a block diagram illustrating the baseline control plane protocol stack for IAB.
Figure 4:
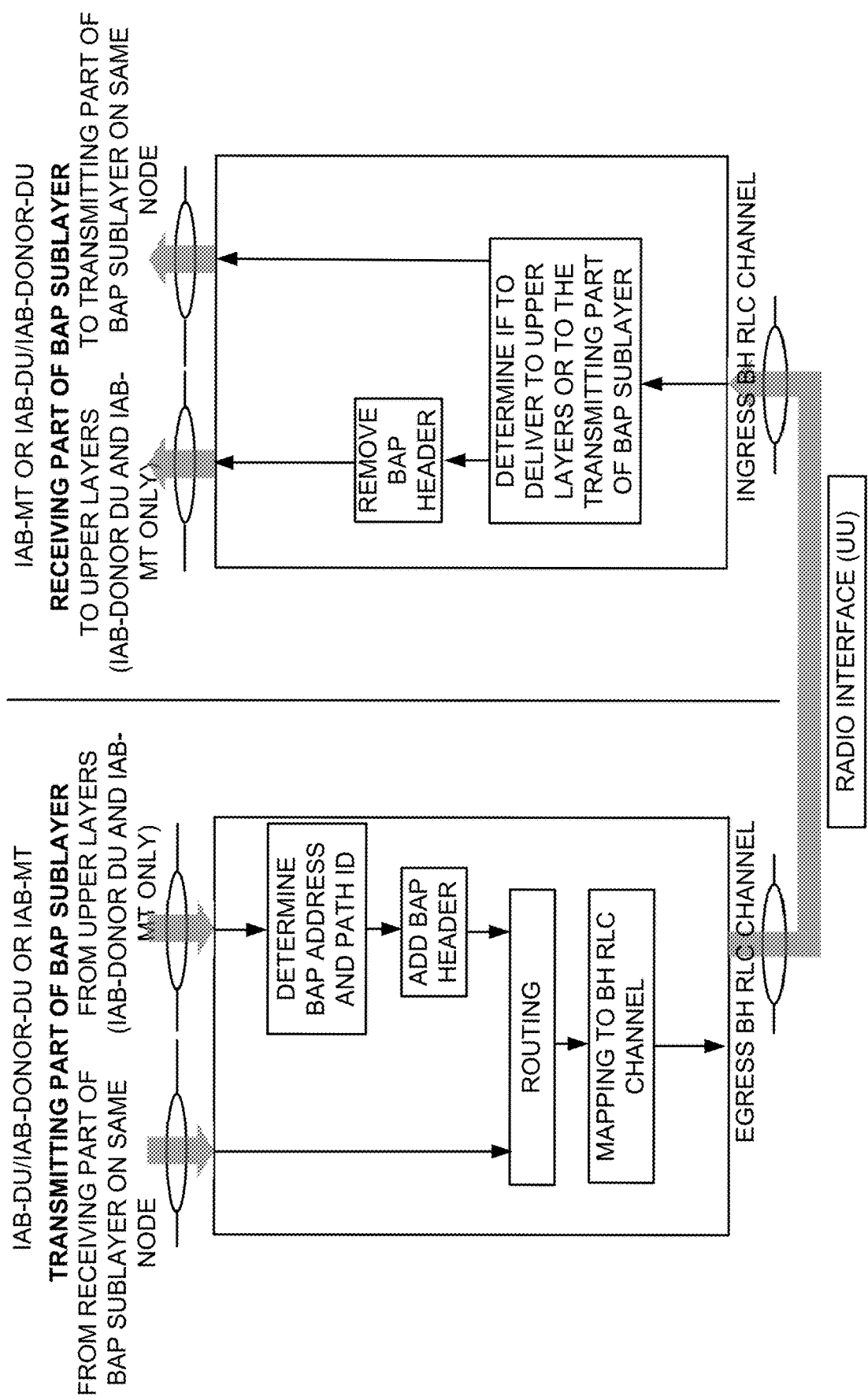
FIG. 4 is an illustration of an example of a functional view of the BAP sublayer.
Figure 5:
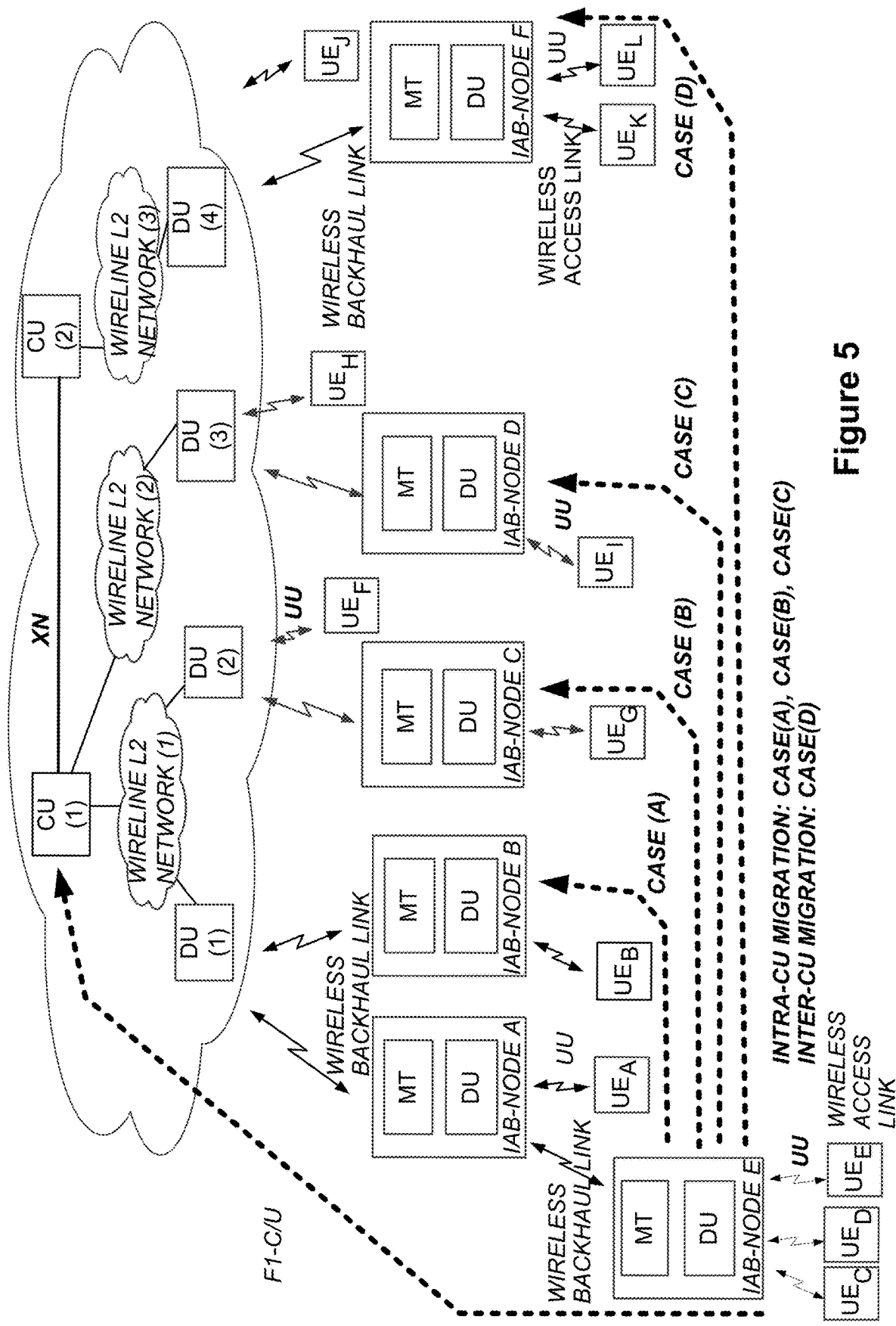
FIG. 5 is an illustration of an example of different possible scenarios for IAB migration.
Figure 6A:
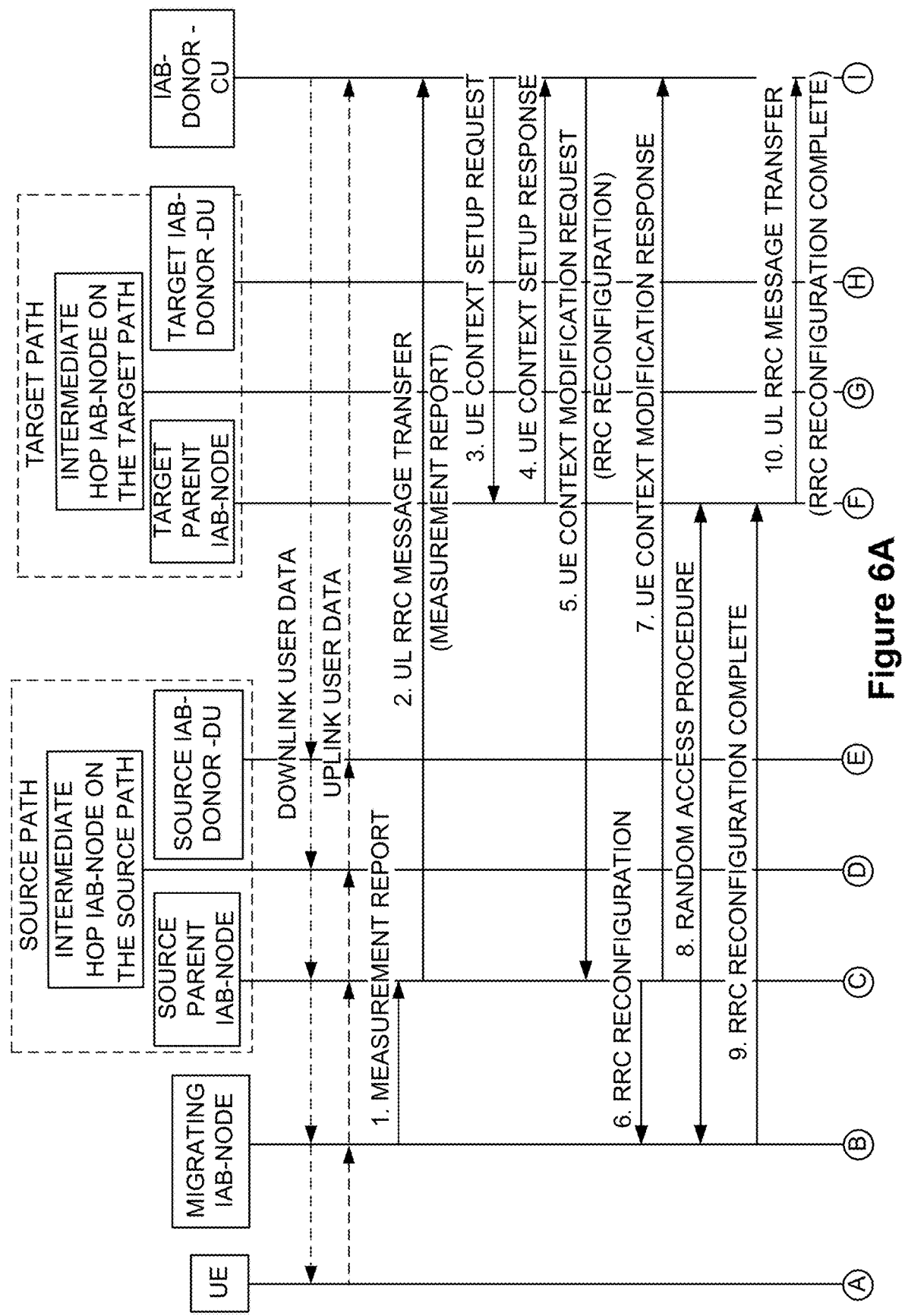
FIGS. 6A and 6B are a signalling diagram of an example of an IAB-intra-CU topology adaptation procedure.
Figure 6B:
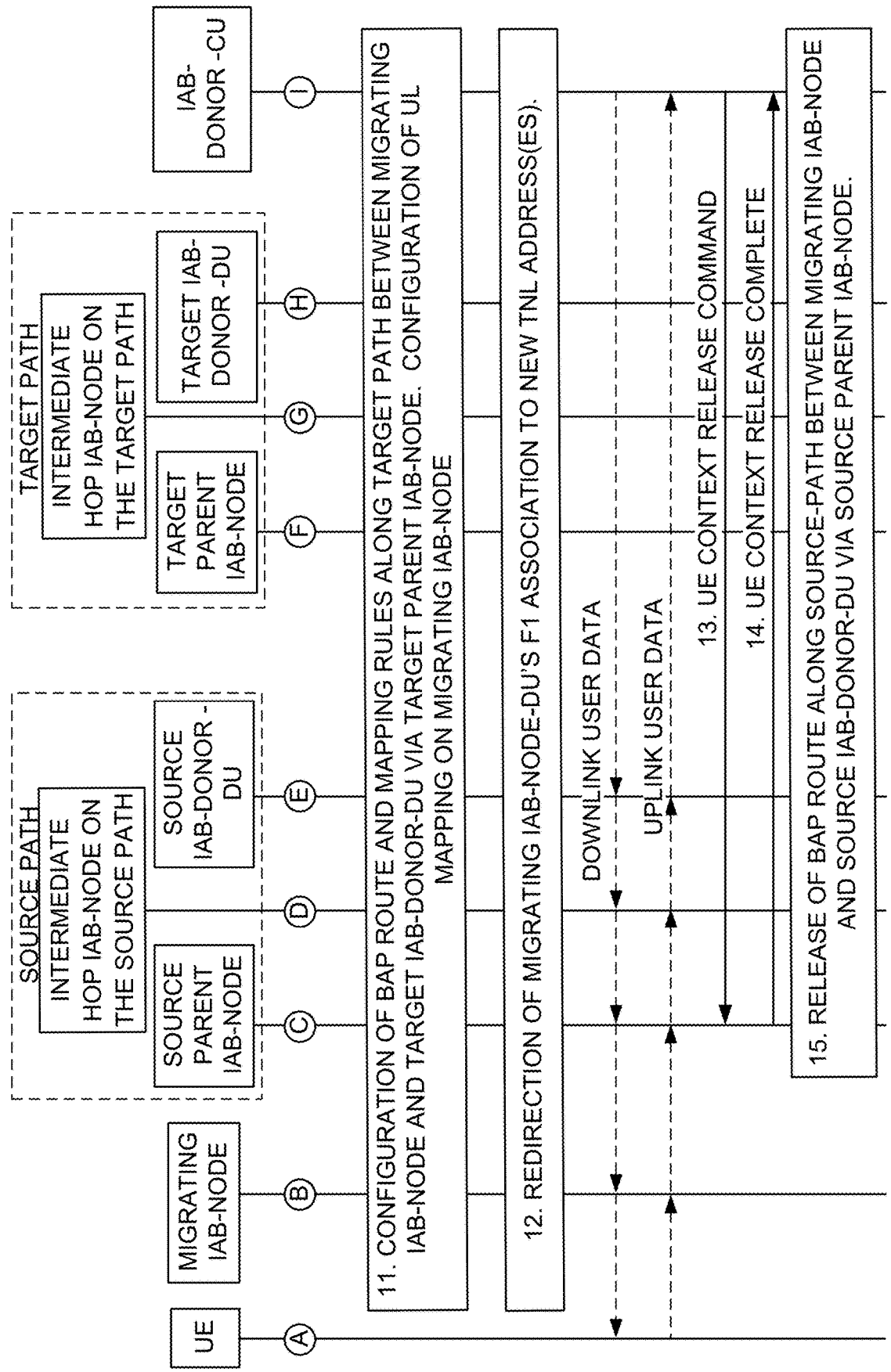
Figure 7:
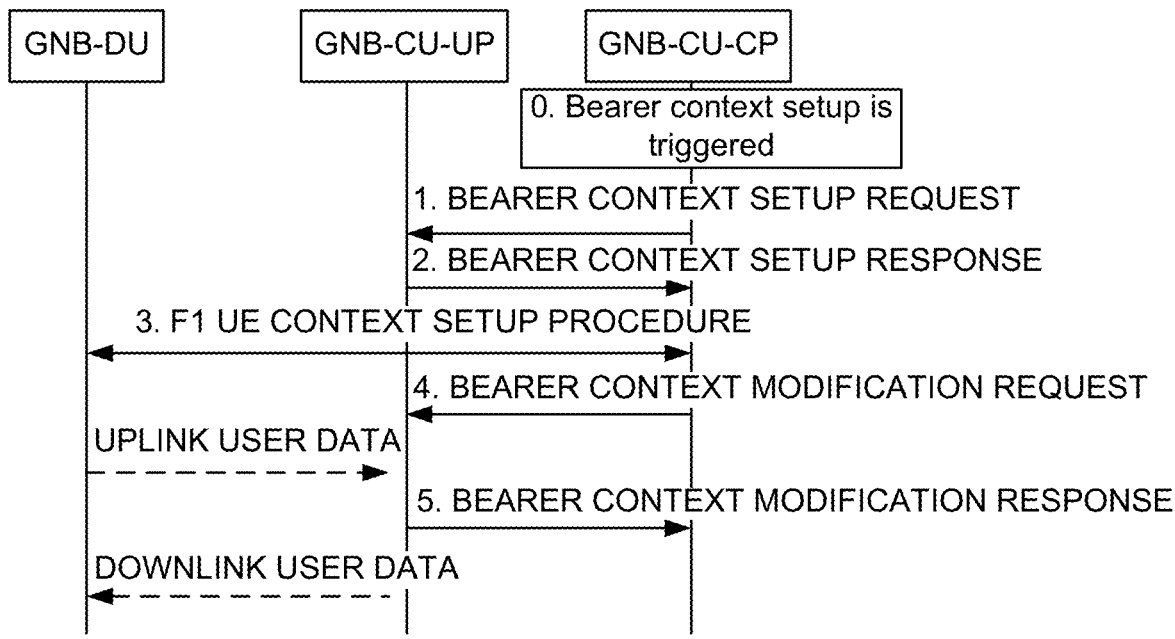
FIG. 7 is a signalling diagram of a bearer context setup of F1-U.
Figure 8:
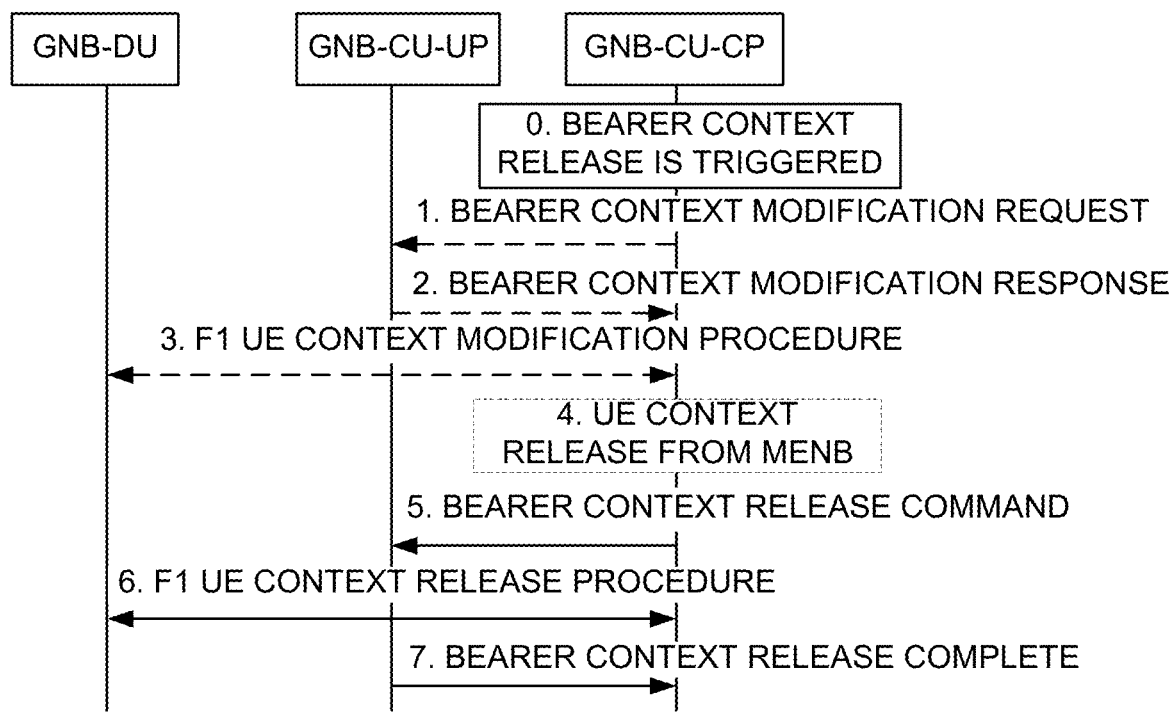
FIG. 8 is a signalling diagram of a bearer context release over F1-U initiated by gNB-CU-CP.
Figure 9:
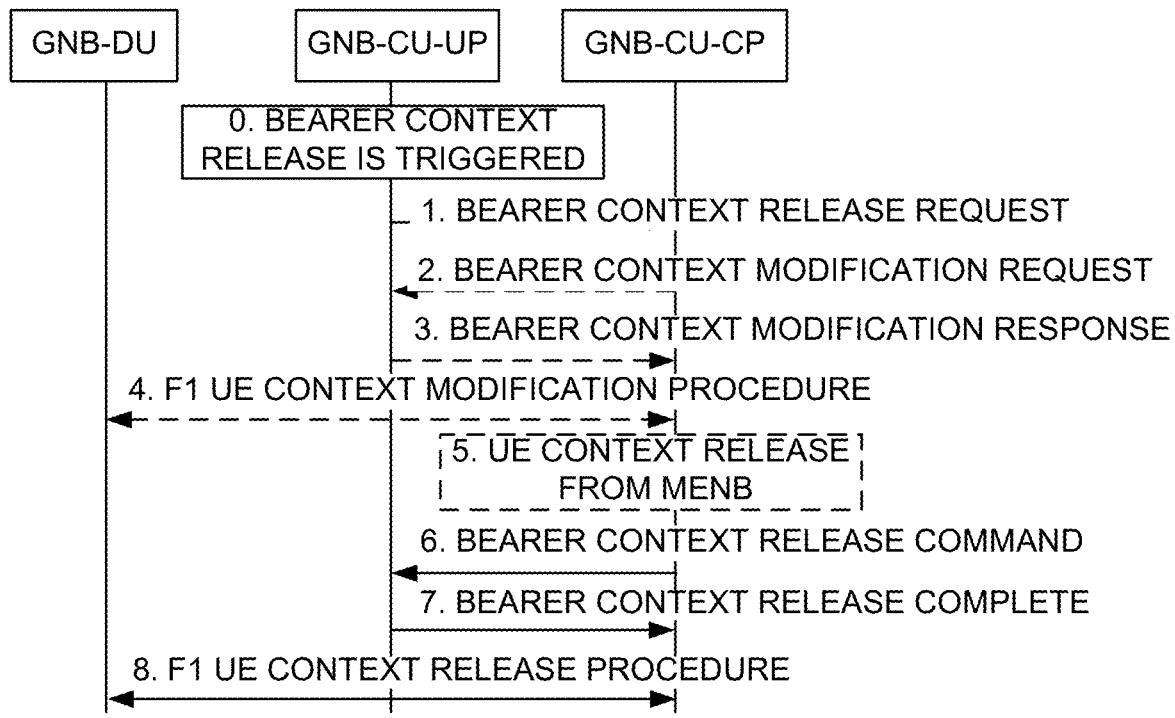
FIG. 9 is a signalling diagram of a bearer context release over F1-U initiated by gNB-CU-UP.
Figure 10:
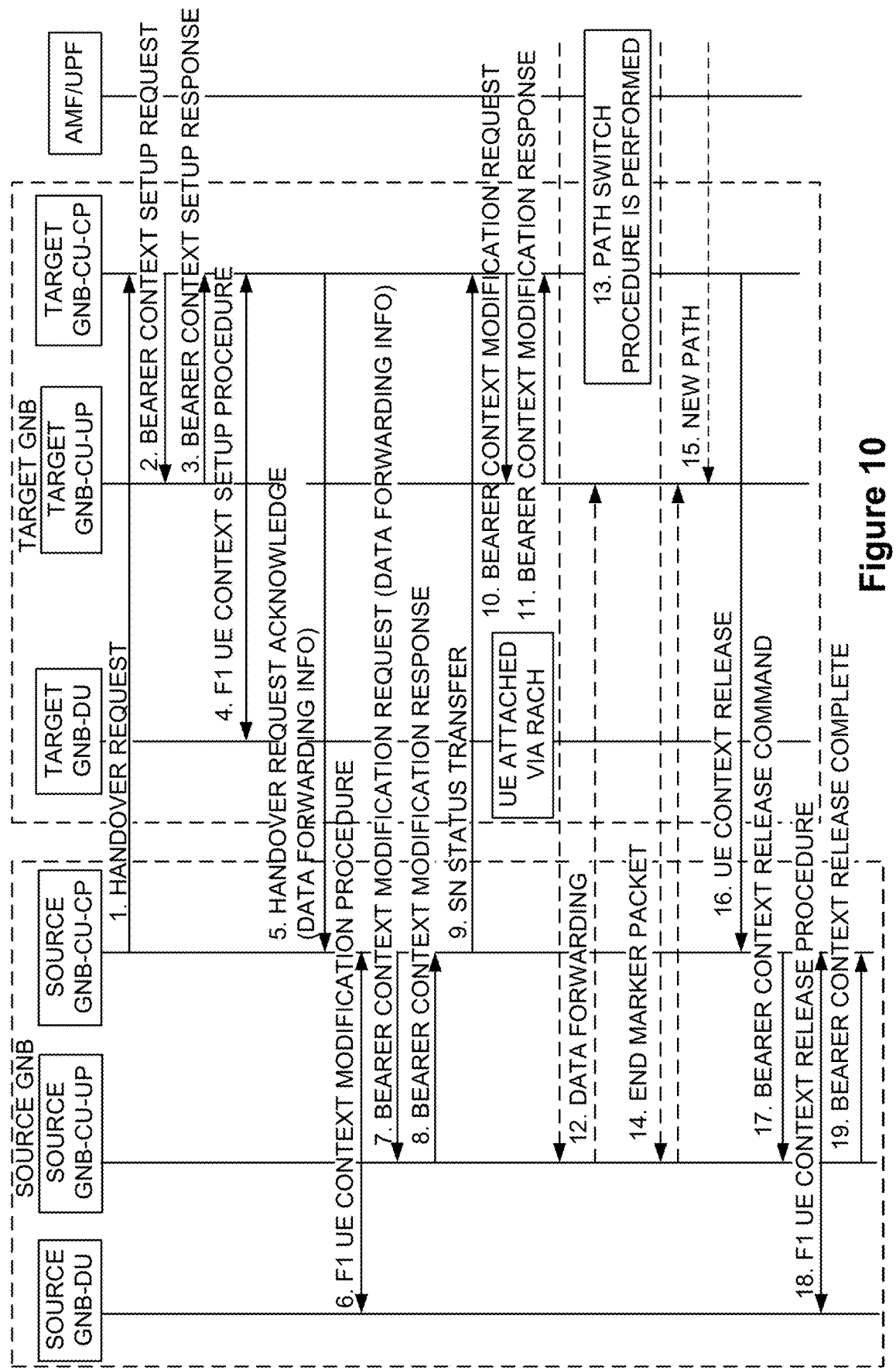
FIG. 10 illustrates a procedure used for inter-gNB handover involving gNB-CU-UP change.
Figure 11:
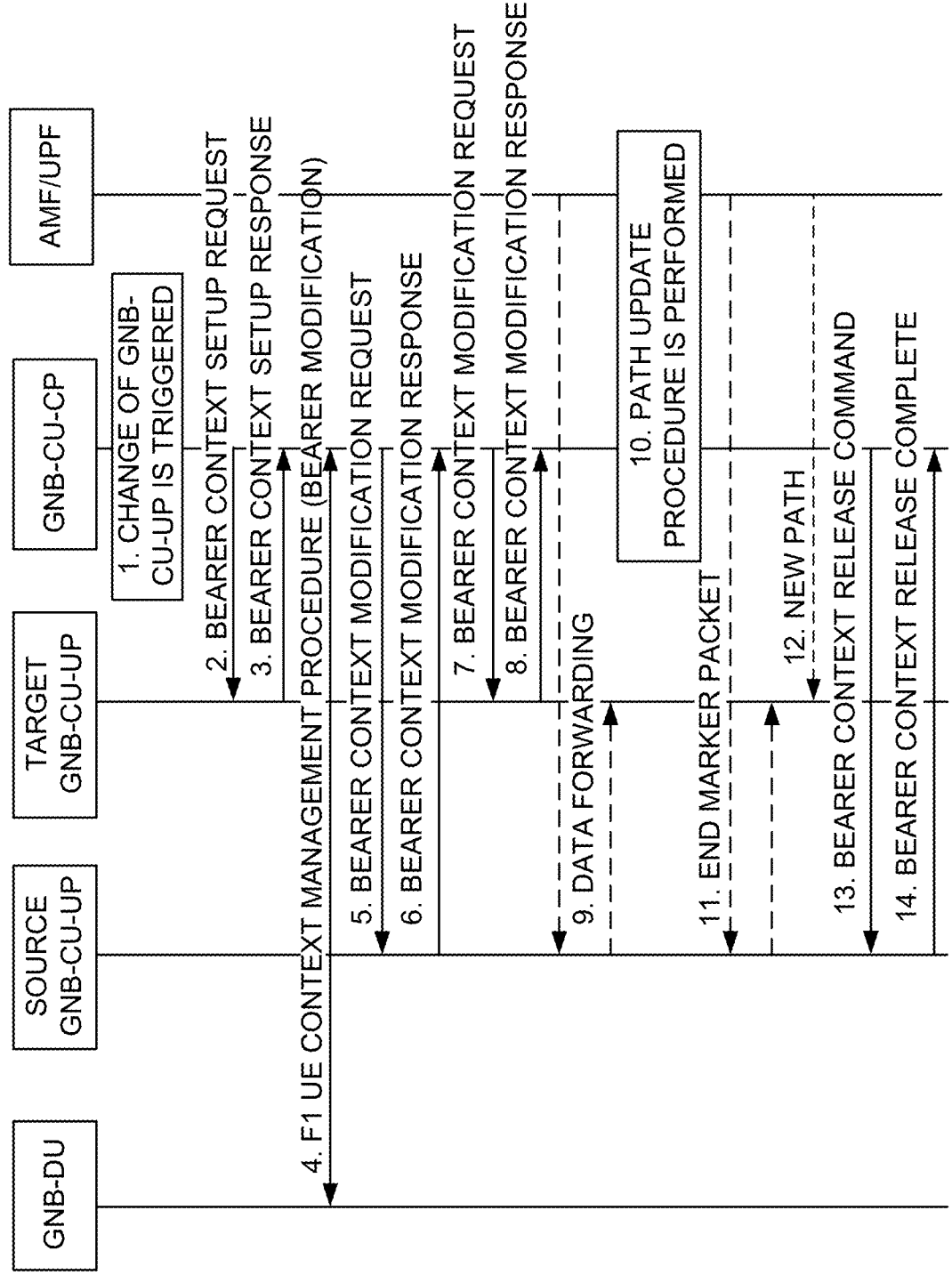
FIG. 11 illustrates a procedure used for the change of gNB-CU-CP.
Figure 13A:
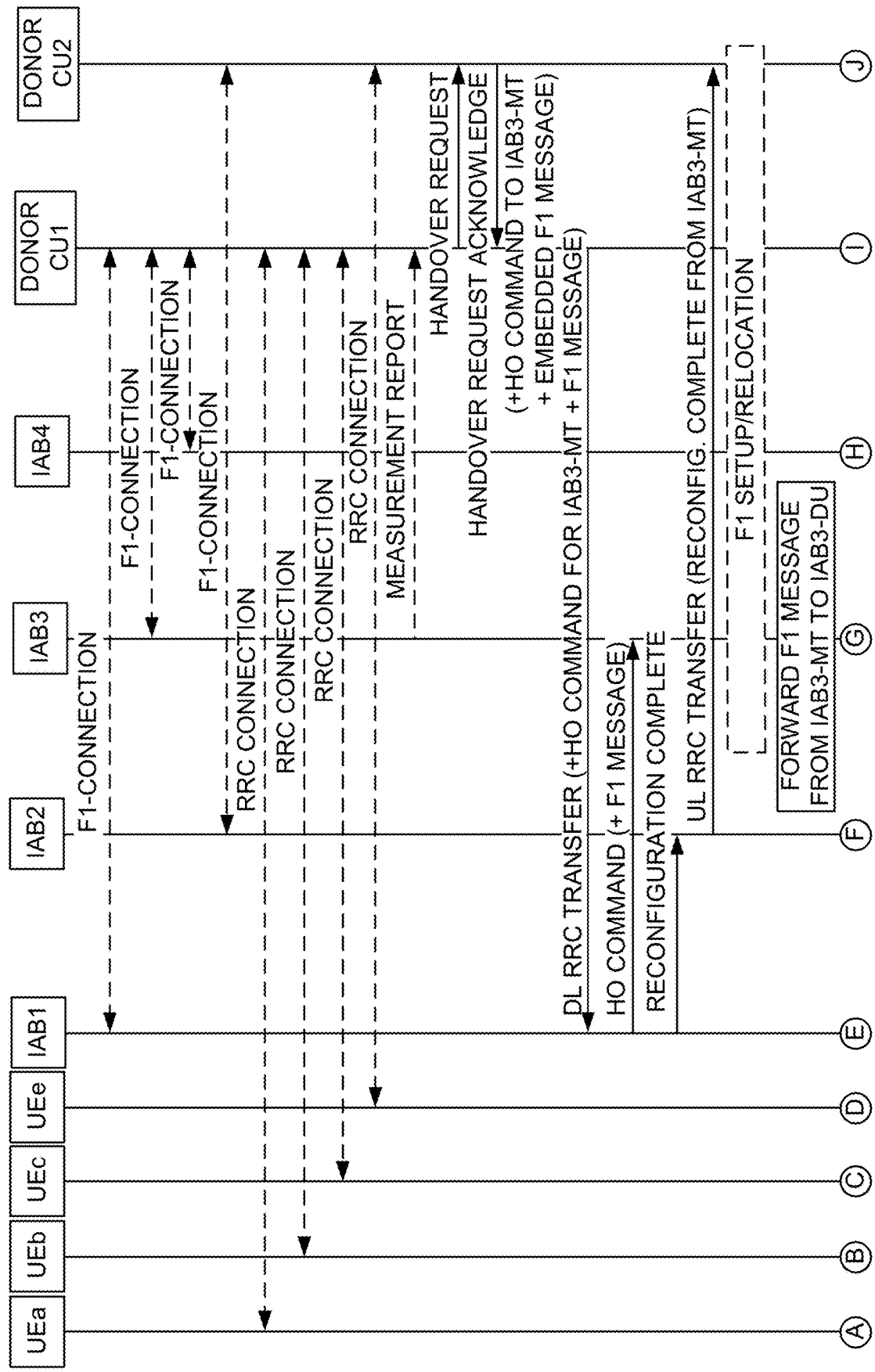
FIGS. 13A and 13B are a signalling diagram of an example implementation of various embodiments of inventive concepts.
Figure 13B:
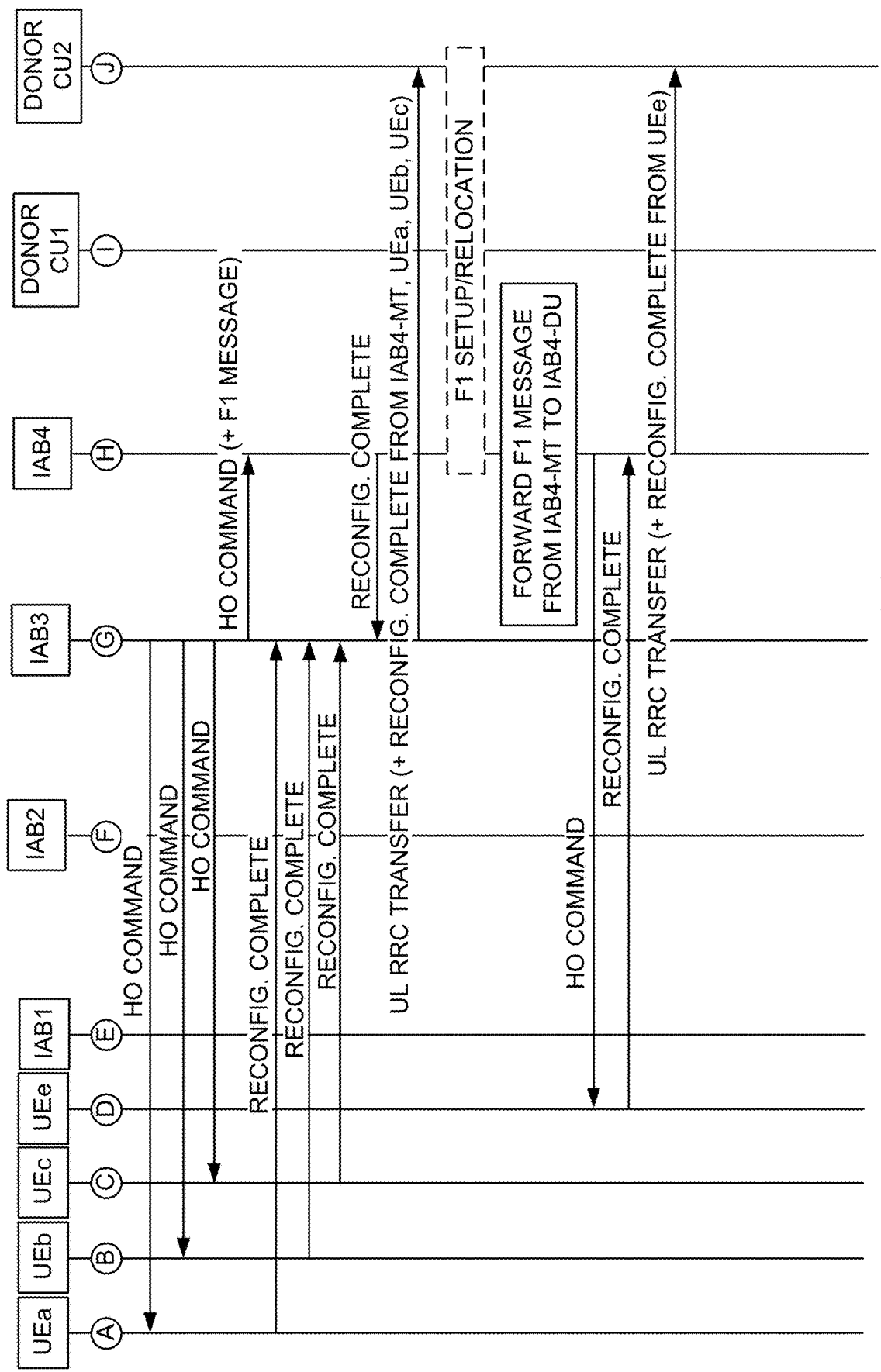

For the handover scenario of FIG. 12, the signalling diagram of FIGS. 13A and 13B exemplifies the embodiments. Some notes regarding the signalling diagram are:

- The signaling diagram of FIG. 11 is for the signaling structure that follows block 1803 of the target CU (F1 message embedded in the handover command and the corresponding F1 message of the IAB node
- The HO Request ACK message is assumed to be the HO Request ACK message as previously described. the "+HO command to IAB3-MT+embedded F1 message" is referring to the contents (as an OCTET STRING) in the "Target NG-RAN node To Source NG-RAN node Transparent Container" IE of the message (see the background section)
- The DL RRC transfer message sent from CU1 to IAB1 is also the legacy DL RRC transfer message. The "+HO command to IAB3-MT+embedded F1 message" is just referring to the contents (as an OCTET STRING) in the "RRC-Container" IE of the message (see the background section)

In the description that follows, additions to text shall be underlined and text removed will be stricken through.

Changes in RRC, for example block 1803 of the source target
RRCReconfiguration

The RRCReconfiguration message is the command to modify an RRC connection. It may convey information for measurement configuration, mobility control, radio resource configuration (including RBs, MAC main configuration and physical channel configuration) and AS security configuration.

Signalling radio bearer: SRB1 or SRB3
RLC-SAP: AM
Logical channel: DCCH
Direction: Network to UE
RRCReconfiguration Message
-- ASN1START
-- TAG-RRCRECONFIGURATION-START
RRCReconfiguration::=SEQUENCE {
  rrc-TransactionIdentifier RRC-TransactionIdentifier,
  criticalExtensions CHOICE {
    rrcReconfiguration RRCReconfiguration-IEs,
    criticalExtensionsFuture SEQUENCE { }
  }
}
RRCReconfiguration-IEs::=SEQUENCE {
  radioBearerConfig RadioBearerConfig OPTIONAL, -- Need M
  secondaryCellGroup OCTET STRING (CONTAINING CellGroupConfig) OPTIONAL, -- Need M
  measConfig MeasConfig OPTIONAL, -- Need M
  lateNonCriticalExtension OCTET STRING OPTIONAL,
  nonCriticalExtension RRCReconfiguration-v1530-IEs OPTIONAL
}
RRCReconfiguration-v1530-IEs::=SEQUENCE {
  masterCellGroup OCTET STRING (CONTAINING CellGroupConfig) OPTIONAL, --Need M
  fullConfig ENUMERATED {true}OPTIONAL, -- Cond FullConfig
  dedicatedNAS-MessageList SEQUENCE (SIZE(1 . . . maxDRB)) OF DedicatedNAS-Message OPTIONAL, -- Cond nonHO
  masterKeyUpdate MasterKeyUpdate OPTIONAL, -- Cond MasterKeyChange
  dedicatedSIB1-Delivery OCTET STRING (CONTAINING SIB1) OPTIONAL, --Need N
  dedicatedSystemInformationDelivery OCTET STRING (CONTAINING SystemInformation) OPTIONAL, -- Need N
  otherConfig OtherConfig OPTIONAL, -- Need M
  nonCriticalExtension RRCReconfiguration-v1540-IEs OPTIONAL
}
RRCReconfiguration-v1540-IEs::=SEQUENCE {
  otherConfig-v1540 OtherConfig-v1540 OPTIONAL, -- Need M
  nonCriticalExtension RRCReconfiguration-v1560-IEs OPTIONAL
}
RRCReconfiguration-v1560-IEs::=SEQUENCE {
  mrdc-SecondaryCellGroupConfig SetupRelease {MRDC-SecondaryCellGroupConfig}OPTIONAL, -- Need M
  radioBearerConfig2 OCTET STRING (CONTAINING RadioBearerConfig) OPTIONAL, -- Need M
  sk-Counter SK-Counter OPTIONAL, -- Need N
  nonCriticalExtension RRCReconfiguration-v16xy-IEs OPTIONAL
}
RRCReconfiguration-v16xy-IEs::=SEQUENCE {
  otherConfig-v16xy OtherConfig-v16xy OPTIONAL, -- Need M
  bap-Config-r16 SetupRelease {BAP-Config-r16}OPTIONAL, -- Need M
  conditionalReconfiguration-r16 ConditionalReconfiguration-r16 OPTIONAL, -- Need M
  daps-SourceRelease-r16 ENUMERATED{true}OPTIONAL, -- Need N
  sl-ConfigDedicatedNR-r16 SetupRelease {SL-ConfigDedicatedNR-r16}OPTIONAL, --Need M
  sl-ConfigDedicatedEUTRA-r16 SetupRelease {SL-ConfigDedicatedEUTRA-r16}OPTIONAL, -- Need M
  nonCriticalExtension RRCReconfiguration-v17xy-IEs OPTIONAL
}
RRCReconfiguration-v17xy-IEs::=SEQUENCE {
  embeddedRRC-IABMessageList SEQUENCE (SIZE(1 . . . maxFFS)) OF embeddedRRC-IABMessage OPTIONAL, -- Cond IAB
  nonCriticalExtension SEQUENCE { }OPTIONAL
}
embeddedRRC-IABMessage-r17::=SEQUENCE {
  c-RNTI-r16 RNTI-Value,
  iab-RRC-Message-r17 OCTET STRING (CONTAINING RRCReconfiguration)
}
-- Editor's Note: Whether an explicit indication is needed to configure/deconfigure the on-demand SIB request for CONNECTED UEs is FFS.

```
MRDC-SecondaryCellGroupConfig::=SEQUENCE {
    mrdc-ReleaseAndAdd          ENUMERATED
        {true}OPTIONAL, -- Need N
    mrdc-SecondaryCellGroup CHOICE {
        nr-SCG    OCTET    STRING    (CONTAINING
            RRCReconfiguration),
        eutra-SCG OCTET STRING
    }
}
BAP-Config-r16::=SEQUENCE {
    bap-Address-r16 BIT STRING (SIZE (10)),
    defaultUL-BAProutingID-r16   BAP-Routing-ID-r16
        OPTIONAL, -- Need FFS
    defaultUL-BH-RLC-Channel-r16    BH-LogicalChan-
        nelIdentity-r16 OPTIONAL, -- Need M
    ...
}
MasterKeyUpdate::=SEQUENCE {
    keySetChangeIndicator BOOLEAN,
    nextHopChainingCount NextHopChainingCount,
    nas-Container OCTET STRING OPTIONAL, -- Cond
        securityNASC
    ...
}
-- TAG-RRCRECONFIGURATION-STOP
-- ASN1STOP
```

Changes in RRC, for example block 1803 of the source target RRCReconfiguration The RRCReconfiguration message is the command to modify an RRC connection. It may convey information for measurement configuration, mobility control, radio resource configuration (including RBs, MAC main configuration and physical channel configuration) and AS security configuration.

Signalling radio bearer: SRB1 or SRB3
RLC-SAP: AM
Logical channel: DCCH
Direction: Network to UE
RRCReconfiguration Message

```
-- ASN1START
-- TAG-RRCRECONFIGURATION-START
RRCReconfiguration::=SEQUENCE {
    rrc-TransactionIdentifier RRC-TransactionIdentifier,
    criticalExtensions CHOICE {
        rrcReconfiguration RRCReconfiguration-IEs,
        criticalExtensionsFuture SEQUENCE { }
    }
}
RRCReconfiguration-IEs::=SEQUENCE {
    radioBearerConfig RadioBearerConfig OPTIONAL, --
        Need M
    secondaryCellGroup OCTET STRING (CONTAIN-
        ING CellGroupConfig) OPTIONAL, -- Need M
    measConfig MeasConfig OPTIONAL, -- Need M
    lateNonCriticalExtension     OCTET     STRING
        OPTIONAL,
    nonCriticalExtension RRCReconfiguration-v1530-IEs
        OPTIONAL
}
RRCReconfiguration-v1530-IEs::=SEQUENCE {
    masterCellGroup OCTET STRING (CONTAINING
        CellGroupConfig) OPTIONAL, --Need M
    fullConfig ENUMERATED {true}OPTIONAL, --
        Cond FullConfig
    dedicatedNAS-MessageList SEQUENCE (SIZE(1 . . .
        maxDRB))     OF     DedicatedNAS-Message
        OPTIONAL, -- Cond nonHO
    masterKeyUpdate MasterKeyUpdate OPTIONAL, --
        Cond MasterKeyChange
    dedicatedSIB1-Delivery OCTET STRING (CON-
        TAINING SIB1) OPTIONAL, -- Need N
    dedicatedSystemInformationDelivery        OCTET
        STRING    (CONTAINING    SystemInformation)
        OPTIONAL, -- Need N
    otherConfig OtherConfig OPTIONAL, -- Need M
    nonCriticalExtension RRCReconfiguration-v1540-IEs
        OPTIONAL
}
RRCReconfiguration-v1540-IEs::=SEQUENCE {
    otherConfig-v1540 OtherConfig-v1540 OPTIONAL, --
        Need M
    nonCriticalExtension RRCReconfiguration-v1560-IEs
        OPTIONAL
}
RRCReconfiguration-v1560-IEs::=SEQUENCE {
    mrdc-SecondaryCellGroupConfig       SetupRelease
        {MRDC-SecondaryCellGroupConfig}
        OPTIONAL, -- Need M
    radioBearerConfig2 OCTET STRING (CONTAINING
        RadioBearerConfig) OPTIONAL, -- Need M
    sk-Counter SK-Counter OPTIONAL, -- Need N
    nonCriticalExtension RRCReconfiguration-v16xy-IEs
        OPTIONAL
}
RRCReconfiguration-v16xy-IEs::=SEQUENCE {
    otherConfig-v16xy OtherConfig-v16xy OPTIONAL, --
        Need M
    bap-Config-r16      SetupRelease     {BAP-Config-
        r16}OPTIONAL, -- Need M
    conditionalReconfiguration-r16    ConditionalRecon-
        figuration-r16 OPTIONAL, -- Need M
    daps-SourceRelease-r16
        ENUMERATED{true}OPTIONAL, -- Need N
    sl-ConfigDedicatedNR-r16  SetupRelease  {SL-Con-
        figDedicatedNR-r16}OPTIONAL, --Need M
    sl-ConfigDedicatedEUTRA-r16   SetupRelease   {SL-
        ConfigDedicatedEUTRA-r16}OPTIONAL, -- Need
        M
    nonCriticalExtension RRCReconfiguration-v17xy-IEs
        OPTIONAL
}
RRCReconfiguration-v17xy-IEs::=SEQUENCE {
    dedicatedF1AP-Message-r17     DedicatedF1AP-Mes-
        sage-r17 OPTIONAL, --Need N nonCriticalExten-
        sion SEQUENCE { } OPTIONAL
}
-- Editor's Note: Whether an explicit indication is needed
    to configure/deconfigure the on-demand SIB request
    for CONNECTED UEs is FFS.
MRDC-SecondaryCellGroupConfig::=SEQUENCE {
    mrdc-ReleaseAndAdd          ENUMERATED
        {true}OPTIONAL, -- Need N
    mrdc-SecondaryCellGroup CHOICE {
        nr-SCG    OCTET    STRING    (CONTAINING
            RRCReconfiguration),
        eutra-SCG OCTET STRING
    }
}
BAP-Config-r16::=SEQUENCE {
    bap-Address-r16 BIT STRING (SIZE (10)),
```

```
    defaultUL-BAProutingID-r16    BAP-Routing-ID-r16
        OPTIONAL, -- Need FFS
    defaultUL-BH-RLC-Channel-r16    BH-LogicalChan-
        nelIdentity-r16 OPTIONAL, -- Need M
    ...
}
MasterKeyUpdate::=SEQUENCE {
    keySetChangeIndicator BOOLEAN,
    nextHopChainingCount NextHopChainingCount,
    nas-Container OCTET STRING OPTIONAL, -- Cond
        securityNASC
    ...
}
-- TAG-RRCRECONFIGURATION-STOP
-- ASN1STOP
```

DedicatedF1AP-Message

The IE DedicatedF1AP-Message is used to transfer F1AP message destined for the IAB-DU co-located with the IAB-MT receiving this message. The carried information consists of F1AP message encapsulated in SCTP/IP or F1-C related SCTP/IP packet, see [TS 38.472]. The RRC layer is transparent for this information.

DedicatedF1AP-Message Information Element

```
-- ASN1START
    DedicatedF1AP-Message::=OCTET STRING
-- ASN1STOP
```

Changes in RRC, for example embodiment 1905 of the source target

RRCReconfiguration

The RRCReconfiguration message is the command to modify an RRC connection. It may convey information for measurement configuration, mobility control, radio resource configuration (including RBs, MAC main configuration and physical channel configuration) and AS security configuration.

Signalling radio bearer: SRB1 or SRB3
RLC-SAP: AM
Logical channel: DCCH
Direction: Network to UE RRCReconfiguration Message

```
-- ASN1START
-- TAG-RRCRECONFIGURATION-START
RRCReconfiguration::=SEQUENCE {
    rrc-TransactionIdentifier RRC-TransactionIdentifier,
    criticalExtensions CHOICE {
        rrcReconfiguration RRCReconfiguration-IEs,
        criticalExtensionsFuture SEQUENCE { }
    }
}
RRCReconfiguration-IEs::=SEQUENCE {
    radioBearerConfig RadioBearerConfig OPTIONAL, --
        Need M
    secondaryCellGroup OCTET STRING (CONTAIN-
        ING CellGroupConfig) OPTIONAL, -- Need M
    measConfig MeasConfig OPTIONAL, -- Need M
    lateNonCriticalExtension   OCTET   STRING
        OPTIONAL,
    nonCriticalExtension RRCReconfiguration-v1530-IEs
        OPTIONAL
}
RRCReconfiguration-v1530-IEs::=SEQUENCE {
    masterCellGroup OCTET STRING (CONTAINING
        CellGroupConfig) OPTIONAL, --Need M
    fullConfig ENUMERATED {true}OPTIONAL, --
        Cond FullConfig
    dedicatedNAS-MessageList SEQUENCE (SIZE(1 ...
        maxDRB))    OF    DedicatedNAS-Message
        OPTIONAL, -- Cond nonHO
    masterKeyUpdate MasterKeyUpdate OPTIONAL, --
        Cond MasterKeyChange
    dedicatedSIB1-Delivery OCTET STRING (CON-
        TAINING SIB1) OPTIONAL, --Need N
    dedicatedSystemInformationDelivery    OCTET
        STRING (CONTAINING SystemInformation)
        OPTIONAL, -- Need N
    otherConfig OtherConfig OPTIONAL, -- Need M
    nonCriticalExtension RRCReconfiguration-v1540-IEs
        OPTIONAL
}
RRCReconfiguration-v1540-IEs::=SEQUENCE {
    otherConfig-v1540 OtherConfig-v1540 OPTIONAL, --
        Need M
    nonCriticalExtension RRCReconfiguration-v1560-IEs
        OPTIONAL
}
RRCReconfiguration-v1560-IEs::=SEQUENCE {
    mrdc-SecondaryCellGroupConfig    SetupRelease
        {MRDC-SecondaryCellGroupConfig}
        OPTIONAL, -- Need M
    radioBearerConfig2 OCTET STRING (CONTAINING
        RadioBearerConfig) OPTIONAL, -- Need M
    sk-Counter SK-Counter OPTIONAL, -- Need N
    nonCriticalExtension RRCReconfiguration-v16xy-IEs
        OPTIONAL
}
RRCReconfiguration-v16xy-IEs::=SEQUENCE {
    otherConfig-v16xy OtherConfig-v16xy OPTIONAL, --
        Need M
    bap-Config-r16    SetupRelease    {BAP-Config-
        r16}OPTIONAL, -- Need M
    conditionalReconfiguration-r16    ConditionalRecon-
        figuration-r16 OPTIONAL, -- Need M
    daps-SourceRelease-r16
        ENUMERATED{true}OPTIONAL, -- Need N
    sl-ConfigDedicatedNR-r16 SetupRelease {SL-Con-
        figDedicatedNR-r16}OPTIONAL, --Need M
    sl-ConfigDedicatedEUTRA-r16 SetupRelease {SL-
        ConfigDedicatedEUTRA-r16}OPTIONAL, -- Need
        M
    nonCriticalExtension RRCReconfiguration-v17xy-IEs
        OPTIONAL
}
RRCReconfiguration-v17xy-IEs::=SEQUENCE {
    embeddedF1AP-MessageList-r17    SEQUENCE
        (SIZE(1 . . . maxFFS)) OF
EmbeddedF1AP-IABMessage-r17 OPTIONAL, -- Need
    N
nonCriticalExtension SEQUENCE { }OPTIONAL
}
embeddedF1AP-Message-r17::=SEQUENCE {
    c-RNTI-r16 RNTI-Value,
    dedicatedF1AP-Message-r17    DedicatedF1AP-Mes-
        sage
}
-- Editor's Note: Whether an explicit indication is needed
    to configure/deconfigure the on-demand SIB request
    for CONNECTED UEs is FFS.
MRDC-SecondaryCellGroupConfig::=SEQUENCE {
    mrdc-ReleaseAndAdd    ENUMERATED
        {true}OPTIONAL, -- Need N
    mrdc-SecondaryCellGroup CHOICE {
```

```
    nr-SCG    OCTET    STRING    (CONTAINING
      RRCReconfiguration),
    eutra-SCG OCTET STRING
    }
}
BAP-Config-r16::=SEQUENCE {
  bap-Address-r16 BIT STRING (SIZE (10)),
  defaultUL-BAProutingID-r16    BAP-Routing-ID-r16
    OPTIONAL, -- Need FFS
  defaultUL-BH-RLC-Channel-r16    BH-LogicalChan-
    nelIdentity-r16 OPTIONAL, -- Need M
  ...
}
MasterKeyUpdate::=SEQUENCE {
  keySetChangeIndicator BOOLEAN,
  nextHopChainingCount NextHopChainingCount,
  nas-Container OCTET STRING OPTIONAL, -- Cond
    securityNASC
  ...
}
-- TAG-RRCRECONFIGURATION-STOP
-- ASN1STOP
```

DedicatedF1AP-Message

The IE DedicatedF1AP-Message is used to transfer F1AP message destined for the children IAB nodes of the IAB-MT receiving this message. The carried information consists of F1AP message encapsulated in SCTP/IP or F1-C related SCTP/IP packet, see [TS 38.472]. The RRC layer is transparent for this information.

DedicatedF1AP-Message Information Element

```
-- ASN1START
DedicatedF1AP-Message::=OCTET STRING
-- ASN1STOP
```

Example embodiments are discussed below.

1. A method by a first network node, operating as a target donor central unit in an Integrated access backhaul, IAB network, serving as a candidate donor node for a migrating IAB node and providing connectivity for a user equipment, UE, the method comprising:
  receiving (1701) a message for IAB handover from a second network node, the message including contexts of the migrating IAB node and user equipments, UEs, and IAB nodes that are directly or indirectly served by the migrating IAB node;
  performing (1703) admission control for the UEs and IAB nodes included in the message;
  preparing (1705) a handover command to a mobile termination, MT, of the migrating IAB node, and each UE and MT of IAB node that are directly or indirectly served by the migrating IAB node;
  generating (1707) a group handover command that recursively contains handover commands of all UEs and MTs of IAB nodes that are directly or indirectly served by the migrating IAB node;
  preparing and sending (1709) a handover acknowledge message to the second network node, the handover acknowledge message including a list of admitted and not admitted protocol data units, PDU, session resources that are associated with the UEs and IAB nodes and containing the group handover command; and
  receiving (1711) an RRC Reconfiguration Complete message corresponding to an MT of the migrating IAB node and/or an MT of any IAB node and/or UE that are directly or indirectly served by the migrating IAB node.

2. The method of Embodiment 1 wherein generating the group handover command comprises:
  for each hop starting from the hop where leaf nodes under a subtree below the migrating IAB node where the IAB nodes with no children nodes are located and ending when a level of the migrating IAB node is reached:
    for each IAB node in that hop, or if the hop corresponds to the migrating IAB node's level for the migrating IAB node, updating the handover command prepared for the MT of the IAB node including the handover command prepared for each UE and MT of each child IAB node the IAB node is serving.

3. The method of Embodiment 2 wherein updating the handover command comprises:
  encapsulating (1801) the handover commands of each UE and MT of child IAB node directly in the handover command prepared for the MT of the IAB node.

4. The method of Embodiment 2 wherein updating the handover command comprises:
  embedding (1803) an F1-application protocol, F1-AP. message in the handover command prepared for the MT of the IAB node, where the F1-AP message contains all the handover commands for the UEs/MTs of IAB nodes directly or indirectly served by the migrating IAB node.

5. The method of Embodiment 2 wherein updating the handover command comprises:
  encapsulating (1805) a list of F1-AP messages in the handover command for the MT of the IAB node, each message containing the handover command to each UE/MT.

6. The method of any of Embodiments 4 and 5, where the F1-AP message comprises at least one of:
  an F1-AP downlink, DL, radio resource control, RRC, Message Transfer message
  an enhancement of the F1-AP DL RRC Message Transfer message
  anew message 7. The method of any of Embodiments 1-6 wherein receiving the RRC Reconfiguration Complete message comprises receiving (1901) each Reconfiguration Complete message in a separate F1-AP UL RRC message transfer message.

8. The method of any of Embodiments 1-6 wherein receiving the RRC Reconfiguration Complete message comprises receiving (1903) an uplink F1-AP message for each IAB node being migrated, wherein each uplink message contains the RRC complete messages of all the UEs and IAB-MT under that IAB node.

9. The method of any of Embodiments 1-6 wherein receiving the RRC Reconfiguration Complete message comprises receiving (1905) a single uplink F1-AP message that contains all the reconfiguration complete messages of all the migrating IAB nodes and UEs.

10. The method of any of Embodiments 7 and 8, where the F1-AP message comprises:
  an enhancement of the F1-AP UL RRC Message Transfer message
  a new message 11. The method of any of Embodiments 1-10, further comprising:
  performing one of setting up or relocating an F1 connection between the IAB node whose MT's RRC Reconfiguration complete message is received and the first network node.

12. A network node (1600) adapted to perform according to any of Embodiments 1-11.

13. A network node (1600) comprising:
  processing circuitry (1603); and
  memory (1605) coupled with the processing circuitry, wherein the memory includes instructions that when executed by the processing circuitry causes the network node to perform operations comprising:
    receiving (1701) a message for IAB handover from a second network node, the message including contexts of the migrating IAB node and user equipments, UEs, and IAB nodes that are directly or indirectly served by the migrating IAB node;
    performing (1703) admission control for the UEs and IAB nodes included in the message;
    preparing (1705) a handover command to a mobile termination, MT, of the migrating IAB node, and each UE and MT of IAB node that are directly or indirectly served by the migrating IAB node;
    generating (1707) a group handover command that recursively contains handover commands of all UEs and MTs of IAB nodes that are directly or indirectly served by the migrating IAB node;
    preparing and sending (1709) a handover acknowledge message to the second network node, the handover acknowledge message including a list of admitted and not admitted protocol data units, PDU, session resources that are associated with the UEs and IAB nodes and containing the group handover command; and
    receiving (1711) an RRC Reconfiguration Complete message corresponding to an MT of the migrating IAB node and/or an MT of any IAB node and/or UE that are directly or indirectly served by the migrating IAB node.

14. The network node (1600) of Embodiment 13 wherein in generating the group handover command, the memory contains instructions that when executed by the processing circuitry causes the network node to perform operations comprising:
  for each hop starting from the hop where leaf nodes under a subtree below the migrating IAB node where the IAB nodes with no children nodes are located and ending when a level of the migrating IAB node is reached:
    for each IAB node in that hop, or if the hop corresponds to the migrating IAB node's level for the migrating IAB node, updating the handover command prepared for the MT of the IAB node including the handover command prepared for each UE and MT of each child IAB node the IAB node is serving.

15. The network node (1600) of Embodiment 14 wherein in updating the handover command, the memory contains instructions that when executed, causes the network node (1600) to perform operations comprising:
  encapsulating (1801) the handover commands of each UE and MT of child IAB node directly in the handover command prepared for the MT of the IAB node.

16. The network node (1600) of Embodiment 14 wherein in updating the handover command, the memory contains instructions that when executed, causes the network node (1600) to perform operations comprising:
  embedding (1803) an F1-application protocol, F1-AP, message in the handover command prepared for the MT of the IAB node, where the F1-AP message contains all the handover commands for the UEs/MTs of IAB nodes directly or indirectly served by the migrating IAB node.

17. The network node (1600) of Embodiment 14 wherein in updating the handover command, the memory contains instructions that when executed, causes the network node (1600) to perform operations comprising:
  encapsulating (1805) a list of F1-AP messages in the handover command for the MT of the IAB node, each message containing the handover command to each UE/MT.

18. The network node (1600) of any of Embodiments 16 and 17, where the F1-AP message comprises at least one of:
  an F1-AP downlink, DL, radio resource control, RRC, Message Transfer message
  an enhancement of the F1-AP DL RRC Message Transfer message
  anew message 19. The network node (1600) of any of Embodiments 13-18 wherein in receiving the RRC Reconfiguration Complete message, the memory contains instructions that when executed, causes the network node (1600) to perform operations comprising receiving (1901) each Reconfiguration Complete message in a separate F1-AP UL RRC message transfer message.

20. The network node (1600) of any of Embodiments 13-18 wherein in receiving the RRC Reconfiguration Complete message, the memory contains instructions that when executed, causes the network node (1600) to perform operations comprising receiving (1903) an uplink F1-AP message for each IAB node being migrated, wherein each uplink message contains the RRC complete messages of all the UEs and IAB-MT under that IAB node.

21. The network node (1600) of any of Embodiments 13-18 wherein in receiving the RRC Reconfiguration Complete message, the memory contains instructions that when executed, causes the network node (1600) to perform operations comprising receiving (1905) a single uplink F1-AP message that contains all the reconfiguration complete messages of all the migrating IAB nodes and UEs.

22. The network node (1600) of any of Embodiments 20 and 21, where the F1-AP message comprises:
  an enhancement of the F1-AP UL RRC Message Transfer message
  anew message 23. The network node (1600) of any of Embodiments 13-22, wherein the memory contains further instructions that when executed, causes the network node (1600) to perform operations further comprising:
  performing one of setting up or relocating an F1 connection between the IAB node whose MT's RRC Reconfiguration complete message is received and the first network node 24. A computer program comprising program code to be executed by processing circuitry (1603) of a network node (1600), whereby execution of the program code causes the network node (1600) to perform operations according to any of embodiments 1-11.

25. A computer program product comprising a non-transitory storage medium including program code to be executed by processing circuitry (1603) of a network node (1600), whereby execution of the program code causes the network node (1600) to perform operations according to any of embodiments 1-11.

26. A method by a migrating integrated access backhaul IAB, node, being handed over to a first network node from a second network node, the method comprising:
  receiving (2001) a handover command from the first network node, via the second network node, the handover command comprising a group handover command to a mobile termination, MT, of the migrating IAB node and handover commands to child user equipments, UEs, and to MTs of child IAB nodes;
  executing (2003) the handover command corresponding to the MT of the migrating IAB node;
  relocating (2005) an F1 connection to the first network node; and
  forwarding (2007), to each child UE and child IAB node, a corresponding handover command from within the group handover command.
27. The method of Embodiment 26, further comprising:
  receiving (2009) a reconfiguration complete message corresponding to the handover command forwarded to each child UE and child IAB node; and
  forwarding (2011) the reconfiguration complete message received to the first network node.
28. The method of Embodiment 27, wherein forwarding the reconfiguration complete message received comprises:
  forwarding (2101) each reconfiguration complete message received from each child UE or child IAB node separately using a legacy F1-AP UL RRC Transfer message.
29. The method of Embodiment 27, wherein forwarding the reconfiguration complete message received comprises:
  forwarding (2103) the reconfiguration complete message using an enhanced F1-AP UL RRC transfer message or a new message, including reconfiguration complete messages from all the UEs and children IAB-MTs directly under the IAB node.
30. An integrated access and backhaul, IAB, node (1500) adapted to perform according to any of Embodiments 26-29.
31. An integrated access and backhaul, IAB, node (1500) comprising:
  processing circuitry (5603); and
  memory (1505) coupled with the processing circuitry, wherein the memory includes instructions that when executed by the processing circuitry causes the IAB node to perform operations comprising:
    receiving (2001) a handover command from the first network node, via the second network node, the handover command comprising a group handover command to a mobile termination, MT, of the migrating IAB node and handover commands to child user equipments, UEs, and to MTs of child IAB nodes;
    executing (2003) the handover command corresponding to the MT of the migrating IAB node;
    relocating (2005) an F1 connection to the first network node; and
    forwarding (2007), to each child UE and child IAB node, a corresponding handover command from within the group handover command.
32. The IAB node (1500) of Embodiment 31, wherein the memory includes further instructions that when executed by the processing circuitry causes the IAB node to perform operations further comprising:
  receiving (2009) a reconfiguration complete message corresponding to the handover command forwarded to each child UE and child IAB node; and
  forwarding (2011) the reconfiguration complete message received to the first network node.
33. The IAB node (1500) of Embodiment 32, wherein in forwarding the reconfiguration complete message received, the memory includes instructions that when executed by the processing circuitry causes the IAB node to perform operations comprising:
  forwarding (2101) each reconfiguration complete message received from each child UE or child IAB node separately using a legacy F1-AP UL RRC Transfer message.
34. The IAB node (1500) of Embodiment 32, wherein in forwarding the reconfiguration complete message received, the memory includes instructions that when executed by the processing circuitry causes the IAB node to perform operations comprising:
  forwarding (2103) the reconfiguration complete message using an enhanced F1-AP UL RRC transfer message or a new message, including reconfiguration complete messages from all the UEs and children IAB-MTs directly under the IAB node.
35. A computer program comprising program code to be executed by processing circuitry (1503) of an integrated access and backhaul, IAB, node (1500), whereby execution of the program code causes the IAB node (1500) to perform operations according to any of embodiments 26-29.
36. A computer program product comprising a non-transitory storage medium including program code to be executed by processing circuitry (1503) of an integrated access and backhaul, IAB, node (1500), whereby execution of the program code causes the IAB node (1500) to perform operations according to any of embodiments 26-29.

Explanations are provided below for various abbreviations/acronyms used in the present disclosure.

Abbreviation Explanation

AMF Access and Mobility Management Function
BAP Backhaul Access Protocol
BH Backhaul
CP Control Plane
DL Downlink
DRB Dedicated Radio Bearer
DTLS Datagram Transport Layer Security
eNB Evolved Node B
F1-AP F1 Application Protocol
GTP GPRS Tunneling Protocol
HO Handover
IAB Integrated access and wireless backhaul
IP Internet Protocol
MeNB Master eNB
MT Mobile Termination
NR New Radio
PDU Protocol Data Unit
RAN Radio Access Network
RLC Radio Link Control
RRC Radio resource control
SCTP Stream Control Transmission Protocol
SDAP Service Data Adaption Protocol
SDU Service Data Unit
SeGW Security Gateway
UPF User Plane Function
SMF Session Management Function
TNL Transport Network Layer
UL Uplink
UP User Plane
References are identified below.
1. TS 38.401
2. TS 38.473
3. TS 38.423
4. TR 38.874
Additional explanation is provided below.
Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 22:
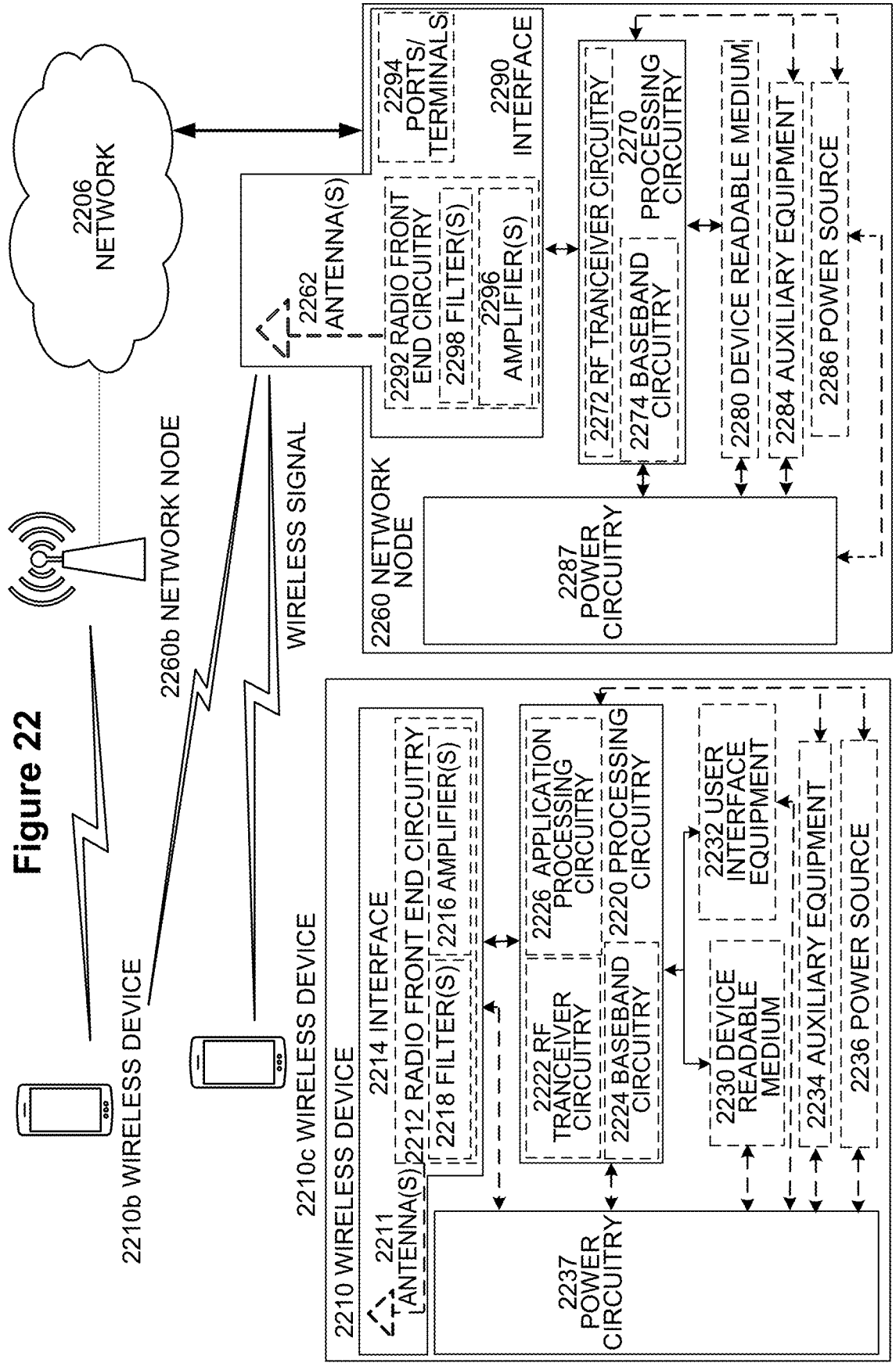
FIG. 22 is a block diagram of a wireless network in accordance with some embodiments.

FIG. 22 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 22. For simplicity, the wireless network of FIG. 22 only depicts network 2206, network nodes 2260 and 2260b, and WDs 2210, 2210b, and 2210c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 2260 and wireless device (WD) 2210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2260 and WD 2210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 22, network node 2260 includes processing circuitry 2270, device readable medium 2280, interface 2290, auxiliary equipment 2284, power source 2286, power circuitry 2287, and antenna 2262. Although network node 2260 illustrated in the example wireless network of FIG. 22 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2260 are depicted as single boxes located within a larger box, or nested within multiple boxes, in practice, a network node may comprise multiple different physical components that make up a single illustrated component (e.g., device readable medium 2280 may comprise multiple separate hard drives as well as multiple RAM modules).

Similarly, network node 2260 may be composed of multiple physically separate components (e.g., a NodeB component and a RNC component, or a BTS component and a BSC component, etc.), which may each have their own respective components. In certain scenarios in which network node 2260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2260 may be configured to support multiple radio access technologies (RATs). In such embodiments, some components may be duplicated (e.g., separate device readable medium 2280 for the different RATs) and some components may be reused (e.g., the same antenna 2262 may be shared by the RATs). Network node 2260 may also include multiple sets of the various illustrated components for different wireless technologies integrated into network node 2260, such as, for example, GSM, WCDMA, LTE, NR, WiFi, or Bluetooth wireless technologies. These wireless technologies may be integrated into the same or different chip or set of chips and other components within network node 2260.

Processing circuitry 2270 is configured to perform any determining, calculating, or similar operations (e.g., certain obtaining operations) described herein as being provided by a network node. These operations performed by processing circuitry 2270 may include processing information obtained by processing circuitry 2270 by, for example, converting the obtained information into other information, comparing the obtained information or converted information to information stored in the network node, and/or performing one or more operations based on the obtained information or converted information, and as a result of said processing making a determination.

Processing circuitry 2270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2260 components, such as device readable medium 2280, network node 2260 functionality. For example, processing circuitry 2270 may execute instructions stored in device readable medium 2280 or in memory within processing circuitry 2270. Such functionality may include providing any of the various wireless features, functions, or benefits discussed herein. In some embodiments, processing circuitry 2270 may include a system on a chip (SOC).

In some embodiments, processing circuitry 2270 may include one or more of radio frequency (RF) transceiver circuitry 2272 and baseband processing circuitry 2274. In some embodiments, radio frequency (RF) transceiver circuitry 2272 and baseband processing circuitry 2274 may be on separate chips (or sets of chips), boards, or units, such as radio units and digital units. In alternative embodiments, part or all of RF transceiver circuitry 2272 and baseband processing circuitry 2274 may be on the same chip or set of chips, boards, or units In certain embodiments, some or all of the functionality described herein as being provided by a network node, base station, eNB or other such network device may be performed by processing circuitry 2270 executing instructions stored on device readable medium 2280 or memory within processing circuitry 2270. In alternative embodiments, some or all of the functionality may be provided by processing circuitry 2270 without executing instructions stored on a separate or discrete device readable medium, such as in a hard-wired manner. In any of those embodiments, whether executing instructions stored on a device readable storage medium or not, processing circuitry 2270 can be configured to perform the described functionality. The benefits provided by such functionality are not limited to processing circuitry 2270 alone or to other components of network node 2260, but are enjoyed by network node 2260 as a whole, and/or by end users and the wireless network generally.

Device readable medium 2280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2270. Device readable medium 2280 may store any suitable instructions, data or information, including a computer program, software, an application including one or more of logic, rules, code, tables, etc. and/or other instructions capable of being executed by processing circuitry 2270 and, utilized by network node 2260. Device readable medium 2280 may be used to store any calculations made by processing circuitry 2270 and/or any data received via interface 2290. In some embodiments, processing circuitry 2270 and device readable medium 2280 may be considered to be integrated.

Interface 2290 is used in the wired or wireless communication of signalling and/or data between network node 2260, network 2206, and/or WDs 2210. As illustrated, interface 2290 comprises port(s)/terminal(s) 2294 to send and receive data, for example to and from network 2206 over a wired connection. Interface 2290 also includes radio front end circuitry 2292 that may be coupled to, or in certain embodiments a part of, antenna 2262. Radio front end circuitry 2292 comprises filters 2298 and amplifiers 2296. Radio front end circuitry 2292 may be connected to antenna 2262 and processing circuitry 2270. Radio front end circuitry may be configured to condition signals communicated between antenna 2262 and processing circuitry 2270. Radio front end circuitry 2292 may receive digital data that is to be sent out to other network nodes or WDs via a wireless connection. Radio front end circuitry 2292 may convert the digital data into a radio signal having the appropriate channel and bandwidth parameters using a combination of filters 2298 and/or amplifiers 2296. The radio signal may then be transmitted via antenna 2262. Similarly, when receiving data, antenna 2262 may collect radio signals which are then converted into digital data by radio front end circuitry 2292. The digital data may be passed to processing circuitry 2270. In other embodiments, the interface may comprise different components and/or different combinations of components.

In certain alternative embodiments, network node 2260 may not include separate radio front end circuitry 2292, instead, processing circuitry 2270 may comprise radio front end circuitry and may be connected to antenna 2262 without separate radio front end circuitry 2292. Similarly, in some embodiments, all or some of RF transceiver circuitry 2272 may be considered a part of interface 2290. In still other embodiments, interface 2290 may include one or more ports or terminals 2294, radio front end circuitry 2292, and RF transceiver circuitry 2272, as part of a radio unit (not shown), and interface 2290 may communicate with baseband processing circuitry 2274, which is part of a digital unit (not shown).

Antenna 2262 may include one or more antennas, or antenna arrays, configured to send and/or receive wireless signals. Antenna 2262 may be coupled to radio front end circuitry 2292 and may be any type of antenna capable of transmitting and receiving data and/or signals wirelessly. In some embodiments, antenna 2262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2262 may be separate from network node 2260 and may be connectable to network node 2260 through an interface or port.

Antenna 2262, interface 2290, and/or processing circuitry 2270 may be configured to perform any receiving operations and/or certain obtaining operations described herein as being performed by a network node. Any information, data and/or signals may be received from a wireless device, another network node and/or any other network equipment. Similarly, antenna 2262, interface 2290, and/or processing circuitry 2270 may be configured to perform any transmitting operations described herein as being performed by a network node. Any information, data and/or signals may be transmitted to a wireless device, another network node and/or any other network equipment.

Power circuitry 2287 may comprise, or be coupled to, power management circuitry and is configured to supply the components of network node 2260 with power for performing the functionality described herein. Power circuitry 2287 may receive power from power source 2286. Power source 2286 and/or power circuitry 2287 may be configured to provide power to the various components of network node 2260 in a form suitable for the respective components (e.g., at a voltage and current level needed for each respective component). Power source 2286 may either be included in, or external to, power circuitry 2287 and/or network node 2260. For example, network node 2260 may be connectable to an external power source (e.g., an electricity outlet) via an input circuitry or interface such as an electrical cable, whereby the external power source supplies power to power circuitry 2287. As a further example, power source 2286 may comprise a source of power in the form of a battery or battery pack which is connected to, or integrated in, power circuitry 2287. The battery may provide backup power should the external power source fail. Other types of power sources, such as photovoltaic devices, may also be used.

Alternative embodiments of network node 2260 may include additional components beyond those shown in FIG. 22 that may be responsible for providing certain aspects of the network node's functionality, including any of the functionality described herein and/or any functionality necessary to support the subject matter described herein. For example, network node 2260 may include user interface equipment to allow input of information into network node 2260 and to allow output of information from network node 2260. This may allow a user to perform diagnostic, maintenance, repair, and other administrative functions for network node 2260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2210 includes antenna 2211, interface 2214, processing circuitry 2220, device readable medium 2230, user interface equipment 2232, auxiliary equipment 2234, power source 2236 and power circuitry 2237. WD 2210 may include multiple sets of one or more of the illustrated components for different wireless technologies supported by WD 2210, such as, for example, GSM, WCDMA, LTE, NR, WiFi, WiMAX, or Bluetooth wireless technologies, just to mention a few. These wireless technologies may be integrated into the same or different chips or set of chips as other components within WD 2210.

Antenna 2211 may include one or more antennas or antenna arrays, configured to send and/or receive wireless signals, and is connected to interface 2214. In certain alternative embodiments, antenna 2211 may be separate from WD 2210 and be connectable to WD 2210 through an interface or port. Antenna 2211, interface 2214, and/or processing circuitry 2220 may be configured to perform any receiving or transmitting operations described herein as being performed by a WD. Any information, data and/or signals may be received from a network node and/or another WD. In some embodiments, radio front end circuitry and/or antenna 2211 may be considered an interface.

As illustrated, interface 2214 comprises radio front end circuitry 2212 and antenna 2211. Radio front end circuitry 2212 comprise one or more filters 2218 and amplifiers 2216. Radio front end circuitry 2212 is connected to antenna 2211 and processing circuitry 2220, and is configured to condition signals communicated between antenna 2211 and processing circuitry 2220. Radio front end circuitry 2212 may be coupled to or a part of antenna 2211. In some embodiments, WD 2210 may not include separate radio front end circuitry 2212; rather, processing circuitry 2220 may comprise radio front end circuitry and may be connected to antenna 2211. Similarly, in some embodiments, some or all of RF transceiver circuitry 2222 may be considered a part of interface 2214. Radio front end circuitry 2212 may receive digital data that is to be sent out to other network nodes or WDs via a wireless connection. Radio front end circuitry 2212 may convert the digital data into a radio signal having the appropriate channel and bandwidth parameters using a combination of filters 2218 and/or amplifiers 2216. The radio signal may then be transmitted via antenna 2211. Similarly, when receiving data, antenna 2211 may collect radio signals which are then converted into digital data by radio front end circuitry 2212. The digital data may be passed to processing circuitry 2220. In other embodiments, the interface may comprise different components and/or different combinations of components.

Processing circuitry 2220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2210 components, such as device readable medium 2230, WD 2210 functionality. Such functionality may include providing any of the various wireless features or benefits discussed herein. For example, processing circuitry 2220 may execute instructions stored in device readable medium 2230 or in memory within processing circuitry 2220 to provide the functionality disclosed herein.

As illustrated, processing circuitry 2220 includes one or more of RF transceiver circuitry 2222, baseband processing circuitry 2224, and application processing circuitry 2226. In other embodiments, the processing circuitry may comprise different components and/or different combinations of components. In certain embodiments processing circuitry 2220 of WD 2210 may comprise a SOC. In some embodiments, RF transceiver circuitry 2222, baseband processing circuitry 2224, and application processing circuitry 2226 may be on separate chips or sets of chips. In alternative embodiments, part or all of baseband processing circuitry 2224 and application processing circuitry 2226 may be combined into one chip or set of chips, and RF transceiver circuitry 2222 may be on a separate chip or set of chips. In still alternative embodiments, part or all of RF transceiver circuitry 2222 and baseband processing circuitry 2224 may be on the same chip or set of chips, and application processing circuitry 2226 may be on a separate chip or set of chips. In yet other alternative embodiments, part or all of RF transceiver circuitry 2222, baseband processing circuitry 2224, and application processing circuitry 2226 may be combined in the same chip or set of chips. In some embodiments, RF transceiver circuitry 2222 may be a part of interface 2214. RF transceiver circuitry 2222 may condition RF signals for processing circuitry 2220.

In certain embodiments, some or all of the functionality described herein as being performed by a WD may be provided by processing circuitry 2220 executing instructions stored on device readable medium 2230, which in certain embodiments may be a computer-readable storage medium. In alternative embodiments, some or all of the functionality may be provided by processing circuitry 2220 without executing instructions stored on a separate or discrete device readable storage medium, such as in a hard-wired manner. In any of those particular embodiments, whether executing instructions stored on a device readable storage medium or not, processing circuitry 2220 can be configured to perform the described functionality. The benefits provided by such functionality are not limited to processing circuitry 2220 alone or to other components of WD 2210, but are enjoyed by WD 2210 as a whole, and/or by end users and the wireless network generally.

Processing circuitry 2220 may be configured to perform any determining, calculating, or similar operations (e.g., certain obtaining operations) described herein as being performed by a WD. These operations, as performed by processing circuitry 2220, may include processing information obtained by processing circuitry 2220 by, for example, converting the obtained information into other information, comparing the obtained information or converted information to information stored by WD 2210, and/or performing one or more operations based on the obtained information or converted information, and as a result of said processing making a determination.

Device readable medium 2230 may be operable to store a computer program, software, an application including one or more of logic, rules, code, tables, etc. and/or other instructions capable of being executed by processing circuitry 2220. Device readable medium 2230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2220. In some embodiments, processing circuitry 2220 and device readable medium 2230 may be considered to be integrated.

User interface equipment 2232 may provide components that allow for a human user to interact with WD 2210. Such interaction may be of many forms, such as visual, audial, tactile, etc. User interface equipment 2232 may be operable to produce output to the user and to allow the user to provide input to WD 2210. The type of interaction may vary depending on the type of user interface equipment 2232 installed in WD 2210. For example, if WD 2210 is a smart phone, the interaction may be via a touch screen; if WD 2210 is a smart meter, the interaction may be through a screen that provides usage (e.g., the number of gallons used) or a speaker that provides an audible alert (e.g., if smoke is detected). User interface equipment 2232 may include input interfaces, devices and circuits, and output interfaces, devices and circuits. User interface equipment 2232 is configured to allow input of information into WD 2210, and is connected to processing circuitry 2220 to allow processing circuitry 2220 to process the input information. User interface equipment 2232 may include, for example, a microphone, a proximity or other sensor, keys/buttons, a touch display, one or more cameras, a USB port, or other input circuitry. User interface equipment 2232 is also configured to allow output of information from WD 2210, and to allow processing circuitry 2220 to output information from WD 2210. User interface equipment 2232 may include, for example, a speaker, a display, vibrating circuitry, a USB port, a headphone interface, or other output circuitry. Using one or more input and output interfaces, devices, and circuits, of user interface equipment 2232, WD 2210 may communicate with end users and/or the wireless network, and allow them to benefit from the functionality described herein.

Auxiliary equipment 2234 is operable to provide more specific functionality which may not be generally performed by WDs. This may comprise specialized sensors for doing measurements for various purposes, interfaces for additional types of communication such as wired communications etc. The inclusion and type of components of auxiliary equipment 2234 may vary depending on the embodiment and/or scenario.

Power source 2236 may, in some embodiments, be in the form of a battery or battery pack. Other types of power sources, such as an external power source (e.g., an electricity outlet), photovoltaic devices or power cells, may also be used. WD 2210 may further comprise power circuitry 2237 for delivering power from power source 2236 to the various parts of WD 2210 which need power from power source 2236 to carry out any functionality described or indicated herein. Power circuitry 2237 may in certain embodiments comprise power management circuitry. Power circuitry 2237 may additionally or alternatively be operable to receive power from an external power source; in which case WD 2210 may be connectable to the external power source (such as an electricity outlet) via input circuitry or an interface such as an electrical power cable. Power circuitry 2237 may also in certain embodiments be operable to deliver power from an external power source to power source 2236. This may be, for example, for the charging of power source 2236. Power circuitry 2237 may perform any formatting, converting, or other modification to the power from power source 2236 to make the power suitable for the respective components of WD 2210 to which power is supplied.

Figure 23:
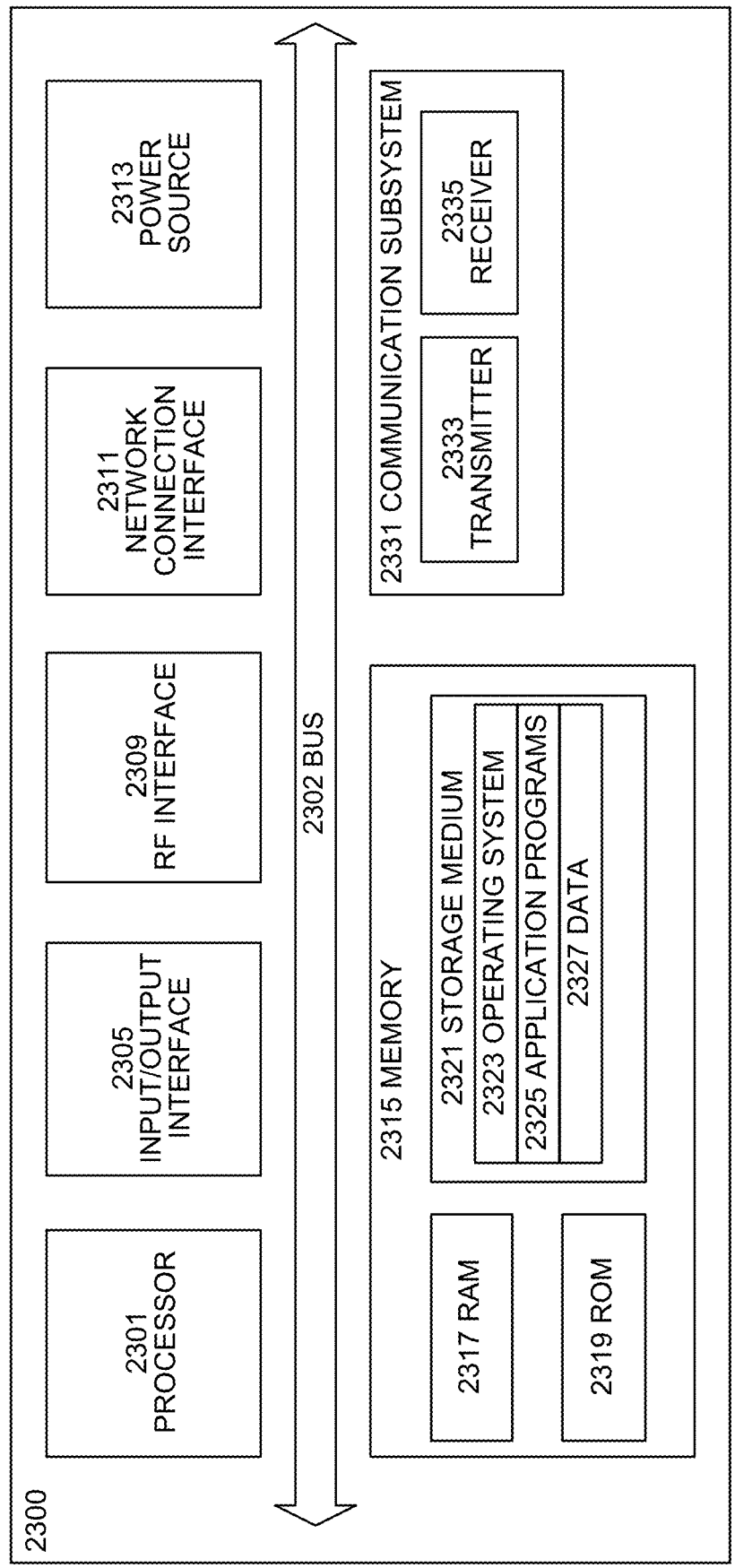
FIG. 23 is a block diagram of a user equipment in accordance with some embodiments

FIG. 23 illustrates a user Equipment in accordance with some embodiments.

FIG. 23 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2300 may be any UE identified by the 3rd Generation Partnership Project (3GPP), including a NB-IoT UE, a machine type communication (MTC) UE, and/or an enhanced MTC (eMTC) UE. UE 2300, as illustrated in FIG. 23, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 23 is a UE, the components discussed herein are equally applicable to a WD, and vice-versa.

In FIG. 23, UE 2300 includes processing circuitry 2301 that is operatively coupled to input/output interface 2305, radio frequency (RF) interface 2309, network connection interface 2311, memory 2315 including random access memory (RAM) 2317, read-only memory (ROM) 2319, and storage medium 2321 or the like, communication subsystem 2331, power source 2313, and/or any other component, or any combination thereof. Storage medium 2321 includes operating system 2323, application program 2325, and data 2327. In other embodiments, storage medium 2321 may include other similar types of information. Certain UEs may utilize all of the components shown in FIG. 23, or only a subset of the components. The level of integration between the components may vary from one UE to another UE. Further, certain UEs may contain multiple instances of a component, such as multiple processors, memories, transceivers, transmitters, receivers, etc.

In FIG. 23, processing circuitry 2301 may be configured to process computer instructions and data. Processing circuitry 2301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2301 may include two central processing units (CPUs). Data may be information in a form suitable for use by a computer.

In the depicted embodiment, input/output interface 2305 may be configured to provide a communication interface to an input device, output device, or input and output device. UE 2300 may be configured to use an output device via input/output interface 2305. An output device may use the same type of interface port as an input device. For example, a USB port may be used to provide input to and output from UE 2300. The output device may be a speaker, a sound card, a video card, a display, a monitor, a printer, an actuator, an emitter, a smartcard, another output device, or any combination thereof. UE 2300 may be configured to use an input device via input/output interface 2305 to allow a user to capture information into UE 2300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 23, RF interface 2309 may be configured to provide a communication interface to RF components such as a transmitter, a receiver, and an antenna. Network connection interface 2311 may be configured to provide a communication interface to network 2343*a*. Network 2343*a* may encompass wired and/or wireless networks such as a local-area network (LAN), a wide-area network (WAN), a computer network, a wireless network, a telecommunications network, another like network or any combination thereof. For example, network 2343*a* may comprise a Wi-Fi network. Network connection interface 2311 may be configured to include a receiver and a transmitter interface used to communicate with one or more other devices over a communication network according to one or more communication protocols, such as Ethernet, TCP/IP, SONET, ATM, or the like. Network connection interface 2311 may implement receiver and transmitter functionality appropriate to the communication network links (e.g., optical, electrical, and the like). The transmitter and receiver functions may share circuit components, software or firmware, or alternatively may be implemented separately.

RAM 2317 may be configured to interface via bus 2302 to processing circuitry 2301 to provide storage or caching of data or computer instructions during the execution of software programs such as the operating system, application programs, and device drivers. ROM 2319 may be configured to provide computer instructions or data to processing circuitry 2301. For example, ROM 2319 may be configured to store invariant low-level system code or data for basic system functions such as basic input and output (I/O), startup, or reception of keystrokes from a keyboard that are stored in a non-volatile memory. Storage medium 2321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2321 may be configured to include operating system 2323, application program 2325 such as a web browser application, a widget or gadget engine or another application, and data file 2327. Storage medium 2321 may store, for use by UE 2300, any of a variety of various operating systems or combinations of operating systems.

Storage medium 2321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2321 may allow UE 2300 to access computer-executable instructions, application programs or the like, stored on transitory or non-transitory memory media, to off-load data, or to upload data. An article of manufacture, such as one utilizing a communication system may be tangibly embodied in storage medium 2321, which may comprise a device readable medium.

In FIG. 23, processing circuitry 2301 may be configured to communicate with network 2343*b* using communication subsystem 2331. Network 2343*a* and network 2343*b* may be the same network or networks or different network or networks. Communication subsystem 2331 may be configured to include one or more transceivers used to communicate with network 2343*b*. For example, communication subsystem 2331 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 2333 and/or receiver 2335 to implement transmitter or receiver functionality, respectively, appropriate to the RAN links (e.g., frequency allocations and the like). Further, transmitter 2333 and receiver 2335 of each transceiver may share circuit components, software or firmware, or alternatively may be implemented separately.

In the illustrated embodiment, the communication functions of communication subsystem 2331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2331 may include cellular communication, Wi-Fi communication, Bluetooth communication, and GPS communication. Network 2343*b* may encompass wired and/or wireless networks such as a local-area network (LAN), a wide-area network (WAN), a computer network, a wireless network, a telecommunications network, another like network or any combination thereof. For example, network 2343*b* may be a cellular network, a Wi-Fi network, and/or a near-field network. Power source 2313 may be configured to provide alternating current (AC) or direct current (DC) power to components of UE 2300.

The features, benefits and/or functions described herein may be implemented in one of the components of UE 2300 or partitioned across multiple components of UE 2300. Further, the features, benefits, and/or functions described herein may be implemented in any combination of hardware, software or firmware. In one example, communication subsystem 2331 may be configured to include any of the components described herein. Further, processing circuitry 2301 may be configured to communicate with any of such components over bus 2302. In another example, any of such components may be represented by program instructions stored in memory that when executed by processing circuitry 2301 perform the corresponding functions described herein. In another example, the functionality of any of such components may be partitioned between processing circuitry 2301 and communication subsystem 2331. In another example, the non-computationally intensive functions of any of such components may be implemented in software or firmware and the computationally intensive functions may be implemented in hardware.

Figure 24:
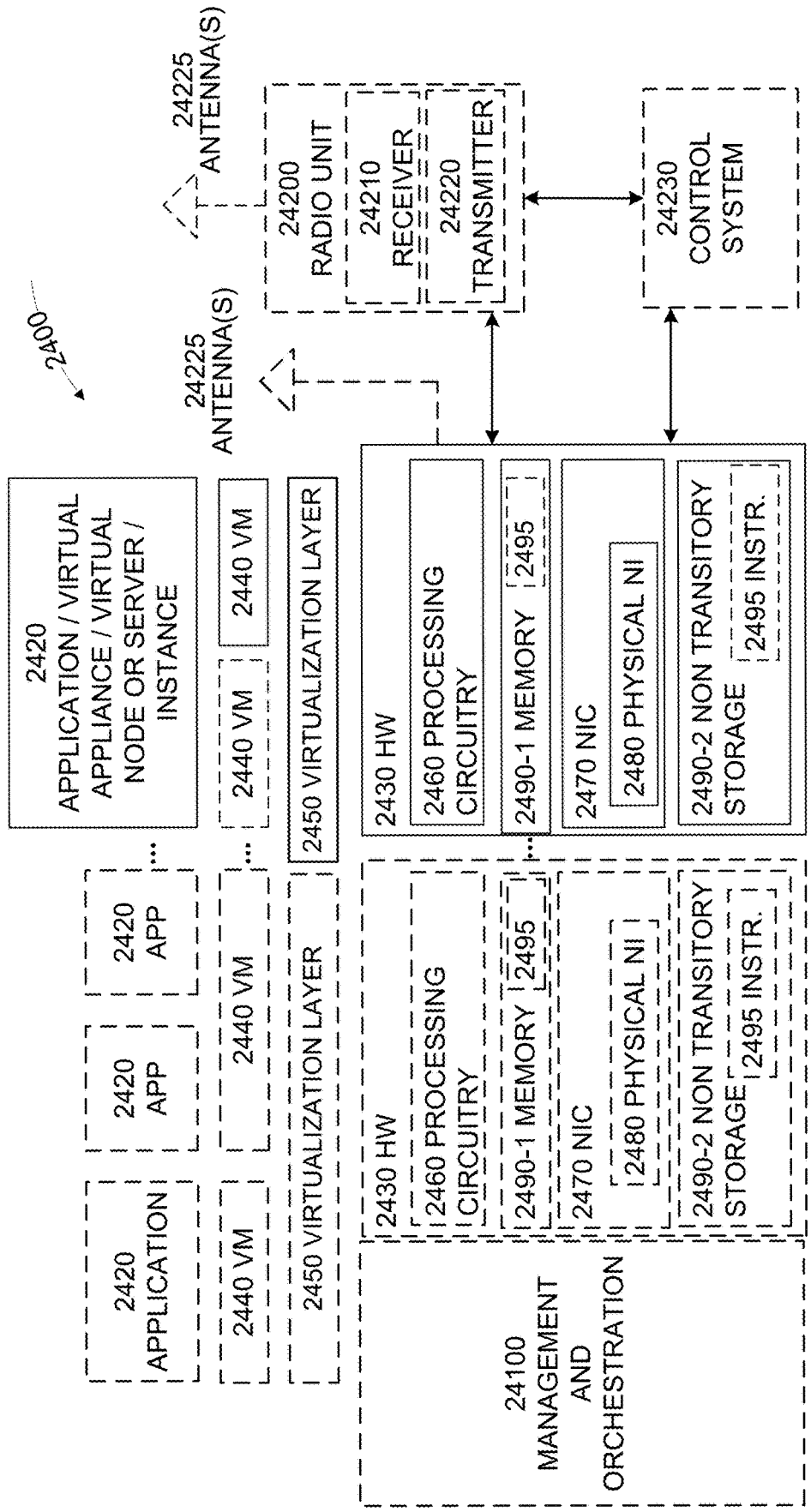
FIG. 24 is a block diagram of a virtualization environment in accordance with some embodiments.

FIG. 24 illustrates a virtualization environment in accordance with some embodiments.

FIG. 24 is a schematic block diagram illustrating a virtualization environment 2400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2400 hosted by one or more of hardware nodes 2430. Further, in embodiments in which the virtual node is not a radio access node or does not require radio connectivity (e.g., a core network node), then the network node may be entirely virtualized.

The functions may be implemented by one or more applications 2420 (which may alternatively be called software instances, virtual appliances, network functions, virtual nodes, virtual network functions, etc.) operative to implement some of the features, functions, and/or benefits of some of the embodiments disclosed herein. Applications 2420 are run in virtualization environment 2400 which provides hardware 2430 comprising processing circuitry 2460 and memory 2490. Memory 2490 contains instructions 2495 executable by processing circuitry 2460 whereby application 2420 is operative to provide one or more of the features, benefits, and/or functions disclosed herein.

Virtualization environment 2400, comprises general-purpose or special-purpose network hardware devices 2430 comprising a set of one or more processors or processing circuitry 2460, which may be commercial off-the-shelf (COTS) processors, dedicated Application Specific Integrated Circuits (ASICs), or any other type of processing circuitry including digital or analog hardware components or special purpose processors. Each hardware device may comprise memory 2490-1 which may be non-persistent memory for temporarily storing instructions 2495 or software executed by processing circuitry 2460. Each hardware device may comprise one or more network interface controllers (NICs) 2470, also known as network interface cards, which include physical network interface 2480. Each hardware device may also include non-transitory, persistent, machine-readable storage media 2490-2 having stored therein software 2495 and/or instructions executable by processing circuitry 2460. Software 2495 may include any type of software including software for instantiating one or more virtualization layers 2450 (also referred to as hypervisors), software to execute virtual machines 2440 as well as software allowing it to execute functions, features and/or benefits described in relation with some embodiments described herein.

Virtual machines 2440 comprise virtual processing, virtual memory, virtual networking or interface and virtual storage, and may be run by a corresponding virtualization layer 2450 or hypervisor. Different embodiments of the instance of virtual appliance 2420 may be implemented on one or more of virtual machines 2440, and the implementations may be made in different ways.

During operation, processing circuitry 2460 executes software 2495 to instantiate the hypervisor or virtualization layer 2450, which may sometimes be referred to as a virtual machine monitor (VMM). Virtualization layer 2450 may present a virtual operating platform that appears like networking hardware to virtual machine 2440.

As shown in FIG. 24, hardware 2430 may be a standalone network node with generic or specific components. Hardware 2430 may comprise antenna 24225 and may implement some functions via virtualization. Alternatively, hardware 2430 may be part of a larger cluster of hardware (e.g., such as in a data center or customer premise equipment (CPE)) where many hardware nodes work together and are managed via management and orchestration (MANO) 24100, which, among others, oversees lifecycle management of applications 2420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2440 may be a software implementation of a physical machine that runs programs as if they were executing on a physical, non-virtualized machine. Each of virtual machines 2440, and that part of hardware 2430 that executes that virtual machine, be it hardware dedicated to that virtual machine and/or hardware shared by that virtual machine with others of the virtual machines 2440, forms a separate virtual network element (VNE).

Still in the context of NFV, Virtual Network Function (VNF) is responsible for handling specific network functions that run in one or more virtual machines 2440 on top of hardware networking infrastructure 2430 and corresponds to application 2420 in FIG. 24.

In some embodiments, one or more radio units 24200 that each include one or more transmitters 24220 and one or more receivers 24210 may be coupled to one or more antennas 24225. Radio units 24200 may communicate directly with hardware nodes 2430 via one or more appropriate network interfaces and may be used in combination with the virtual components to provide a virtual node with radio capabilities, such as a radio access node or a base station.

In some embodiments, some signalling can be effected with the use of control system 24230 which may alternatively be used for communication between the hardware nodes 2430 and radio units 24200.

Figure 25:
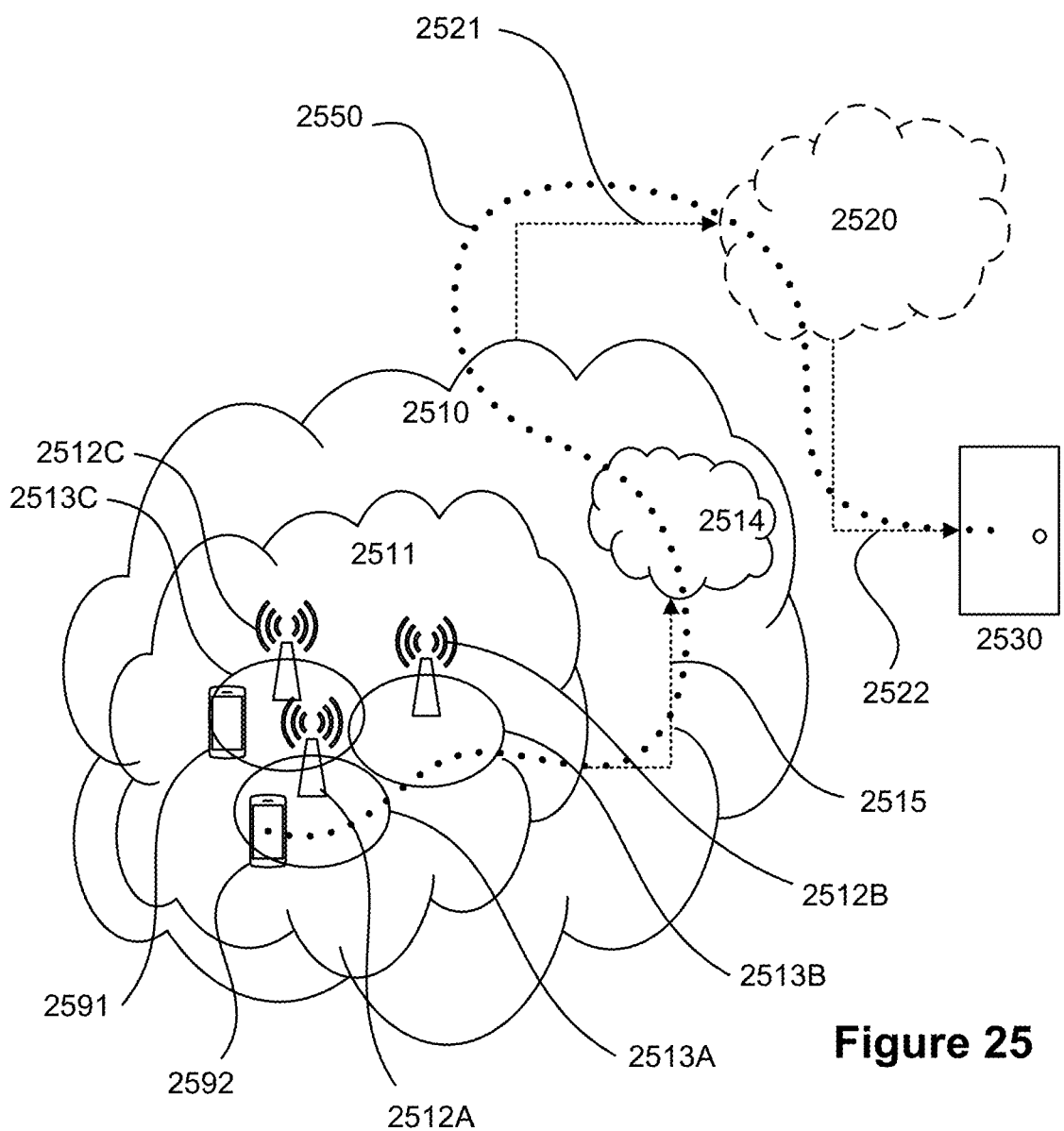
FIG. 25 is a block diagram of a telecommunication network connected via an intermediate network to a host computer in accordance with some embodiments.

FIG. 25 illustrates a telecommunication network connected via an intermediate network to a host computer in accordance with some embodiments.

With reference to FIG. 25, in accordance with an embodiment, a communication system includes telecommunication network 2510, such as a 3GPP-type cellular network, which comprises access network 2511, such as a radio access network, and core network 2514. Access network 2511 comprises a plurality of base stations 2512a, 2512b, 2512c, such as NBs, eNBs, gNBs or other types of wireless access points, each defining a corresponding coverage area 2513a, 2513b, 2513c. Each base station 2512a, 2512b, 2512c is connectable to core network 2514 over a wired or wireless connection 2515. A first UE 2591 located in coverage area 2513c is configured to wirelessly connect to, or be paged by, the corresponding base station 2512c. A second UE 2592 in coverage area 2513a is wirelessly connectable to the corresponding base station 2512a. While a plurality of UEs 2591, 2592 are illustrated in this example, the disclosed embodiments are equally applicable to a situation where a sole UE is in the coverage area or where a sole UE is connecting to the corresponding base station 2512.

Telecommunication network 2510 is itself connected to host computer 2530, which may be embodied in the hardware and/or software of a standalone server, a cloud-implemented server, a distributed server or as processing resources in a server farm. Host computer 2530 may be under the ownership or control of a service provider, or may be operated by the service provider or on behalf of the service provider. Connections 2521 and 2522 between telecommunication network 2510 and host computer 2530 may extend directly from core network 2514 to host computer 2530 or may go via an optional intermediate network 2520. Intermediate network 2520 may be one of, or a combination of more than one of, a public, private or hosted network; intermediate network 2520, if any, may be a backbone network or the Internet; in particular, intermediate network 2520 may comprise two or more sub-networks (not shown).

The communication system of FIG. 25 as a whole enables connectivity between the connected UEs 2591, 2592 and host computer 2530. The connectivity may be described as an over-the-top (OTT) connection 2550. Host computer 2530 and the connected UEs 2591, 2592 are configured to communicate data and/or signaling via OTT connection 2550, using access network 2511, core network 2514, any intermediate network 2520 and possible further infrastructure (not shown) as intermediaries. OTT connection 2550 may be transparent in the sense that the participating communication devices through which OTT connection 2550 passes are unaware of routing of uplink and downlink communications. For example, base station 2512 may not or need not be informed about the past routing of an incoming downlink communication with data originating from host computer 2530 to be forwarded (e.g., handed over) to a connected UE 2591. Similarly, base station 2512 need not be aware of the future routing of an outgoing uplink communication originating from the UE 2591 towards the host computer 2530.

Figure 26:
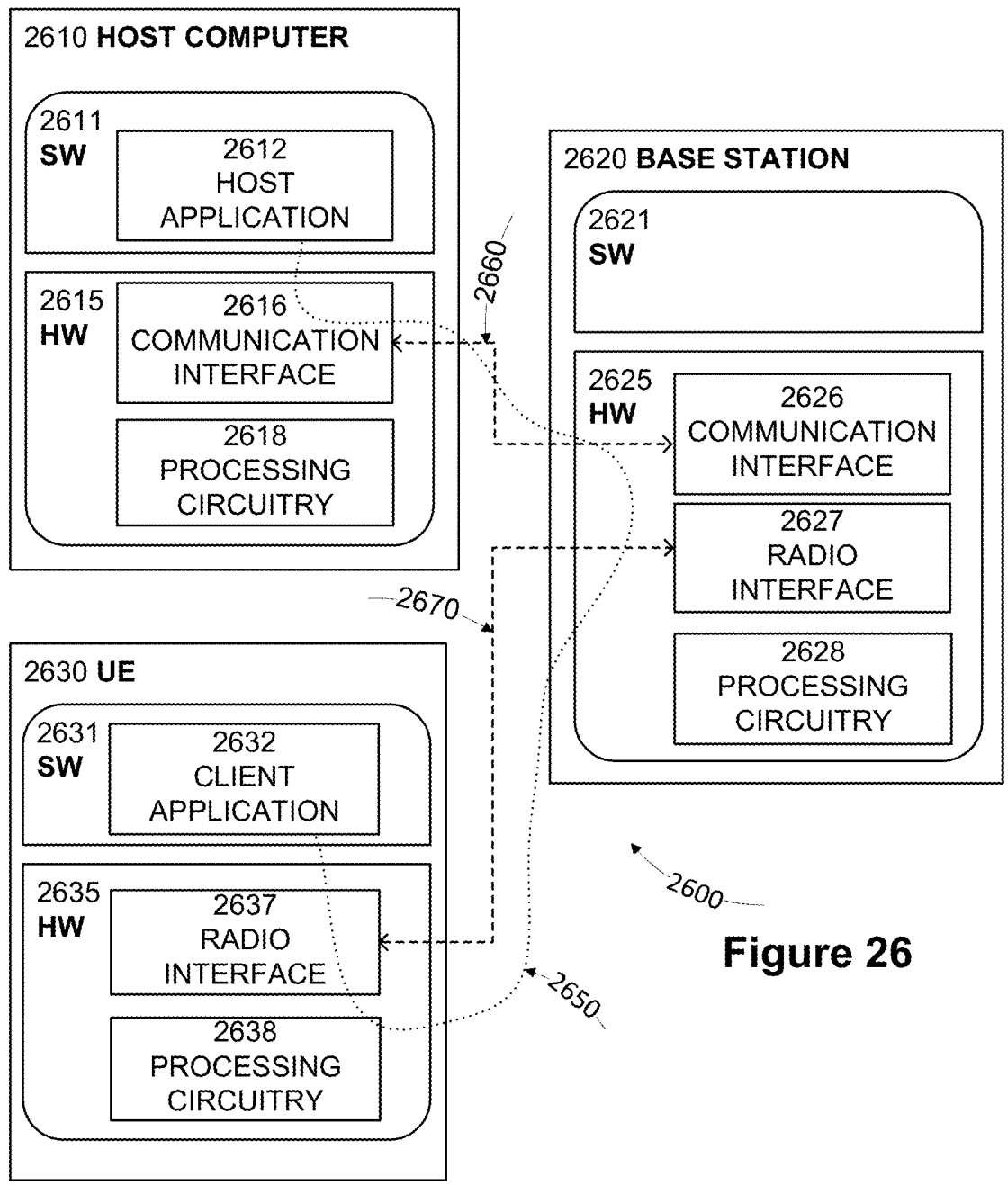
FIG. 26 is a block diagram of a host computer communicating via a base station with a user equipment over a partially wireless connection in accordance with some embodiments.

FIG. 26 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 26. In communication system 2600, host computer 2610 comprises hardware 2615 including communication interface 2616 configured to set up and maintain a wired or wireless connection with an interface of a different communication device of communication system 2600. Host computer 2610 further comprises processing circuitry 2618, which may have storage and/or processing capabilities. In particular, processing circuitry 2618 may comprise one or more programmable processors, application-specific integrated circuits, field programmable gate arrays or combinations of these (not shown) adapted to execute instructions. Host computer 2610 further comprises software 2611, which is stored in or accessible by host computer 2610 and executable by processing circuitry 2618. Software 2611 includes host application 2612. Host application 2612 may be operable to provide a service to a remote user, such as UE 2630 connecting via OTT connection 2650 terminating at UE 2630 and host computer 2610. In providing the service to the remote user, host application 2612 may provide user data which is transmitted using OTT connection 2650.

Communication system 2600 further includes base station 2620 provided in a telecommunication system and comprising hardware 2625 enabling it to communicate with host computer 2610 and with UE 2630. Hardware 2625 may include communication interface 2626 for setting up and maintaining a wired or wireless connection with an interface of a different communication device of communication system 2600, as well as radio interface 2627 for setting up and maintaining at least wireless connection 2670 with UE 2630 located in a coverage area (not shown in FIG. 26) served by base station 2620. Communication interface 2626 may be configured to facilitate connection 2660 to host computer 2610. Connection 2660 may be direct or it may pass through a core network (not shown in FIG. 26) of the telecommunication system and/or through one or more intermediate networks outside the telecommunication system. In the embodiment shown, hardware 2625 of base station 2620 further includes processing circuitry 2628, which may comprise one or more programmable processors, application-specific integrated circuits, field programmable gate arrays or combinations of these (not shown) adapted to execute instructions. Base station 2620 further has software 2621 stored internally or accessible via an external connection.

Communication system 2600 further includes UE 2630 already referred to. Its hardware 2635 may include radio interface 2637 configured to set up and maintain wireless connection 2670 with a base station serving a coverage area in which UE 2630 is currently located. Hardware 2635 of UE 2630 further includes processing circuitry 2638, which may comprise one or more programmable processors, application-specific integrated circuits, field programmable gate arrays or combinations of these (not shown) adapted to execute instructions. UE 2630 further comprises software 2631, which is stored in or accessible by UE 2630 and executable by processing circuitry 2638. Software 2631 includes client application 2632. Client application 2632 may be operable to provide a service to a human or non-human user via UE 2630, with the support of host computer 2610. In host computer 2610, an executing host application 2612 may communicate with the executing client application 2632 via OTT connection 2650 terminating at UE 2630 and host computer 2610. In providing the service to the user, client application 2632 may receive request data from host application 2612 and provide user data in response to the request data. OTT connection 2650 may transfer both the request data and the user data. Client application 2632 may interact with the user to generate the user data that it provides.

It is noted that host computer 2610, base station 2620 and UE 2630 illustrated in FIG. 26 may be similar or identical to host computer 2530, one of base stations 2512a, 2512b, 2512c and one of UEs 2591, 2592 of FIG. 25, respectively. This is to say, the inner workings of these entities may be as shown in FIG. 26 and independently, the surrounding network topology may be that of FIG. 25.

In FIG. 26, OTT connection 2650 has been drawn abstractly to illustrate the communication between host computer 2610 and UE 2630 via base station 2620, without explicit reference to any intermediary devices and the precise routing of messages via these devices. Network infrastructure may determine the routing, which it may be configured to hide from UE 2630 or from the service provider operating host computer 2610, or both. While OTT connection 2650 is active, the network infrastructure may further take decisions by which it dynamically changes the routing (e.g., on the basis of load balancing consideration or reconfiguration of the network).

Wireless connection 2670 between UE 2630 and base station 2620 is in accordance with the teachings of the embodiments described throughout this disclosure. One or more of the various embodiments may improve the performance of OTT services provided to UE 2630 using OTT connection 2650, in which wireless connection 2670 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 2650 between host computer 2610 and UE 2630, in response to variations in the measurement results. The measurement procedure and/or the network functionality for reconfiguring OTT connection 2650 may be implemented in software 2611 and hardware 2615 of host computer 2610 or in software 2631 and hardware 2635 of UE 2630, or both. In embodiments, sensors (not shown) may be deployed in or in association with communication devices through which OTT connection 2650 passes; the sensors may participate in the measurement procedure by supplying values of the monitored quantities exemplified above, or supplying values of other physical quantities from which software 2611, 2631 may compute or estimate the monitored quantities. The reconfiguring of OTT connection 2650 may include message format, retransmission settings, preferred routing etc.; the reconfiguring need not affect base station 2620, and it may be unknown or imperceptible to base station 2620. Such procedures and functionalities may be known and practiced in the art. In certain embodiments, measurements may involve proprietary UE signaling facilitating host computer 2610's measurements of throughput, propagation times, latency and the like. The measurements may be implemented in that software 2611 and 2631 causes messages to be transmitted, in particular empty or 'dummy' messages, using OTT connection 2650 while it monitors propagation times, errors etc.

FIG. 27 illustrates methods implemented in a communication system including a host computer, a base station and a user equipment in accordance with some embodiments.

FIG. 27 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 27 will be included in this section. In step 2710, the host computer provides user data. In substep 2711 (which may be optional) of step 2710, the host computer provides the user data by executing a host application. In step 2720, the host computer initiates a transmission carrying the user data to the UE. In step 2730 (which may be optional), the base station transmits to the UE the user data which was carried in the transmission that the host computer initiated, in accordance with the teachings of the embodiments described throughout this disclosure. In step 2740 (which may also be optional), the UE executes a client application associated with the host application executed by the host computer.

FIG. 28 illustrates methods implemented in a communication system including a host computer, a base station and a user equipment in accordance with some embodiments.

FIG. 28 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 28 will be included in this section. In step 2810 of the method, the host computer provides user data. In an optional substep (not shown) the host computer provides the user data by executing a host application. In step 2820, the host computer initiates a transmission carrying the user data to the UE. The transmission may pass via the base station, in accordance with the teachings of the embodiments described throughout this disclosure. In step 2830 (which may be optional), the UE receives the user data carried in the transmission.

Figure 29:
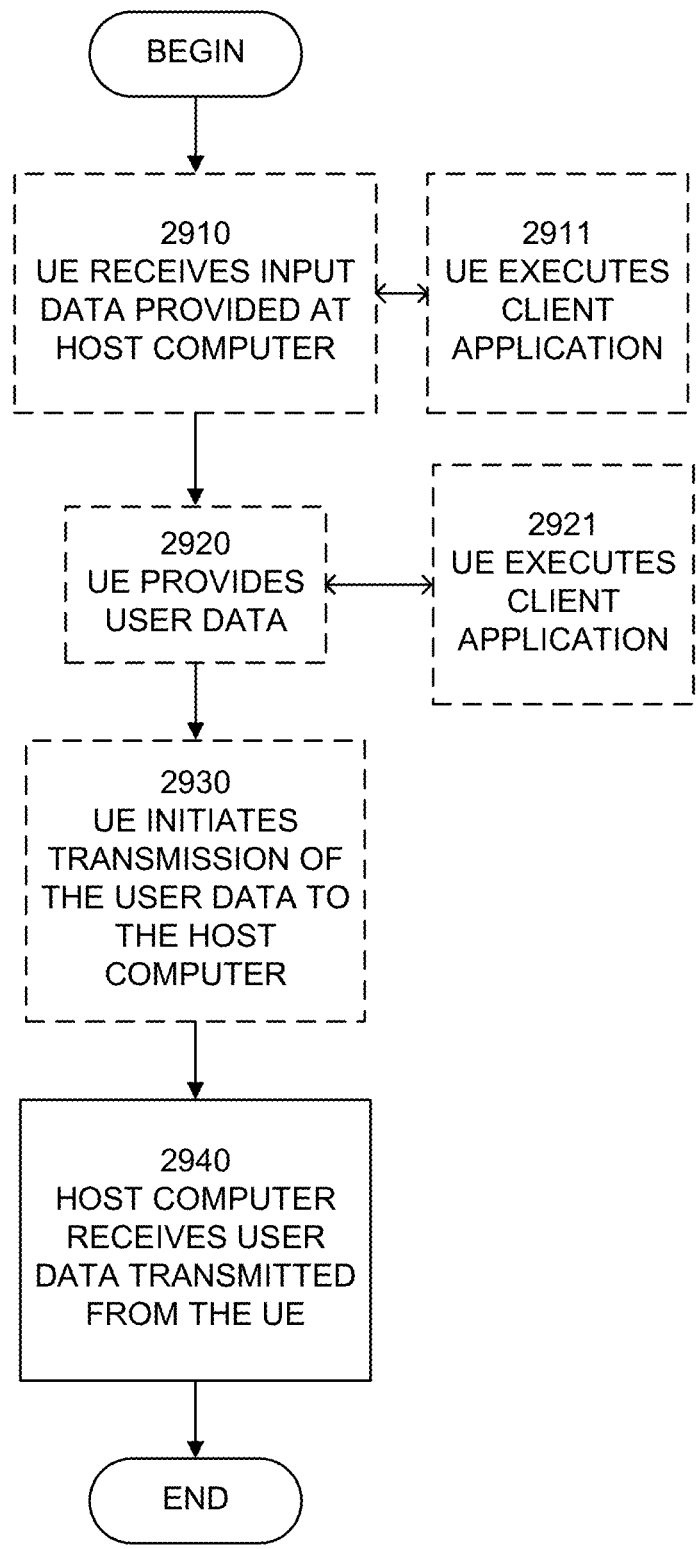
FIG. 29 is a block diagram of methods implemented in a communication system including a host computer, a base station and a user equipment in accordance with some embodiments.

FIG. 29 illustrates methods implemented in a communication system including a host computer, a base station and a user equipment in accordance with some embodiments FIG. 29 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 29 will be included in this section. In step 2910 (which may be optional), the UE receives input data provided by the host computer. Additionally or alternatively, in step 2920, the UE provides user data. In substep 2921 (which may be optional) of step 2920, the UE provides the user data by executing a client application. In substep 2911 (which may be optional) of step 2910, the UE executes a client application which provides the user data in reaction to the received input data provided by the host computer. In providing the user data, the executed client application may further consider user input received from the user. Regardless of the specific manner in which the user data was provided, the UE initiates, in substep 2930 (which may be optional), transmission of the user data to the host computer. In step 2940 of the method, the host computer receives the user data transmitted from the UE, in accordance with the teachings of the embodiments described throughout this disclosure.

Figure 30:
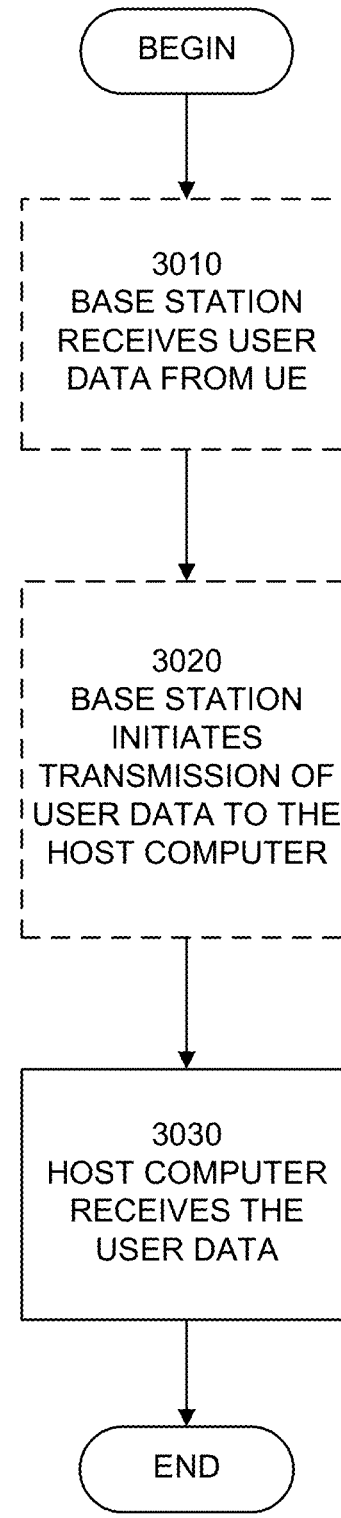
FIG. 30 is a block diagram of methods implemented in a communication system including a host computer, a base station and a user equipment in accordance with some embodiments.

FIG. 30 illustrates methods implemented in a communication system including a host computer, a base station and a user equipment in accordance with some embodiments FIG. 30 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 30 will be included in this section. In step 3010 (which may be optional), in accordance with the teachings of the embodiments described throughout this disclosure, the base station receives user data from the UE. In step 3020 (which may be optional), the base station initiates transmission of the received user data to the host computer. In step 3030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access UTRAN Universal Terrestrial Radio Access Network
WCDMA Wide CDMA
WLAN Wide Local Area Network Further definitions and embodiments are discussed below.

In the above description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A method by a first network node, operating as a target donor central unit in an integrated access backhaul ("IAB") network, serving as a candidate donor node for a migrating IAB node and providing connectivity for a user equipment ("UE") the method comprising:

receiving a message for IAB handover from a second network node, the message including contexts of the migrating IAB node and UEs and IAB nodes that are directly or indirectly served by the migrating IAB node;

performing admission control for the UEs and IAB nodes included in the message;

preparing a handover command to a mobile termination ("MT") of the migrating IAB node, and each UE and MT of IAB node that are directly or indirectly served by the migrating IAB node;

generating a group handover command that recursively contains handover commands of all UEs and MTs of IAB nodes that are directly or indirectly served by the migrating IAB node;

preparing and sending a handover acknowledge message to the second network node, the handover acknowledge message including a list of admitted and not admitted protocol data units ("PDU") session resources that are associated with the UEs and IAB nodes and containing the group handover command; and receiving a Radio Resource Control ("RRC") Reconfiguration Complete message corresponding to an MT of the migrating IAB node and/or an MT of any IAB node and/or UE that are directly or indirectly served by the migrating IAB node.

2. The method of claim 1, wherein generating the group handover command comprises:

for each hop starting from the hop where leaf nodes under a subtree below the migrating IAB node where the IAB nodes with no children nodes are located and ending when a level of the migrating IAB node is reached:

for each IAB node in that hop, or if the hop corresponds to the migrating IAB node's level for the migrating IAB node, updating the handover command prepared for the MT of the IAB node including the handover command prepared for each UE and MT of each child IAB node the IAB node is serving.

3. The method of claim 2, wherein updating the handover command comprises:

encapsulating the handover commands of each UE and MT of child IAB node directly in the handover command prepared for the MT of the IAB node.

4. The method of claim 2, wherein updating the handover command comprises:

embedding an F1-application protocol ("F1-AP") message in the handover command prepared for the MT of the IAB node, where the F1-AP message contains all the handover commands for the UEs/MTs of IAB nodes directly or indirectly served by the migrating IAB node.

5. The method of claim 2, wherein updating the handover command comprises:

encapsulating a list of F1-AP messages in the handover command for the MT of the IAB node, each message containing the handover command to each UE/MT.

6. The method of claim 4, wherein the F1-AP message comprises at least one of:

an F1-AP downlink ("DL") RRC Message Transfer message;

an enhancement of the F1-AP DL RRC Message Transfer message; and a new message.

7. The method of claim 1, wherein receiving the RRC Reconfiguration Complete message comprises receiving each Reconfiguration Complete message in a separate F1-application protocol ("AP") uplink ("UL") RRC message transfer message.

8. The method of claim 7, wherein receiving the RRC Reconfiguration Complete message comprises receiving an uplink F1-AP message for each IAB node being migrated, and wherein each uplink message contains the RRC complete messages of all the UEs and IAB-MT under that IAB node.

9. The method of claim 1, wherein receiving the RRC Reconfiguration Complete message comprises receiving a single uplink F1-application protocol ("AP") message that contains all the reconfiguration complete messages of all the migrating IAB nodes and UEs.

10. The method of claim 8, wherein the F1-AP message comprises:

an enhancement of the F1-AP UL RRC Message Transfer message; or a new message.

11. The method of claim 1, further comprising:

performing one of setting up or relocating an F1 connection between the IAB node whose MT's RRC Reconfiguration complete message is received and the first network node.

12. A network node comprising:

processing circuitry; and memory coupled with the processing circuitry, wherein the memory includes instructions that when executed by the processing circuitry causes the network node to perform operations comprising:

receiving a message for integrated access backhaul ("IAB") handover from a second network node, the message including contexts of the migrating IAB node and user equipments ("UEs"), and IAB nodes that are directly or indirectly served by the migrating IAB node;

performing admission control for the UEs and IAB nodes included in the message;

preparing a handover command to a mobile termination ("MT") of the migrating IAB node, and each UE and MT of IAB node that are directly or indirectly served by the migrating IAB node;

generating a group handover command that recursively contains handover commands of all UEs and MTs of IAB nodes that are directly or indirectly served by the migrating IAB node;

preparing and sending a handover acknowledge message to the second network node, the handover acknowledge message including a list of admitted and not admitted protocol data units ("PDU") session resources that are associated with the UEs and IAB nodes and containing the group handover command; and receiving a Radio Resource Control ("RRC") Reconfiguration Complete message corresponding to an MT of the migrating IAB node and/or an MT of any IAB node and/or UE that are directly or indirectly served by the migrating IAB node.

13. The network node of claim 12, wherein generating the group handover command comprises, for each hop starting from the hop where leaf nodes under a subtree below the migrating IAB node where the IAB nodes with no children nodes are located and ending when a level of the migrating IAB node is reached:

for each IAB node in that hop, or if the hop corresponds to the migrating IAB node's level for the migrating IAB node, updating the handover command prepared for the MT of the IAB node including the handover command prepared for each UE and MT of each child IAB node the IAB node is serving.

14. The network node of claim 13, wherein updating the handover command comprises encapsulating the handover commands of each UE and MT of child IAB node directly in the handover command prepared for the MT of the IAB node.

15. The network node of claim 13, wherein updating the handover command comprises embedding an F1-application protocol ("F1-AP"), message in the handover command prepared for the MT of the IAB node, where the F1-AP message contains all the handover commands for the UEs/MTs of IAB nodes directly or indirectly served by the migrating IAB node.

16. The network node of claim 13, wherein in-updating the handover command comprises encapsulating a list of F1-AP messages in the handover command for the MT of the IAB node, each message containing the handover command to each UE/MT.

17. The network node of claim 15, wherein the F1-AP message comprises at least one of:
   an F1-AP downlink ("DL") RRC Message Transfer message;
   an enhancement of the F1-AP DL RRC Message Transfer message; and
   a new message.

18. The network node of claim 12, wherein receiving the RRC Reconfiguration Complete message comprises receiving each Reconfiguration Complete message in a separate F1-application protocol ("AP") uplink ("UL") RRC message transfer message.

19. The network node of claim 18, wherein receiving the RRC Reconfiguration Complete message comprises receiving an uplink F1-AP message for each IAB node being migrated, and
   wherein each uplink message contains the RRC complete messages of all the UEs and IAB-MT under that IAB node.

20. The network node of claim 12, wherein receiving the RRC Reconfiguration Complete message comprises receiving a single uplink F1-application protocol ("AP") message that contains all the reconfiguration complete messages of all the migrating IAB nodes and UEs.

21. The network node of claim 19, wherein the F1-AP message comprises:
   an enhancement of the F1-AP UL RRC Message Transfer message; or
   a new message.

22. The network node of claim 12, the operations further comprising:
   performing one of setting up or relocating an F1 connection between the IAB node whose MT's RRC Reconfiguration complete message is received and the first network node.

* * * * *